(12) United States Patent
Venkataramani et al.

(10) Patent No.: US 10,949,182 B2
(45) Date of Patent: Mar. 16, 2021

(54) SYSTEMS AND METHODS FOR GENERATING CODE FOR PARALLEL PROCESSING UNITS

(71) Applicant: The MathWorks, Inc., Natick, MA (US)

(72) Inventors: Girish Venkataramani, Cambridge, MA (US); Rama P. Kokku, Natick, MA (US); Jayaprabha Shankar, Natick, MA (US); James L. Brock, Kingston, NH (US); Chun-Yu Shei, Allston, MA (US); Vijaya Raghavan, Brookline, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 15/816,377

(22) Filed: Nov. 17, 2017

(65) Prior Publication Data

US 2018/0157471 A1 Jun. 7, 2018

Related U.S. Application Data

(63) Continuation of application No. PCT/US2017/062071, filed on Nov. 16, 2017.

(60) Provisional application No. 62/423,446, filed on Nov. 17, 2016, provisional application No. 62/492,217, filed on Apr. 30, 2017, provisional application No. 62/514,531, filed on Jun. 2, 2017, provisional application No. 62/557,605, filed on Sep. 12, 2017.

(51) Int. Cl.
*G06F 8/41* (2018.01)

(52) U.S. Cl.
CPC .............. *G06F 8/452* (2013.01); *G06F 8/445* (2013.01); *G06F 8/4434* (2013.01);
(Continued)

(58) Field of Classification Search
CPC ..................... G06F 8/443–452; G06F 8/44–47
See application file for complete search history.

(56) References Cited

U.S. PATENT DOCUMENTS 5,561,801 A * 10/1996 Simons ...................... G06F 8/45
717/149
6,711,667 B1 * 3/2004 Ireton ................. G06F 9/30174
712/209
(Continued)

OTHER PUBLICATIONS

Michael Wolfe, Implementing the PGI Accelerator Model, by The Portland Group, Inc, published by ACM, pp. 43-50 (Year: 2010).*
(Continued)

*Primary Examiner* — S. Sough
*Assistant Examiner* — Zheng Wei
(74) *Attorney, Agent, or Firm* — Cesari and McKenna, LLP; Michael R. Reinemann

(57) ABSTRACT

Systems and methods generate code from a source program where the generated code may be compiled and executed on a Graphics Processing Unit (GPU). A parallel loop analysis check may be performed on regions of the source program identified for parallelization. One or more optimizations also may be applied to the source program that convert mathematical operations into a parallel form. The source program may be partitioned into segments for execution on a host and a device. Kernels may be created for the segments to be executed on the device. The size of the kernels may be determined, and memory transfers between the host and device may be optimized.

77 Claims, 41 Drawing Sheets

(52) U.S. Cl.
CPC ............ *G06F 8/4441* (2013.01); *G06F 8/456* (2013.01); *G06F 8/458* (2013.01)

(56) References Cited

U.S. PATENT DOCUMENTS

| | | | |
|---|---|---|---|
| 7,373,640 B1* | 5/2008 | English | G06F 8/456 |
| | | | 712/203 |
| 8,104,030 B2* | 1/2012 | Silvera | G06F 8/4452 |
| | | | 717/127 |
| 8,151,263 B1* | 4/2012 | Venkitachalam | G06F 9/485 |
| | | | 711/162 |
| 8,321,849 B2* | 11/2012 | Nickolls | G06F 8/456 |
| | | | 717/146 |
| 8,533,697 B2 | 9/2013 | Stefansson et al. | |
| 8,549,499 B1* | 10/2013 | Ding | G06F 8/456 |
| | | | 712/216 |
| 8,839,214 B2* | 9/2014 | Ringseth | G06F 8/453 |
| | | | 717/149 |
| 8,893,103 B2* | 11/2014 | Ravi | G06F 8/33 |
| | | | 717/151 |
| 8,918,770 B2* | 12/2014 | Ravi | G06F 8/4441 |
| | | | 717/140 |
| 8,997,073 B2* | 3/2015 | Ravi | G06F 8/452 |
| | | | 717/151 |
| 9,135,065 B1 | 9/2015 | Stefansson | |
| 9,189,233 B2* | 11/2015 | Sasanka | G06F 9/30098 |
| 9,395,957 B2* | 7/2016 | Ringseth | G06F 8/31 |
| 9,471,289 B2* | 10/2016 | Feng | G06F 8/443 |
| 9,672,019 B2* | 6/2017 | Sager | G06F 8/4442 |
| 9,830,133 B1* | 11/2017 | Baskaran | G06F 8/41 |
| 9,830,134 B2* | 11/2017 | Howes | G06F 8/41 |
| 9,841,958 B2* | 12/2017 | Ringseth | G06F 8/314 |
| 2010/0199257 A1* | 8/2010 | Biggerstaff | G06F 8/456 |
| | | | 717/104 |
| 2010/0205599 A1* | 8/2010 | Vaidya | G06F 8/70 |
| | | | 717/174 |
| 2010/0218196 A1* | 8/2010 | Leung | G06F 8/453 |
| | | | 718/107 |
| 2010/0229161 A1* | 9/2010 | Mori | G06F 8/456 |
| | | | 717/149 |
| 2011/0167416 A1* | 7/2011 | Sager | G06F 8/4442 |
| | | | 717/149 |
| 2011/0314458 A1* | 12/2011 | Zhu | G06F 8/314 |
| | | | 717/149 |
| 2012/0137075 A1* | 5/2012 | Vorbach | G06F 9/526 |
| | | | 711/122 |
| 2012/0144162 A1* | 6/2012 | Papakipos | G06F 8/20 |
| | | | 712/200 |
| 2012/0159459 A1* | 6/2012 | Turner | G06F 8/314 |
| | | | 717/138 |
| 2013/0332711 A1* | 12/2013 | Leidel | G06F 9/30145 |
| | | | 712/227 |
| 2014/0037228 A1* | 2/2014 | Lefebvre | G06T 1/20 |
| | | | 382/304 |
| 2014/0330763 A1* | 11/2014 | Hunt | G06N 3/105 |
| | | | 706/42 |
| 2015/0100529 A1* | 4/2015 | Sarah | G06N 3/10 |
| | | | 706/25 |
| 2015/0277899 A1* | 10/2015 | Hamby | G06F 8/41 |
| | | | 717/120 |
| 2016/0147516 A1* | 5/2016 | Rajnak | G06F 8/456 |
| | | | 717/150 |
| 2016/0321045 A1* | 11/2016 | Radigan | G06F 8/443 |
| 2016/0364216 A1* | 12/2016 | Howes | G06F 8/41 |

OTHER PUBLICATIONS

Han et al., hiCUDA: High-Level GPGPU Programming, published by IEEE, pp. 78-90 (Year: 2011).*

Stone et al., OpenCL: A Parall el Programming Standard for Heterogeneous Computing Systems, published IEEE, pp. 66-73 (Year: 2010).*

Chen et al., "Unified Parallel C for GPU Clusters: Language Extensions and Compiler Implementation", published by Springer-Verlag Berlin Heidelberg 2011, pp. 151-165 (Year: 2011).*

Grewe et al., "A Static Task Partitioning Approach for Heterogeneous Systems Using OpenCL", published by Springer-Verlag Berlin Heidelberg 2011, pp. 286-305 (Year: 2011).*

Holewinski, Justin, et al., "High-Performance Code Generation for Stencil Computations on GPU Architectures," ACM, Proceedings of the 26th ACM international Conference on Supercomputing, ICS'12, Jun. 25-29, 2012, San Servolo Island, Venice, Italy, pp. 1-10.

"Invitation to Pay Additional Fees and, Where Applicable, Protest Fee," Partial Search Report, International Filing Date: Nov. 16, 2017, International Application No. PCT/US2017/062071, Applicant: The MathWorks, Inc., dated Mar. 8, 2018, pp. 1-13.

Lee, Seyong, et al., "OpenMP to GPGPU: A Compiler Framework for Automatic Translation and Optimization," ACM, Proceedings of the 14th ACM SIGPLAN Symposium on Principles and Practice of Parallel Programming, PPoPP'09, vol. 44, No. 4, Feb. 14-18, 2009, Raleigh, North Carolina, USA, pp. 101-110.

"Notification of Transmittal of the International Search Report and the Written Opinion of the International Searching Authority, or the Declaration," International Filing Date: Nov. 16, 2017, International Application No. PCT/US2017/062071, Applicant: The MathWorks, Inc., dated May 4, 2018, pp. 1-18.

"Stencil Operations on a GPU," The MathWorks, Inc., <https://www.mathworks.com/help/distcomp/examples/stencil-operations-on-a-gpu.html>, Retrieved on Apr. 5, 2017, Oct. 2014, pp. 1-6.

Harris, Mark, "NVIDIA: Optimizing Parallel Reduction in CUDA," NVIDIA Developer Technology, <http://developer.download.nvidia.com/ compute/cuda/1.1-Beta/x86_website/projects/reduction/doc/reduction.pdf>, 2007, pp. 1-38.

Holewinski, Justin, et al., "High-Performance Code Generation for Stencil Computations on GPU Architectures," ACM, ICS'12, San Servolo Island, Venice, Italy, Jun. 25-29, 2012, pp. 1-10.

Jindal, Akhil, et al., "Automated Tool to Generate Parallel CUDA Code from a Serial C Code," International Journal of Computer Applications, vol. 50, No. 8, Jul. 2012, pp. 15-21.

Luitjens, Justin, "Faster Parallel Reductions on Kelper," Parallel Forall, NVIDIA Corporation, <https://devblogs.nvidia.com/parallelforall/faster-parallel-reductions-kepler/>, Feb. 13, 2014, pp. 1-10.

Maruyama, Naoya, et al., "Optimizing Stencil Computations for NVIDIA Kelper GPUs," HiStencils 2014, First International Workshop on High-Performance Stencil Computations, Vienna, Austria, Jan. 21, 2014, pp. 1-7.

Rubio, Erica Hernandez, et al., "FLAP: Tool to Generate CUDA Code from Sequential C Code," IEEE, 2014 International Conference on Electronics, Communications and Computers (CONIELECOMP), Cholula, Mexico, Feb. 26-28, 2014, pp. 35-40.

Rudy, Gabe, "CUDA-CHILL: A Programming Language Interface for GPGPU Optimizations and Code Generation," School of Computing at The University of Utah, Aug. 2010, pp. 1-67.

"High Level GPU Computing with ArrayFire for C/C++, Fortran, and Python," AccelerEyes®, Jan. 2012, pp. 1-9.

"Jacket: High Level GPU Computing with MATLAB®," AccelerEyes®, Jan. 2012, pp. 1-7.

Lam, Siu Kwan, "Extending Python for High-Performance Data-Parallel Programming," CONTINUUM Analytics, Mar. 24, 2014, pp. 1-49.

"NumbaPro," Anaconda, Anaconda Accelerate, CONTINUUM Analytics, Mar. 2014, pp. 1-46.

Oliphant, Ph.D., Travis E., "Applications of Programming the GPU Directly from Python Using NumbaPro," Anaconda, CONTINUUM Analytics, Nov. 20, 2013, pp. 1-27.

* cited by examiner

```
function C = vecmul_expl(A,B)
    for i = 1:length(A)
        C(i) = A(i) * B(i);
    end
end
```

*FIG. 7*

```
static __global__ __launch_bounds__ (512, 1)
void kernel1(const real_T *B, const real_T *A, real_T *C)
{
    int32_T threadIdx;
    threadIdx = (int32_T)(blockDim.x * blockIdx.x + threadIdx.x);
    if (!(threadIdx >= 1000)) {
        C[threadIdx] = A[threadIdx] * B[threadIdx];
    }
}
```

*FIG. 8*

```
/* bigreduction.cu
 *
 * Code generation for function 'bigreduction'
 *
 */

/* Include files */
#include "rt_nonfinite.h"
#include "bigreduction.h"

/* Function Declarations */
static __global__ void bigreduction_kernel1(const real32_T *in,
    real32_T *y);
static __global__ void bigreduction_kernel2(const real32_T *in,
    real32_T *y);
static __global__ void bigreduction_kernel3(real32_T *y, real32_T
    *out);
static __inline__ __device__ real32_T shflDown2(real32_T in1,
    uint32_T offset);
static __device__ real32_T threadGroupReduction2(real32_T val);
static __device__ real32_T workGroupReduction2(real32_T val,
    real32_T init);

/* Function Definitions */
```

FIG. 11A-1

```
static __global__ __launch_bounds__ (32, 1) void
bigreduction_kernel1(const
real32_T *in, real32_T *y)
{
 ;
 ;
 if (!!((int32_T)(!!!((gridDim.x * gridDim.y * blockDim.z +
gridDim.x *
                        blockDim.y) + blockIdx.x) * (blockDim.x *
blockDim.y *
              blockDim.z) + threadIdx.z * blockDim.x * blockDim.y) +
threadIdx.y *
              blockDim.x) + threadIdx.x) >= 1)) {
   *y = in[0];
 }
} static __global__ __launch_bounds__ (1024, 1) void
bigreduction_kernel2(const
real32_T *in, real32_T *y)
{
 uint32_T threadId;
 uint32_T threadStride;
 uint32_T thdBlkId;
 uint32_T idx;
 int32_T k;
```

*FIG. 11A-2*

```
real32_T tmpRed;
;
;
thdBlkId = (threadIdx.z * blockDim.x * blockDim.y + threadIdx.y
* blockDim.x)
 + threadIdx.x;
threadId = ((gridDim.x * gridDim.y * blockIdx.z + gridDim.x *
blockIdx.y) +
           blockIdx.x) * (blockDim.x * blockDim.y *
blockDim.z) + thdBlkId;
threadStride = gridDim.x * blockDim.x * (gridDim.y *
blockDim.y) * (gridDim.z *
          blockDim.z);
k = (int32_T)threadId;
if (!(k >= 100000768)) {
    tmpRed = 0.0F;
    for (idx = threadId; threadStride < 0U ? idx >= 999999998U :
idx <= 999999998U;
         idx += threadStride) {
        tmpRed += in[k + 1];
    }
    tmpRed = workGroupReduction2(tmpRed, 0.0F);
    if (thdBlkId == 0U) {
        atomicAdd(y, tmpRed);
    }
}
}
```

*FIG. 11B-1*

```
static __global__ __launch_bounds__(32, 1) void
bigreduction_kernel3(real32_T *y,
real32_T *out)
{
;
;
if (!((int32_T)(((((gridDim.x * gridDim.y * blockIdx.z +
                   blockIdx.y) * blockDim.x) * (blockDim.x *
    blockDim.y *
             blockDim.z) + blockIdx.z * blockDim.x * blockDim.y) +
    threadIdx.y *
             blockDim.x) + threadIdx.x) >= 1))) {
  *out = *y / 1.0E+8F;
}
} static __inline__ __device__ real32_T __shfl_down2(real32_T in1,
uint32_T offset)
{
  int32_T *tmp;
  tmp = (int32_T *)&in1;
  *tmp = __shfl_down(*tmp, offset);
}
```

FIG. 11B-2

```
    return *(real32_T *)tmp;
} static __device__ real32_T threadGroupReduction2(real32_T val)
{
    uint32_T offset;
    offset = warpSize / 2U;
    while (offset > 0U) {
        val += shfIDown2(val, offset);
        offset /= 2U;
    }
    return val;
} static __device__ real32_T workGroupReduction2(real32_T val,
real32_T init)
{
    __shared__ real32_T shared[32];
    uint32_T lane;
    uint32_T widx;
    uint32_T blockStride;
    uint32_T thBlkid;
    thBlkid = (threadIdx.z * blockDim.x * blockDim.y + threadIdx.y
* blockDim.x) +
        threadIdx.x;
    blockStride = blockDim.x * blockDim.y * blockDim.z;
    lane = thBlkid % warpSize;
```

FIG. 11C-1

```
widx = thBlkId / warpSize;
val = threadGroupReduction2(val);
if (lane == 0U) {
    shared[widx] = val;
}
__syncthreads();
if (thBlkId < blockStride / warpSize) {
    val = shared[lane];
} else {
    val = init;
}
if (widx == 0U) {
    val = threadGroupReduction2(val);
}
return val;
}
real32_T bigreduction(const real32_T in[100000000])
{
    real32_T out;
    real32_T *gpu_in;
```

FIG. 11C-2

```
real32_T *gpu_y;
real32_T *gpu_out;
cudaMalloc(&gpu_out, 4UL);
cudaMalloc(&gpu_y, 4UL);
cudaMalloc(&gpu_in, 400000000UL);
cudaMemcpy(gpu_in, in, 400000000UL, cudaMemcpyHostToDevice);
bigreduction_kernel1<<<dim3(1U, 1U, 1U), dim3(32U, 1U,
1U)>>>(gpu_in, gpu_y);
bigreduction_kernel2<<<dim3(47U, 47U, 47U), dim3(32U, 32U,
1U)>>>(gpu_in,
gpu_y);
bigreduction_kernel3<<<dim3(1U, 1U, 1U), dim3(32U, 1U,
1U)>>>(gpu_y, gpu_out);
cudaMemcpy(&out, gpu_out, 4UL, cudaMemcpyDeviceToHost);
cudaFree(gpu_in);
cudaFree(gpu_y);
cudaFree(gpu_out);
return out;
}

/* End of code generation (bigreduction.cu) */
```

*FIG. 11D*

```
function c = vecmul_impl (A, B,)

C = A .* B;

end
```

FIG. 13

```
void vecmul(const real_T A[1000], const real_T B[1000], real_T
C[1000])
{
  real_T *gpu_B;
  real_T *gpu_A;
  real_T *gpu_C;
  cudaMalloc(&gpu_C, 8000U);
  cudaMalloc(&gpu_A, 8000U);
  cudaMalloc(&gpu_B, 8000U);
  cudaMemcpy(gpu_B, B, 8000U, cudaMemcpyHostToDevice);
  cudaMemcpy(gpu_A, A, 8000U, cudaMemcpyHostToDevice);
  kernel1<<<dim3(2U, 1U, 1U), dim3(512U, 1U, 1U)>>>(gpu_B, gpu_A,
gpu_C);
  cudaMemcpy(C, gpu_C, 8000U, cudaMemcpyDeviceToHost);
  cudaFree(gpu_B);
  cudaFree(gpu_A);
  cudaFree(gpu_C);
}
```

| MATLAB Operation/Function | Description | Data Type | CUDA Library | PPU Library Function |
|---|---|---|---|---|
| mtimes | matrix multiply | Double | cuBLAS | cublasDgemm |
| qr, lu | Index of maximum magnitude | Single | cuBLAS | cublasiSamax |
| + | sum of absolute values | Double Complex | cuBLAS | cublasZasum |
| svd, conv, conv2 | ax +y | Single Complex | cuBLAS | cublasCaxpy |
| = | vector copy | Double | cuBLAS | cublasDcopy |
| polyeig | dot product | Single | cuBLAS | cublasSdot, cublasSdotc, cublasDdotu |
| * | matrix-matrix multiply | Double | cuBLAS | cublasDgemm |
| * | matrix-vector multiply | Single Complex | cuBLAS | cublasCgemv |
| inv, qr, schur | Rank-1 Update | Double Complex | cuBLAS | cublasZger, cublasZgerc, cublasZgeru |
| norm | Euclidian norm | Single | cuBLAS | cublasSnrm2 |
| planerot | Givens plane rotation | Double | cuBLAS | cublasDrot |
| svd | Construct Givens Rotation | Single | cuBLAS | cublasSrotg |
| * | Scale Vector | Double | cuBLAS | cublasDscal |

FIG. 16B

| | | | | |
|---|---|---|---|---|
| 1612n | = | Swap Vector | Double Complex | cublasZswap |
| 1612o | Cholupdate, linsolve | Solve Triangular Linear System | Single Complex | cublasCtrsm, cublasCtrsv |
| 1612p | \ | matrix inversion | Single | cuSOLVER | cusolverSgetrf |
| 1612q | chol | Cholesky factorization | Double | cuSOLVER | cusolverDpotrf |
| 1612r | det | matrix determinant | Single Complex | cuSOLVER | cusolverCgetrf |
| 1612s | inv | matrix inverse | Double Complex | cuSOLVER | cusolverZgetrf |
| 1612t | linsolve(A, B) | solves linear system A*X = B | Single | cuSOLVER | cusolverSpotrf |
| 1612u | lu | matrix factorization | Single | cuSOLVER | cusolverSgetrf |
| 1612v | qr | QR factorization | Double | cuSOLVER | cusolverDunormqr |
| 1612w | Rcond | reciprocal condition number | Double Complex | cuSOLVER | cusolverZgetrf |
| 1612x | svd | singular value decomposition | Single Complex | cuSOLVER | cusolverCgesvd |
| 1612y | eig | eigenvalues | Double | MAGMA | magma_Dgeev_gpu |
| 1612zz | schur | Schur decomposition | Single Complex | MAGMA | magma_Cgehrd_gpu, magma_Cunghr_gpu, magma_Corghr_gpu |
| 1612aa | qr | QR factorization | Single | MAGMA | magma_Sgeqp3_gpu |
| 1612ab | fft | fast fourier transform | Complex, Single | cuFFT | cufftExeC2C |

From Fig. 16A

```
function [out] = gpufft (in)

coder.gpu.kernelfun( )

end
```

*FIG. 17*

```
#define NX 256
#define NY 128
#define NRANK 2
#define BATCH 1
cufftHandle plan;
cufftComplex *data;
int n[NRANK] = {NX, NY};
cudaMalloc((void**)&data, sizeof(cufftComplex)*NX*(NY/2+1));
cufftPlanMany(&plan, NRANK, n, NULL, 1, 0, NULL, 1, 0,
              CUFFT_C2R, BATCH);
...
cufftExecC2R(plan, data, data) != CUFFT_SUCCESS);
cudaDeviceSynchronize();
...
cufftDestroy(plan);
cudaFree(data);
```

*FIG. 18*

```
static __global__ __launch_bounds__ (32, 1) void kernel (const
real_T *varargin_1, const real_T *im, real_T *im1)
{
    __shared__ real_T im_shared[52];         ── 2502
    threadIDx = (int32_T)(blockDim.x * blockIdx.x + threadIdx.x);
    baseC = threadIdx - 10;
    strideCol = (int32_T)blockDim.x;
    for (x_idx = (int32_T)threadIdx.x; x_idx <= 51, x_idx +=
      strideCol) {
      if ((baseC >= 0) && (baseC < 1024)) {
        im_shared[x_idx] = (real_T)im[baseC];
      } else {
        im_shared[x_idx] = 0.0;
      }
      baseC += strideCol;
    }
}
```

```
__syncthreads();  ——2506
if (!(threadIdx >= 1024)) {
    cv = 0.0
    for (iw = 0; iw < 21; iw++) {
        ww = (threadIdx + iw) - 9;
        if (((ww >+ 1) && (ww <= 1024)) {
            newIp = im_shared[(((int32_T)threadIdx.x + threadIdx) + iw)
            - threadIdx];
        } else {
            newIp = 0.0;
        }
        cv += newIp * varargin_1[iw];
    }
    im1[threadIdx] = cv;
}
```

```
function x= while_example(in1, in2)

x = zeros(size(in1), class(n1) );
    1 = 1;

while ( i <= numel(in1) )
        x(i) = in1(i) + in2(i);
        i = i + 1;
    end
end
```
— 2902

FIG. 29

```
function x= while_to_for2(in1, in2)

x = zeros(size(in1(, class(n1) );
    for i = 1:512    — 3004
        if ( i <= size(n1) )
            x(i) = in1(i) + in2(i);
        end
    end
end
```
— 3002

FIG. 30

SYSTEMS AND METHODS FOR GENERATING CODE FOR PARALLEL PROCESSING UNITS

CROSS-REFERENCE TO RELATED APPLICATIONS

This application is a continuation of International Application No. PCT/US2017/062071, filed Nov. 16, 2017, which claims the benefit of U.S. Provisional Patent Application Ser. No. 62/423,446 filed Nov. 17, 2016 for GENERATING CODE FOR GRAPHICAL PROCESSING UNITS (GPU) by Girish Venkataramani, Rama Kokku, Jayaprabha Shankar, James L. Brock, Chun-Yu Shei, and Vijaya Raghavan, U.S. Provisional Patent Application Ser. No. 62/492,217 filed Apr. 30, 2017 for SYSTEMS AND METHODS FOR GENERATING CODE FOR GRAPHICAL PROCESSING UNITS by Girish Venkataramani, Rama Kokku, Jayaprabha Shankar, James L. Brock, Chun-Yu Shei, and Vijaya Raghavan, U.S. Provisional Patent Application Ser. No. 62/514,531 filed Jun. 2, 2017 for SYSTEMS AND METHODS FOR GENERATING CODE FOR GRAPHICAL PROCESSING UNITS by Girish Venkataramani, Rama Kokku, Jayaprabha Shankar, James L. Brock, Chun-Yu Shei, and Vijaya Raghavan, and U.S. Provisional Patent Application Ser. No. 62/557,605 filed Sep. 12, 2017 for SYSTEMS AND METHODS FOR GENERATING CODE FOR PARALLEL PROCESSING UNITS by Girish Venkataramani, Rama Kokku, Jayaprabha Shankar, James L. Brock, Chun-Yu Shei, and Vijaya Raghavan, which applications are hereby incorporated by reference in their entireties.

COMPUTER PROGRAM LISTING

A portion of the disclosure of this patent document contains material that is subject to copyright protection. The copyright owner has no objection to facsimile reproduction by anyone of the patent document for the patent disclosure, as it appears in the United States Patent and Trademark Office patent file or records, but otherwise reserves all copyright rights whatsoever. Copyright © 2017 The MathWorks, Inc.

BRIEF DESCRIPTION OF THE DRAWINGS

The description below refers to the accompanying drawings, of which:

FIG. 7 is a schematic illustration of an example code snippet of a source program in accordance with an embodiment;

FIG. 8 is a schematic illustration of an example of generated code in accordance with an embodiment;

FIGS. 11A-11D are partial views of a schematic illustration of an example of generated code in accordance with an embodiment;

FIG. 13 is a schematic illustration of an example of a code snippet of a source program in accordance with an embodiment;

FIG. 14 is a schematic illustration of an example of generated code in accordance with an embodiment;

FIGS. 16A and 16B are partial views of a schematic illustration of an example mapping table in accordance with an embodiment;

FIG. 17 is a schematic illustration of an example code snippet of a source program in accordance with an embodiment;

FIG. 18 is a schematic illustration of an example of generated code in accordance with an embodiment;

FIGS. 25A and 25B are partial views of a schematic illustration of an example of generated code in accordance with an embodiment;

FIG. 29 is a schematic illustration of a code snippet of a source program in accordance with an embodiment;

FIG. 30 is a schematic illustration of generated code in accordance with an embodiment;

DETAILED DESCRIPTION OF ILLUSTRATIVE EMBODIMENTS

Many data processing systems now include one or more Parallel Processing Units (PPUs) in addition to a Central Processing Unit (CPU). For example, desktop and laptop computers often include a PPU in the form of a Graphics Processing Unit (GPU) in combination with a single or multicore CPU. GPUs were originally included in desktop and laptop computers to perform graphics processing tasks, especially for gaming applications. Today, GPUs are used to perform general purpose computing tasks by processing large blocks of data in parallel. GPUs are also included in embedded systems, such as embedded system-on-chip (SoC) architectures, which can be used for machine vision and other applications. Embedded systems can be more demanding in terms of performance, such as power consumption, heat generation, latency, throughput, and computational resources, such as memory, as compared to laptops, desktops, or servers.

Figure 1:
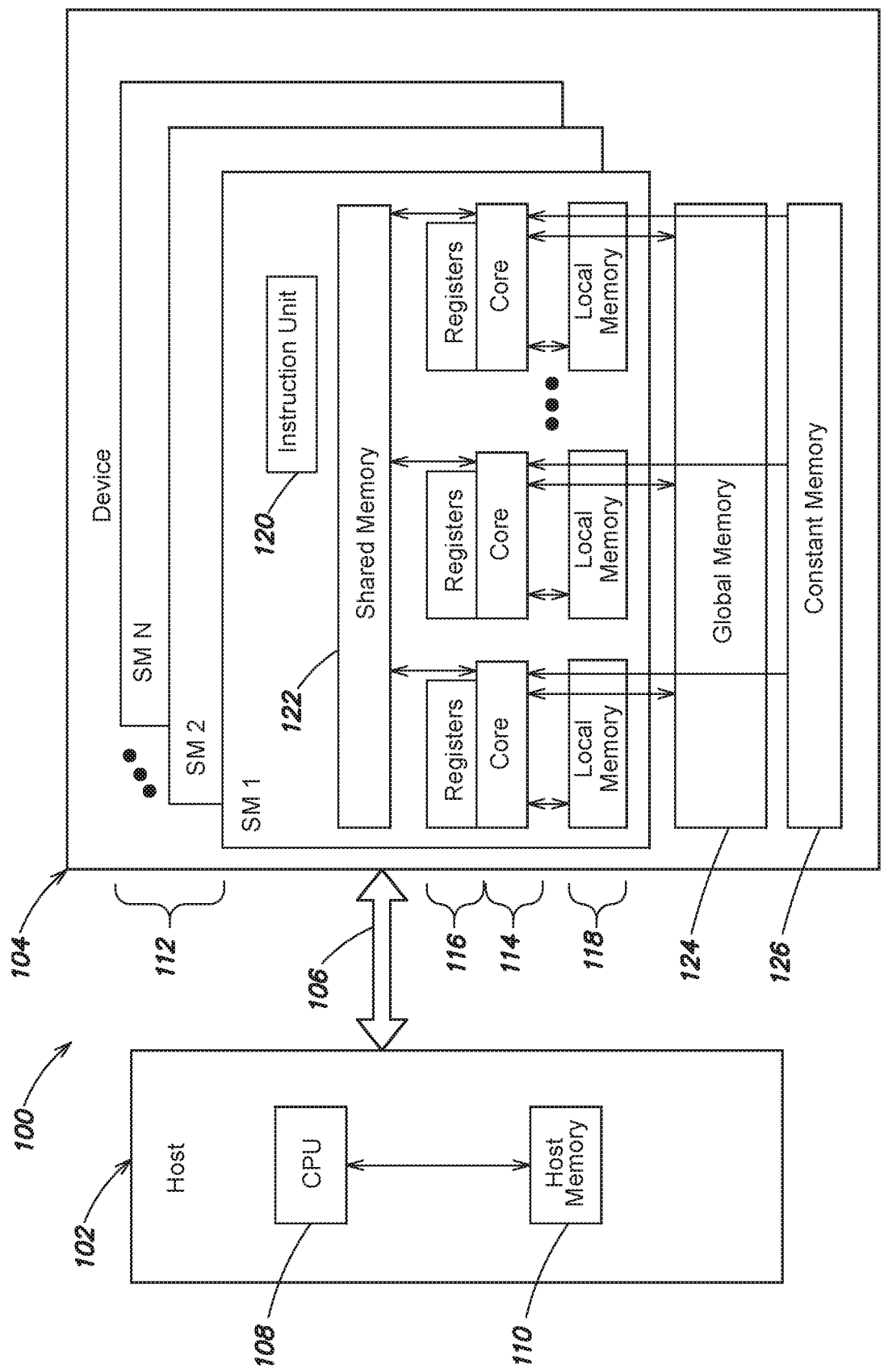
FIG. 1 is a schematic illustration of an example processor architecture in accordance with an embodiment.

FIG. 1 is a schematic illustration of an example processor architecture 100 that includes a host 102 coupled to a device 104 by a bus 106. In some embodiments, the bus 106 is a Peripheral Component Interconnect Express (PCIe) bus. The host 102 includes a Central Processing Unit (CPU) 108 and a host memory 110. The device 104 is a Parallel Processing Unit (PPU) having a plurality of cores that are organized into Streaming Multiprocessors (SMs) 112. Each SM 112 includes a group of cores 114, registers 116, and local memories 118. Each SM 112 further includes an instruction unit 120 and a shared memory 122. The device 104 further includes a Global Memory 124 and a Constant Memory 126 that can be accessed by any of the SMs 112.

The registers 116, local memory 118, shared memory 122, Global Memory 124, and Constant Memory 126 of the device 104 implement a multi-level memory hierarchy of the PPU. The Global Memory 124 may be a large memory with high latency relative to the registers 116, local memory 118, and shared memory 122, which may be smaller memories. The Constant Memory 126 may be a read only region of the Global Memory 124. In some embodiments, one or more elements of the multi-level memory hierarchy, such as the Global Memory 124, may be located off-chip, for example in a Synchronous Dynamic Random Access Memory (SDRAM) coupled to the device 104. In some embodiments, the device 104 may be included in a system-on-a-chip (SoC) along with one or more other logic units, such as a reduced instruction set computer (RISC) CPU, a memory management unit (MMU), analog-to-Digital (AD) and digital-to-analog (DA) converters, etc.

The processor architecture 100 and/or the device 104 may be included in a desktop computer, a laptop computer, a tablet computer, a smart-phone (e.g., a wireless, hand-held device), a personal digital assistant (PDA), a digital camera, etc. For example, the device 104 may be included on a graphics card. The graphics card may be configured to interface with a PCIe slot on a motherboard of the desktop or other computer that may include the CPU 108 and the host memory 110. The motherboard may further include PCIe interfaces, such as a northbridge chipset and a southbridge chipset. In some embodiments, the device 104 may be an integrated graphics processing unit (iGPU) included in the chipset of a motherboard.

Exemplary PPUs include the GeForce family of GPUs from Nvidia Corp., the Radeon family of GPUs from Advanced Micro Devices, Inc., and the PowerVR family of GPUs from Imagination Technologies Ltd., among others. Exemplary embedded PPU SoCs, include Nvidia's Tegra K1 SoC, the VideoCore multimedia processor from Broadcom Corp. of Irvine, Calif., the Adreno family of GPUs and the Snapdragon family of SoCs both from Qualcomm Inc. of San Diego, Calif., among others.

To facilitate the creation of computer programs to be run on PPUs, such as a GPU, predefined heterogeneous programming models have been developed. Nvidia for example created the Compute Unified Device Architecture (CUDA). CUDA is a heterogeneous programming model that includes extensions to standard programming languages, such as C, C++, and Fortran, compiler directives, an Application Programming Interface (API), and CUDA-accelerated libraries. A programmer can create a CUDA-compatible program by writing both device functions, called kernels, that are concurrently executed, e.g., executed in parallel, by the GPU, and host functions, that are sequentially executed, e.g., executed serially, by the CPU. A CUDA program also defines the number of parallel workers, in terms of threads, e.g., threads of execution, and thread blocks, for each kernel. A block is a group of threads scheduled to a Streaming Multiprocessor (SM). Nvidia also created a CUDA compiler, called nvcc, which separates a CUDA program into host code components and device code components. The host code components include host functions and the device code components include kernels, which are functions executed on the GPU.

Each kernel of the CUDA program is executed by a collection of thread blocks also referred to as blocks. The blocks executing a kernel are mapped to an SM, and the threads are mapped to the cores of the PPU, e.g., GPU. The threads in a kernel are executed in groups called warps, where a warp is a unit of execution. The cores of an SM share a single instruction unit and the threads of a warp are executed on the cores. All the threads of a warp execute the same instruction. The threads within a block synchronize among themselves through CUDA synchronization primitives, and communicate with each other through the shared memory that is available to the block. The threads have access to various memories at different levels in the PPU's memory hierarchy.

The collection of blocks executing a kernel is called a grid. Grids may be one or two dimensional. A CUDA variable called 'gridDim' specifies the dimension of a grid. The threads in a block can be arranged in one, two, or three dimensional arrays. A CUDA variable called 'blockDim' specifies the dimension of a block in the x, y, and z dimensions. Each thread in a block is uniquely identified by its thread identifier (id) (threadIdx) within its block and each block is uniquely identified by its block id (blockIdx).

Figure 2:
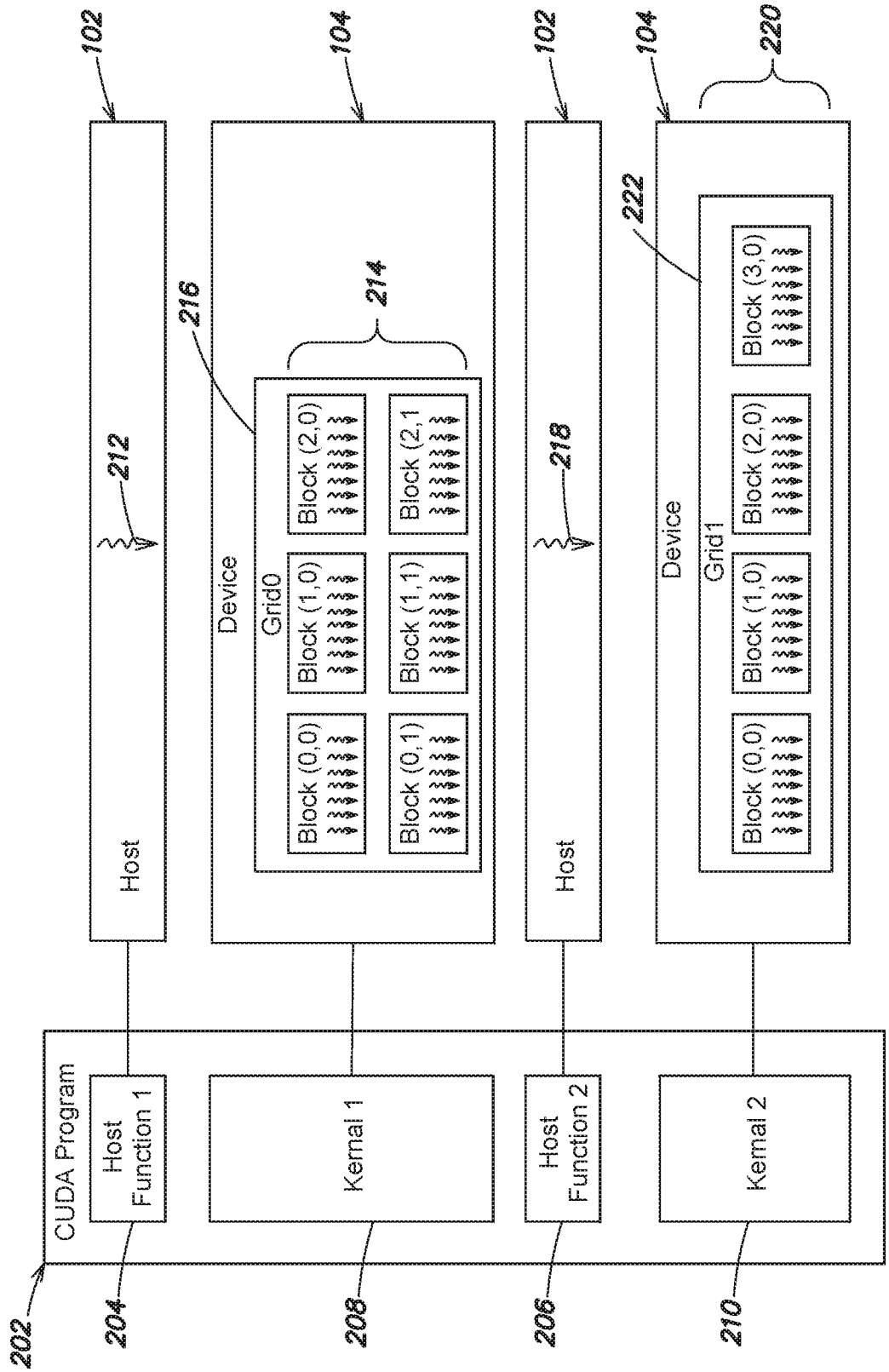
FIG. 2 is a schematic illustration of an exemplary Compute Unified Device Architecture (CUDA) programming model in accordance with an embodiment.

FIG. 2 is a schematic illustration of an example execution of a CUDA program 202 whose components are executed by the host 102 or the device 104. The CUDA program 202 employs a single instruction multiple threads (SIMT) model of execution. The CUDA program 202 includes a plurality of host functions, for example, Host Function 1 204 and Host Function 2 206, and a plurality of device functions, for example, Kernel1 208 and Kernel2 210. The CUDA program 202 may run on the host 102, and the kernels may be launched by the host 102 and run on the device 104. For example, a single thread 212 running on the host 102 may serially execute the Host Function 1 204. A 2D group of blocks 214 organized as a grid 216, identified as Grid0, running on the device 104 may execute Kernel1 208 in parallel. Another single thread 218 running on the host 102 may serially execute Host Function 2 206. A one-dimensional (1D) group of blocks 220 organized as another grid 222, identified as Grid1, running on the device 104 may execute Kernel 2 210 in parallel.

In some implementations, the execution flow of many CUDA programs can be as follows: declare and allocate host and device memory, initialize host data, transfer data from the host memory to device memory, load GPU code and execute the code in parallel on the GPU's cores, and transfer results computed by the GPU from device memory to host memory.

To declare a function as a kernel, a programmer can add the "_global_" CUDA qualifier to the function definition in the source program. If a function is being executed on the device, but will only be called from the device, then the programmer can use the "_device_" CUDA qualifier in the function definition in the source program. For functions that are executed on the host and callable from the host only, the programmer adds the "_host_" CUDA qualifier to the function definition in the source program. For functions that are executed on the device, but are callable from either the host or the device, the programmer adds the "_host_ _device_" CUDA qualifier to the function definition in the source program. These qualifiers instruct the compiler, e.g., nvcc, how to compile the respective function, e.g., for device execution or for host execution.

In CUDA, a programmer can allocate device memory in a source program using a 'cudaMalloc' runtime API routine. The programmer can direct data to be transferred to and from device memory using a 'cudaMemcpy' runtime API routine. An argument of cudaMemcpy API indicates the direction of data transfer. To free device memory allocated with a 'cudaMalloc' API, a 'cudaFree' runtime API routine is called.

In CUDA, device operations, e.g., kernels and data transfers, run in a stream. Streams may have no connection or relation to the SMs of a PPU. A particular stream may be specified for a given kernel or data transfer. Kernels running in different streams can run concurrently. When no stream is specified, the kernel or data transfer may run in a default stream. The default stream is a synchronizing stream with respect to operations on the device. In particular, no operation in the default stream may begin until all previously issued operations in any stream on the device have completed, and an operation in the default stream must complete before any other operation (in any stream on the device) may begin. The CPU may execute CPU code concurrently with the default stream.

To synchronize the host to the device, a 'cudaDeviceSynchronize' API routine may be used, which may block execution on the host until all issued CUDA calls are complete. To synchronize the host with respect to a specific stream, a 'cudaStreamSynchronize(stream)' API may be used, which may block the host until all issued CUDA calls in the identified stream are complete.

A programmer may cause a defined or declared kernel to be launched by adding the following statement in the source program:

kernel_name<<<G, B, T, StreamNumber>>>(input arguments)

where G specifies the number, e.g., dimension, of grids,
B specifies the number of thread blocks,
T specifies the number of threads in each block, and
StreamNumber specifies the stream.

FIGS. 1 and 2 and the descriptions thereof are intended for illustrative purposes. It should be understood that PPUs and heterogeneous programming models may take other forms.

For example, in addition to CUDA, other predefined heterogeneous programming models or frameworks that support sequential execution of serial code, e.g., on a host, and concurrent execution of parallel code, e.g., on a device, include Open Accelerators (openACC), Open Computing Language (OpenCL), which is an open standard maintained by Khronos Group, Inc. of Beaverton, Oreg., and DirectCompute from Microsoft Corp. of Redmond, Wash., among others.

It can be difficult for programmers, developer, and other users to determine what portions of a program should be executed on a PPU, such as a GPU. It can also be difficult to select the grid dimension, number of blocks, and number of threads per block to execute a kernel in an efficient manner, and to assign kernels to streams. In addition, including unnecessary memory transfers between the host and device can eliminate the efficiencies gained by executing a portion of a program on the PPU. As a result, the high computing power of GPUs may be under-utilized and/or not fully realized for a given program. This can result in the program not executing as efficiently, as it might otherwise execute; for example, it may run slower.

SUMMARY

Briefly, the present disclosure relates to systems and methods for automatically generating code, e.g., CUDA code, from a source program, where the generated code may be compiled and executed on a target processor architecture that may include a host and a device having a Parallel Processing Unit (PPU), e.g., a Graphics Processor Unit (GPU). An example of a source program is a textual and/or graphical program, such as a C/C++ program, a program in the MATLAB programming environment, a Python program, etc. The source program may be in a format for sequential execution, parallel execution, or a combination of sequential and parallel execution. The automatically generated code may include kernel definition and launch code, specify the number of thread blocks and the number of threads per block for the kernels, optimize the number of data transfers between the host and the device, and efficiently utilize the device's memory hierarchy, among other advantages. Furthermore, a user does not have to hand code kernels for GPU execution.

In some implementations, the systems and methods may automatically identify regions of a source program, such as functions, that may be suitable for execution on the device. The systems and methods may apply a parallel loop analysis check to confirm whether an identified region can be executed on the device. For example, the systems and methods may look for the occurrence of for-loops within one or more in-memory intermediate representations (IRs) generated for the source program, and determine whether the for-loops are parallel. The systems and methods may also apply one or more optimizations that modify portions of the IRs of the source program into forms suitable for execution on the device. For example, the systems and methods may convert a mathematical or other operation included in an IR of the source program into a form that includes one or more parallel for-loops. The systems and methods may also identify portions of an IR of the source program that can be replaced with calls to a predefined PPU-optimized library, such as the GPU-Accelerated Libraries from Nvidia. The systems and methods may partition an IR of the source program into segments to be executed on the host and segments to be executed on the device. The systems and methods may create kernels for the segments to be executed on the device. The systems and methods may also select the dimension, number of blocks, number of threads per block, and stream number for the kernels. The systems and methods may also analyze the use of variables within the source program through examination of one or more of the IRs, and may determine a reduced set of memory transfers between the host and device. The systems and methods also may modify one or more of the IRs of the source program to efficiently utilize the PPU's memory hierarchy.

Code, such as CUDA code, may be generated, for example by a back-end unit, from a final IR produced for the source program. The generated code may include kernel creation and memory transfer declarations, and may be provided to a compiler. The compiler may generate an executable from the generated code. The executable may be loaded on and executed by a processor architecture that includes a PPU, such as a GPU.

Figure 3:
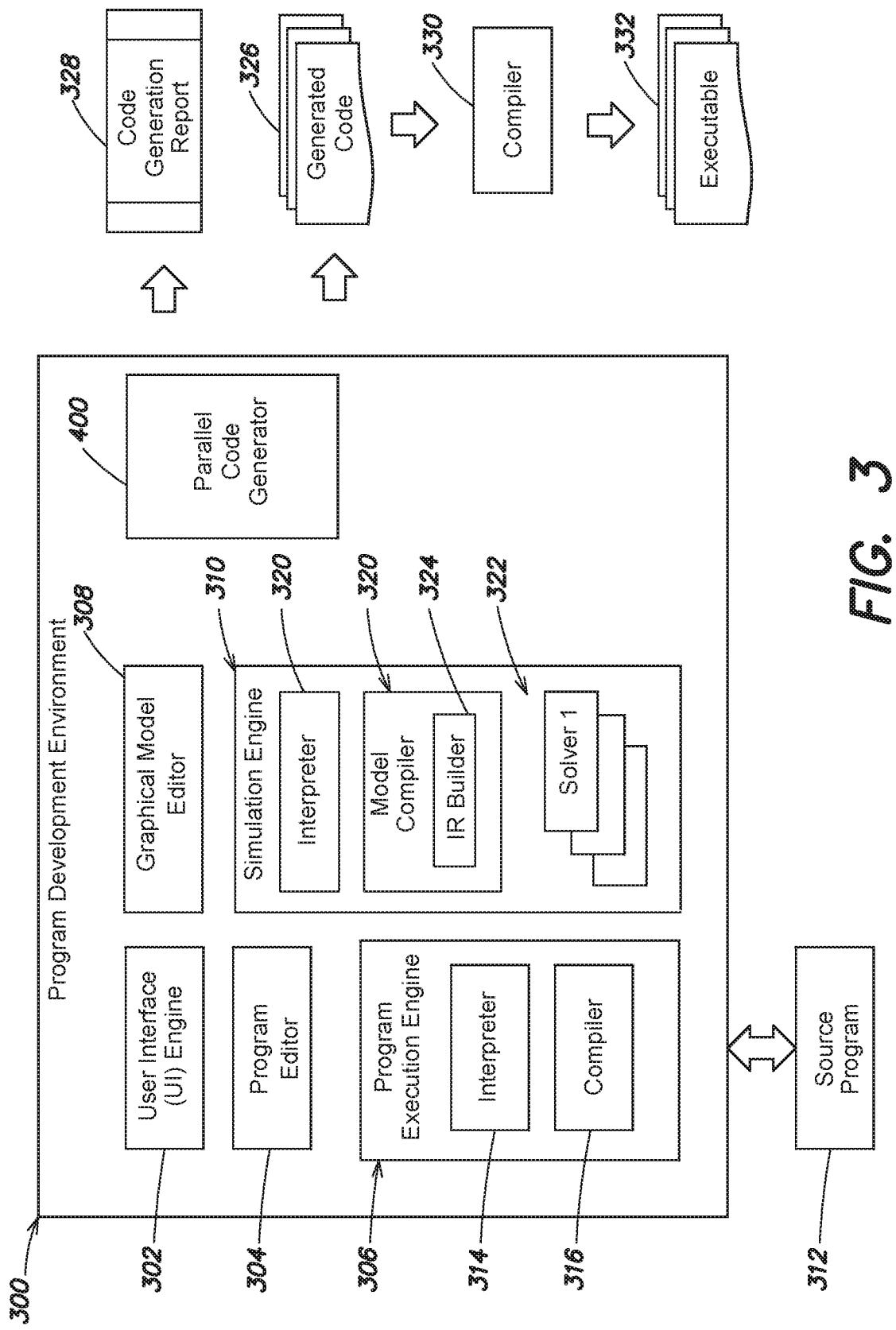
FIG. 3 is a schematic illustration of an example program development environment in accordance with an embodiment.

FIG. 3 is a schematic illustration of an example of a program development environment 300 in accordance with an embodiment. The program development environment 300 may include a User Interface (UI) engine 302, a program editor 304, a program execution engine 306, a graphical model editor 308, a simulation engine 310, and a parallel code generator 400.

The UI engine 302 may create and present one or more User Interfaces (UIs), such as Graphical User Interfaces (GUIs) and/or Command Line Interfaces (CLIs), on a display of a workstation or other data processing device. The UIs may be operated by a user to initiate various program development-related tasks. For example, a user may open, write, edit, and save a source program, which tasks may be performed by the program editor 306 in response to user inputs. The UIs also may be operated to open, construct, edit, and save source programs in the form of graphical models, such as executable block diagrams, and the graphical model editor 308 may perform the selected operations in response to user inputs. The program execution engine 306 and/or the simulation engine 310 may be used to run and/or execute a source program, such as source program 312.

The source program 312 may be in source code format, and may have been manually created, e.g., written, by one or more users, such as programmers or developers or automatically generated for example from a graphical model. The source program 312 may be written in conformance with the semantics and syntax of a programming language, such as the MATLAB program development environment, the C/C++ is programming languages, the Python programming language, etc. The source program 312 as prepared by the user may not include any parallel code, e.g., CUDA code or OpenCL code. For example, the source program 312 may not include any CUDA or OpenCL declarations. Instead, the source program 312 may include only code having a format for serially execution, where a serially execution may include execution on a single or multicore CPU and may not include execution on a PPU. A CPU may include a few cores that are optimized for sequential serial processing, while a PPU may have a massively parallel architecture consisting of thousands of smaller, tightly coupled cores designed for handling multiple tasks simultaneously.

The program execution engine 306 may include an interpreter 314 and/or a compiler 316. In some embodiments, the compiler 316 may be a just-in-time (JIT) compiler that converts the source program 312 from source code into machine-executable code or virtual-machine executable code.

The simulation engine 310 may include an interpreter 318, a model compiler 320, and one or more solvers, designated at 322. The model compiler 320 may include one or more Intermediate Representation (IR) builders, such as IR builder 324. The simulation engine 310 may execute, e.g., compile and run or interpret a source program that is in the form of a graphical model using one or more of the solvers 322. Exemplary solvers include one or more fixed-step continuous solvers, which may utilize integration techniques based on Euler's Method or Heun's Method, and one or more variable-step solvers, which may be based on the Runge-Kutta and Dormand-Prince pair.

As described herein, the parallel code generator 400 may generate code, such as code 326, for the source program 312 or portion thereof automatically. The parallel code generator 400 also may generate a code generation report 328. The generated code 326 may conform to a parallel programming framework, such as CUDA or OpenCL, among others. The generated code 326 may be provided to a compiler 330, such as Nvidia's nvcc compiler, which may translate the generated code 326 into executable code 332.

Suitable program development environments include the MATLAB® programming system and the Simulink® model-based design system both from The MathWorks, Inc. of Natick, Mass., the LabVIEW programming system from National Instruments Corp. of Austin, Tex., the MatrixX modeling environment from National Instruments Corp., the Visual Engineering Environment (VEE) from Agilent Technologies, Inc. of Santa Clara, Calif., a Unified Modeling Language (UML) system, a Systems Modeling Language (SysML) system, a C or C++ programming system, a Python programming system, and the JuliaPro computing system, among others. The MATLAB® and Simulink® environments provide a number of high-level features that facilitate algorithm development and exploration, and support model-based design. Exemplary high-level features include dynamic typing, array-based operations, data type inferencing, sample time inferencing, and execution order inferencing, among others.

The source program 312 may be a textual program, a graphical model, or a combination textual/graphical program. Suitable text-based source programs include MATLAB programs, C programs, C++ programs, Fortran programs, Java programs, Mathematica programs, Python programs, Julia programs, ADA programs, Octave programs, and MathScript programs, among others. Suitable graphical models include Simulink models, Stateflow charts, LabVIEW block diagrams, MatrixX models, Scade models, and Agilent VEE diagrams, among others. Other forms of the source program 312 include Modelica models from the Modelica Association, Uniform Modeling Language (UML) models, and Systems Modeling Language (SysML) models, among others.

For example, a code generator may generate code, such as C code or C++ code from a graphical model. The parallel code generator 400 may generate parallel code from this C or C++ code. In other embodiments, a graphical model may include or incorporate textual code, such as one or more files containing MATLAB code, C code, C++ code, etc. The parallel code generator 400 may generate parallel code for this textual code included in a graphical model.

Figure 4:
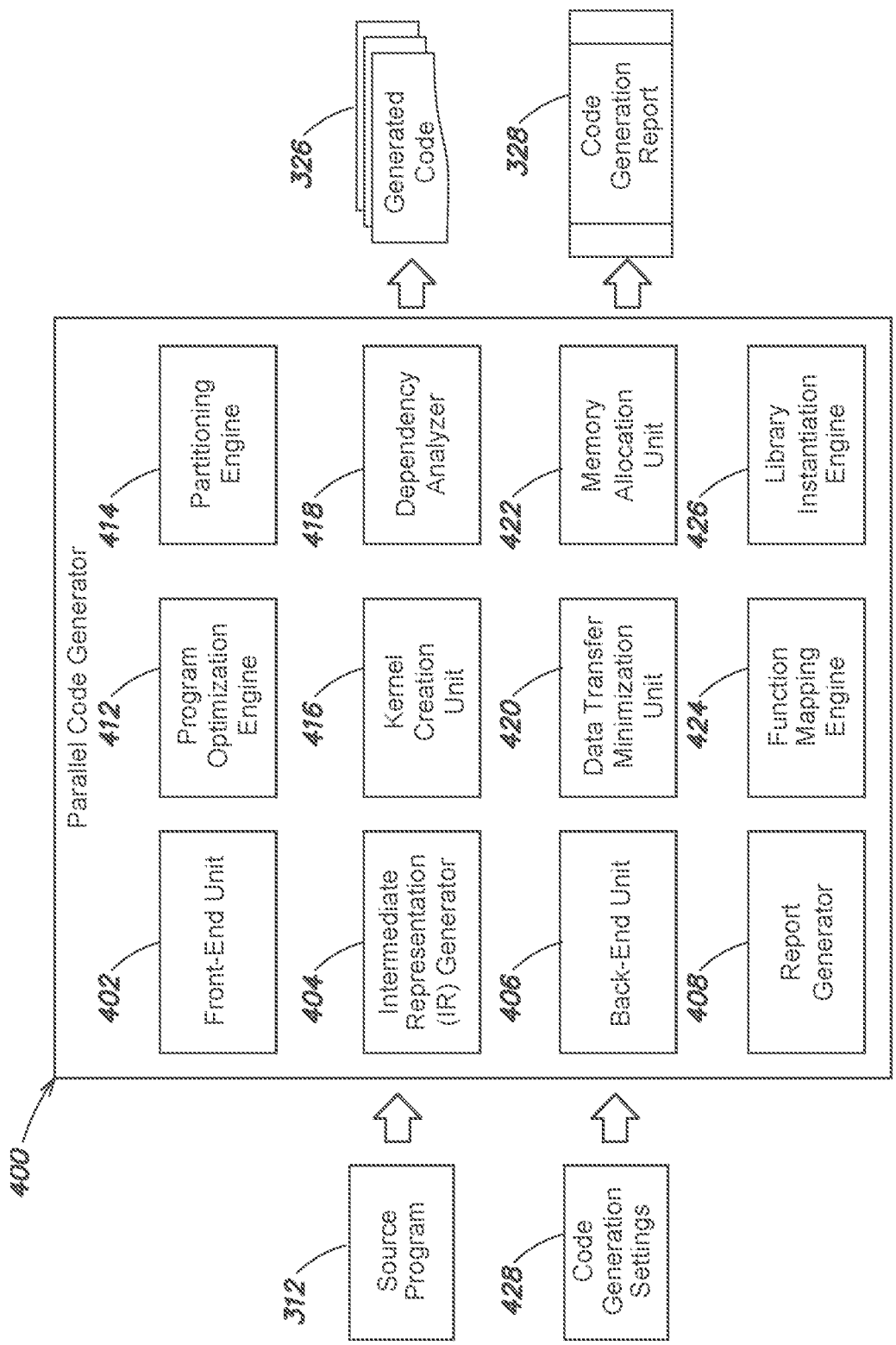
FIG. 4 is a schematic illustration of an example code generation system in accordance with an embodiment.

FIG. 4 is a schematic illustration of an example of the parallel code generator 400 in accordance with an embodiment. The parallel code generator 400 may include a front-end unit 402, an intermediate representation (IR) generator 404, a back-end unit 406, a report generator 408, a program optimization engine 412, a partitioning engine 414, a kernel creation unit 416, a dependency analyzer 418, a data transfer minimization unit 420, a memory allocation unit 422, a function mapping engine 424, and a library instantiation engine 426.

The parallel code generator 400 may access and/or receive the source program 312. The parallel code generator 400 may also receive one or more code generation settings, as indicated at 428. The parallel code generator 400 may generate the generated code 326 automatically, which may be compiled and executed by a processor architecture that includes one or more Parallel Processing Units (PPUs). The report generator 408 may generate the code generation report 328. In some embodiments, the generated code 326 automatically produced by the parallel code generator 400 may look like a modified version of the source program 312, for example modified to include kernel creation and kernel launch statements, among other changes.

The parallel code generator 400 and/or one or more of its parts or components may comprise registers and combinational logic configured and arranged to produce sequential logic circuits. In some embodiments, the parallel code generator 400 may be implemented through one or more software modules or libraries containing program instructions pertaining to the methods described herein, that may be stored in memory and/or on computer readable media, and may be executed by one or more processors. Other computer readable media may also be used to store and execute these program instructions. In alternative embodiments, various combinations of software and hardware, including firmware, may be utilized to implement the present invention.

FIGS. 3 and 4 are intended for illustrative purposes and the present disclosure may be used with other programming environments and code generation systems. For example, in some embodiments, the code generator system 400 may be separate from the program development environment 300.

High-Level Flow Diagram

FIGS. 5A-D are partial views of a flow diagram of an example method in accordance with an embodiment. The flow diagram of FIGS. 5A-5D is meant for illustrative purposes only. For example, in some embodiments, one or more steps may be omitted, additional steps may be added, the order of steps may be changed, and/or one or more sequences indicated by the arrows may be omitted. The parallel code generator 400 may access or receive a source program, such as the source program 312, or a portion thereof for which parallel code is to be automatically generated, e.g., the generated code 326, as indicated at step 502. Examples of parallel code include CUDA or OpenCL compatible source code. The source program 312 or portion thereof may be accessed from memory, such as the main memory of a workstation or other data processing device. The parallel code generator 400 also may receive one or more settings, such as the code generation settings 428, for guiding or controlling the code generation process for the source program, as indicated at step 504. The options may indicate the target language of the generated code 326, such as CUDA code, OpenCL code, etc., memory implementation options, such as discrete or unified memory, the identity of a compiler tool chain, such as Nvidia's nvcc compiler or the OpenCL compiler, etc. It should be understood that other settings or options may also be specified and received by the parallel code generator 400.

The front-end unit 402 may perform a number of preliminary tasks on the source program 312, as indicated at step 506. For example, the front-end unit 402 may perform type checking and lexical analysis of the source program 312, among other preliminary tasks. The IR generator 404 may translate the received source program 312 (or portion thereof) into one or more intermediate representations (IRs), as indicated at step 508. One or more of the IRs constructed by the IR generator 404 may be in a form that is source and target language independent, such that operations and data contained within such IRs are not specific to the programming language in which the source program 312 was written.

In some embodiments, the IR generator 404 may be included in the front-end unit 402. In other embodiments, the parallel code generator 400 may utilize the IR builder 324 of the model compiler 320 to construct in-memory representations of the source program 312, rather than having its own IR generator 404.

The front-end unit 402 and/or the IR generator 404 may be configured to translate source programs conforming to a variety of different programming languages to the one or more IRs. That is, the front-end unit 402 and/or the IR generator 404 may be capable of translating programs written in these various programming languages into the one or more IRs. In some embodiments, the source program 312 may be sequential source code.

In some embodiments, one or more IRs may be graph-based, object-oriented structures. For example, the IRs may be in the form of a hierarchical Data Flow Graph (DFG) and/or a Parallel Intermediate Representation (PIR), which may include a plurality of IR objects, such as nodes, which may represent operators of the source program 312, interconnected by edges, which may represent data flow. The nodes of the PIR may present components corresponding to portions of the source program 312, such as functions and/or operations, and the edges may represent data and/or control flow. Graphical models may represent hierarchy through special model elements or blocks. For example, in the Simulink model-based environment, hierarchy can be created through subsystem blocks and model reference blocks. An IR, such as a PIR, may include special nodes, such as network instance components (NICs), to provide hierarchy in the PIR, for example, by abstractly representing subsystems and/or model reference blocks, among other hierarchical program elements.

The IRs and/or one more nodes of the IRs may be implemented as a syntax tree, Abstract Syntax Tree (AST), Direct Acyclic Graph (DAG), Control Flow Graph (CFG), Control Data Flow Graph (CDFG), program structure tree (PST), etc., or combinations thereof. A CDFG may capture the control flow as well as the data flow of a source program through data dependency and control dependency edges. One or more of the IRs may be referred to as a Code Generation Intermediate Representation (CGIR). The CGIR may include nodes that may represent blocks of program statements and edges that may represent control flow. The IRs may be stored in memory, such as a main memory or a persistent memory of a data processing device. Starting with an initial IR for the source program 312, the IR generator 404 may apply transforms, optimizations, or other compilation operations, thereby creating a series of IRs. For example, high-level functions, such as a Fast Fourier Transform (FFT), Finite Impulse Response (FIR), and other high-level functions included in the source program, may be lowered and represented in the IRs by lower-level operations and ultimately by base level operations, such as mathematical operations.

Suitable tools for translating a source program into one or more IRs include the MATLAB Coder and the Simulink Coder products from The MathWorks, Inc., the TargetLink product from dSpace GmbH of Paderborn Germany, and the QGen code generator from AdaCore of New York, N.Y. Nonetheless, other code generation systems and other compilers may be used.

In some implementations, the parallel code generator 400 may start its processing on an initial IR created for the source program 312. The parallel code generator 400 may perform one or more operations on the initial IR, which may in some cases result in the creation of an intermediary IR. Further processing by the parallel code generator 400 may be performed on the intermediary IR creating additional intermediary IRs. When processing by the parallel code generator 400 is complete, a final IR may be produced. The final IR may be in a form from which the parallel code generator 400 may directly output the generated code 326.

In other implementations, a single IR may be created for the source program 312, and this single IR may be processed by the parallel code generator 400 until it is in a form from which the generated code 326 may be produced. Accordingly, the term IR as used herein is intended to broadly cover all such initial, intermediary, final, and single-form IRs.

The partitioning engine 414 may analyze one or more of the IRs generated for the source program 312 and identify regions in the one or more IRs that are parallel and thus suitable (at least preliminarily) for mapping to a PPU for execution, as indicated at step 510. For example, the partitioning engine 414 may identify functions, commands, subroutines, etc. included in the source program 312 that may be executed in parallel. Examples of parallel regions that may be identified in the one or more IRs for the source program 312 include loops, such as for-loops, element-wise matrix or vector math operations, scatter-gather or reduction type operations, code sections that match predefined design patterns, and functions that map to functions defined within a PPU library, among others, as described herein.

Figure 5A:
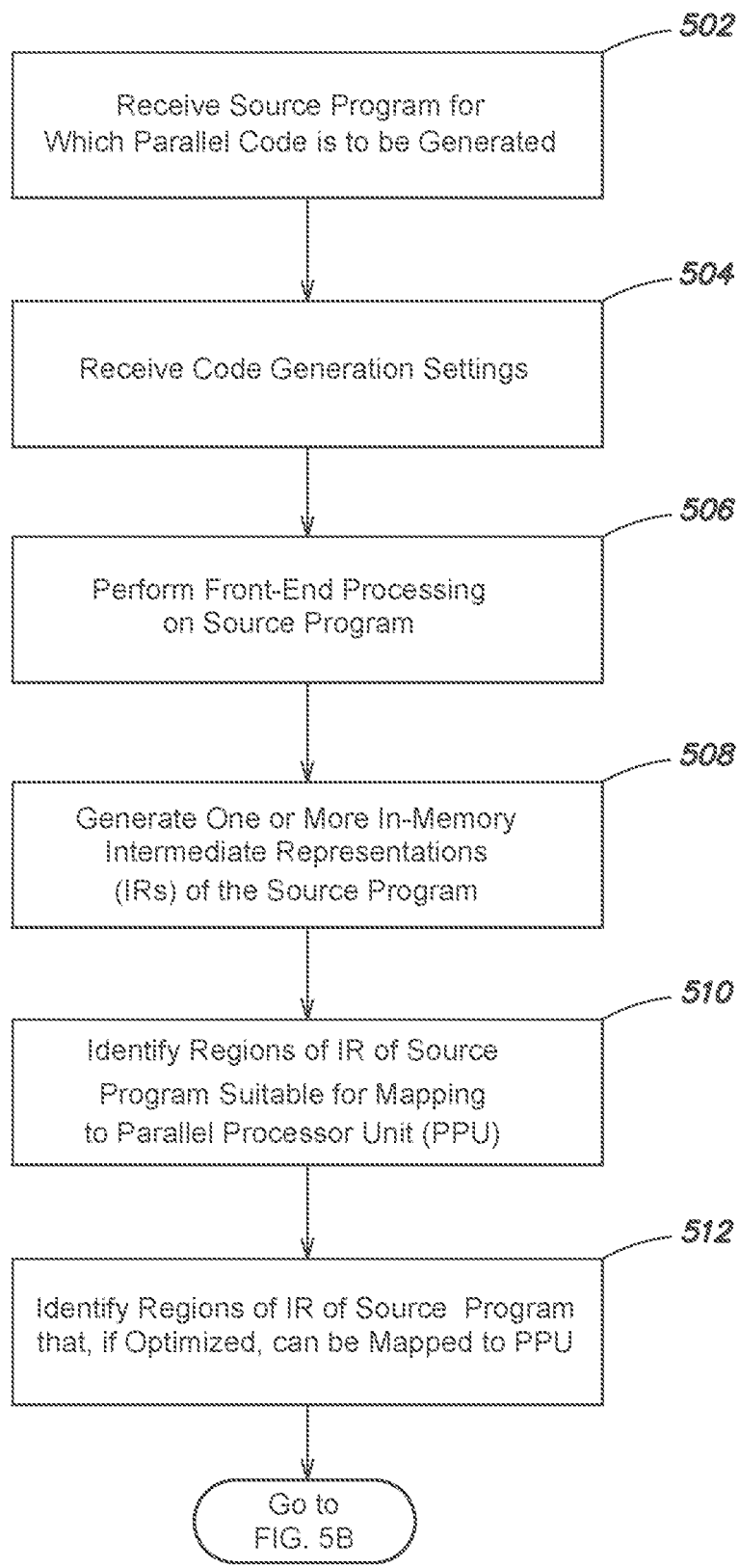
FIGS. 5A-D are partial views of a flow diagram of an example method in accordance with an embodiment.
Figure 5B:
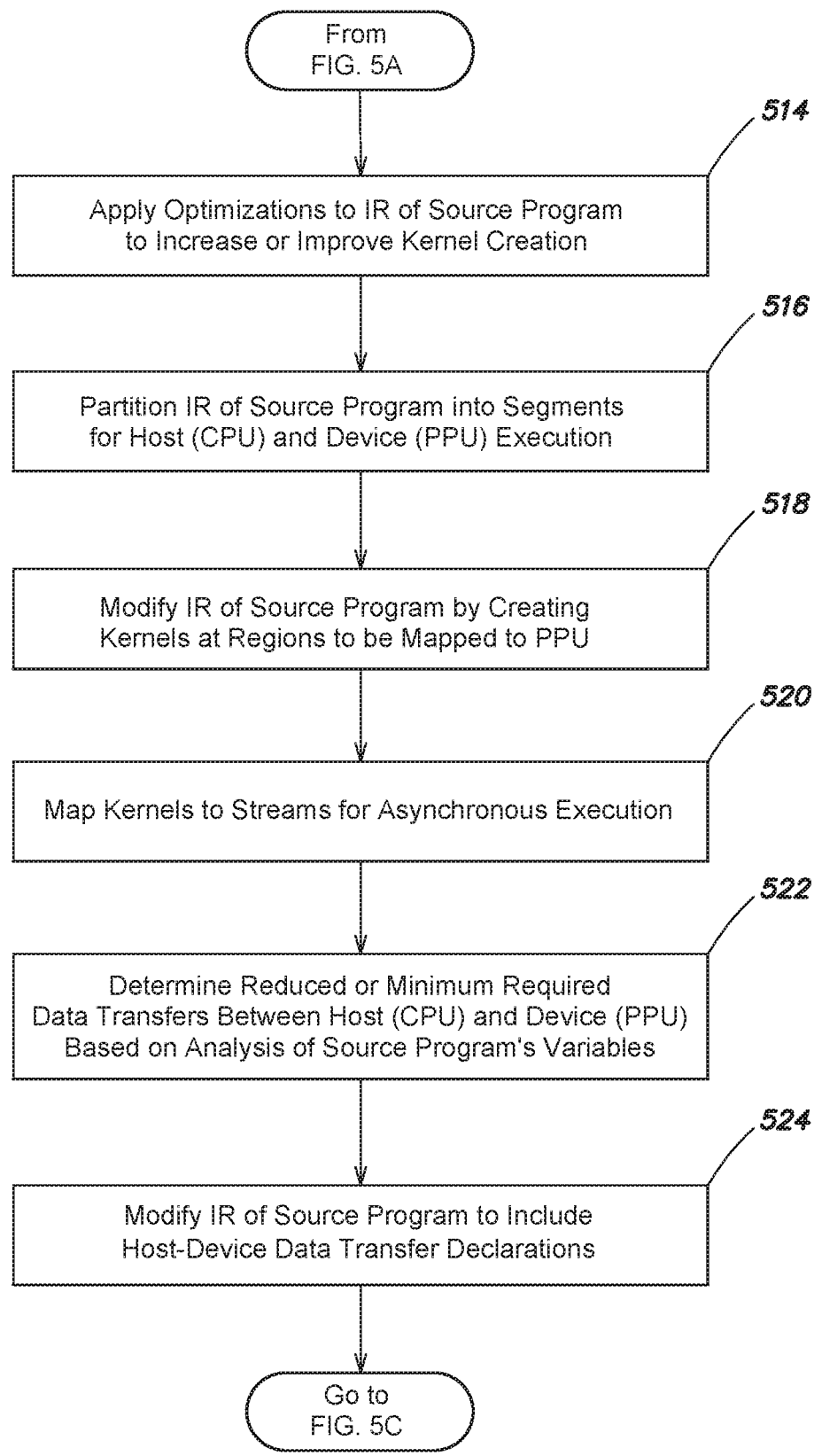

The partitioning engine 414 and/or the optimization engine 412 also may identify parallelizable regions of the one or more IRs for source program 312, e.g., regions that, if modified, can be executed in parallel, as indicated at step 512. The optimization engine 412 also may modify one or more of the identified regions to make them suitable for parallel execution and/or to improve kernel creation, as indicated at step 514 (FIG. 5B). The one or more optimizations may parallelize an identified region, such as by converting a while-loop to a for-loop, fusing loops, or perfecting loops, as described herein.

The partitioning engine 414 may partition one or more of the IRs into segments for host (CPU) and device (PPU) execution, as indicated at step 516. For example, the regions identified as suitable for parallel execution may be partitioned into the segments to be executed by the device (PPU), while other regions may be partitioned for execution by the host (CPU). The kernel creation unit 416 may create kernels within one or more IRs of the source program for the segments to be executed by the device (PPU), as indicated at step 518. For example, the kernel creation unit 416 may modify the one or more IRs of source program 312 by adding CUDA or OpenCL declarations that define and launch kernels.

The kernel creation unit 416 also may map, e.g., assign, the created kernels to streams for concurrent and asynchronous execution by the PPU, as indicated at step 520. The memory allocation unit 422 may analyze the source program 312 and determine a reduced or minimum of data transfers between the host (CPU) and device (PPU), as indicated at step 522. The determination may be based on an analysis of the source program's variables through analysis of the one or more IRs. The memory allocation unit 422 also may modify the one or more IRs of the source program by adding CUDA or OpenCL memory transfer declarations, as indicated at step 524.

Figure 5C:
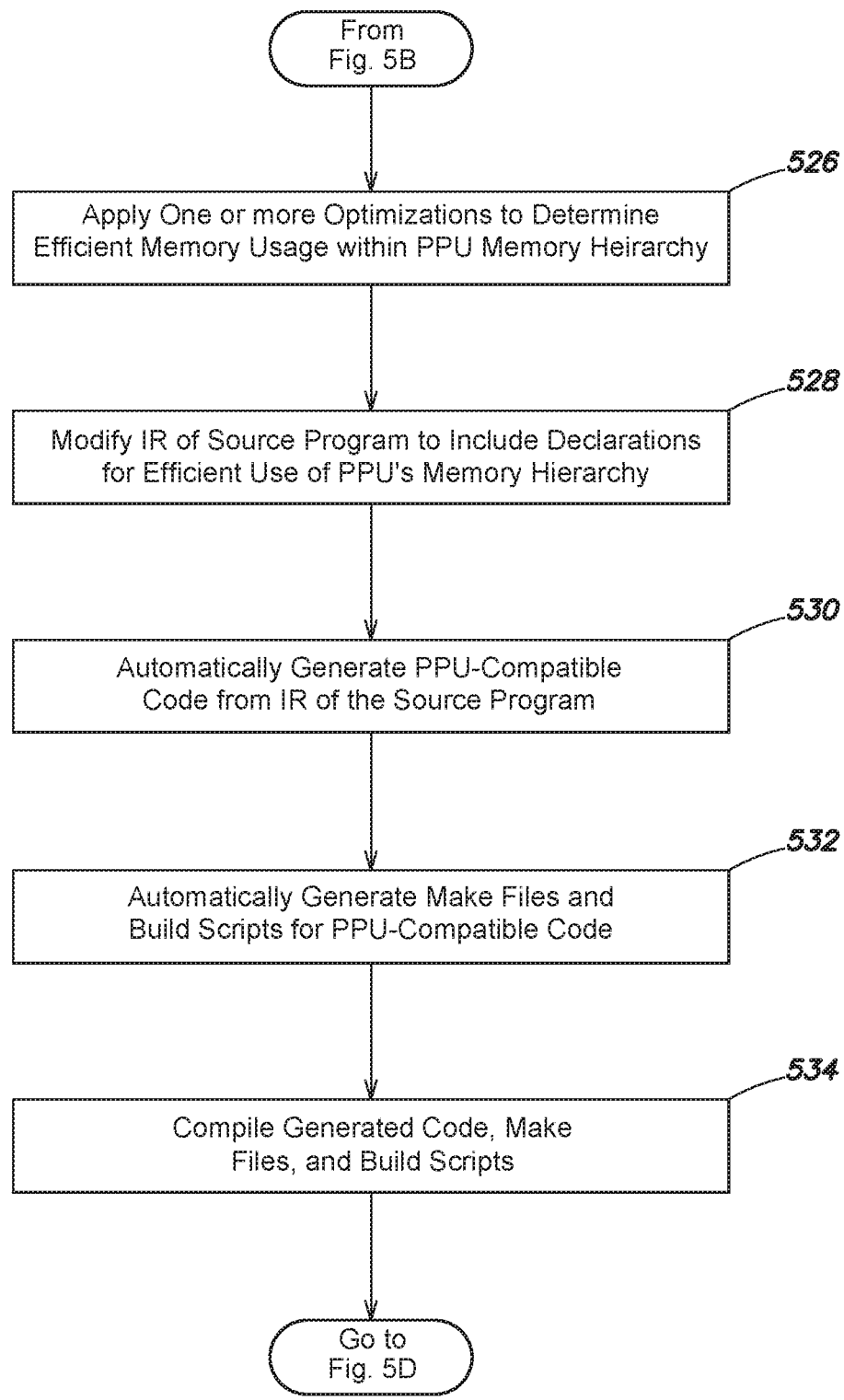

The program optimization engine 412 and/or the memory allocation unit 422 may apply one or more optimizations to the one or more IRs of source program 312 to determine efficient usage of the PPU's memory hierarchy, as indicated at step 526 (FIG. 5C). The program optimization engine 412 and/or the memory allocation unit 422 also may modify the one or more IRs of source program 312 to implement the optimizations to the usage of the PPU's memory hierarchy, as indicated at step 528. For example, program optimization engine 412 and/or the memory allocation unit 422 may search for kernels having a data-locality characteristic, such as accessing a same data element by multiple threads, and modify the created kernels to provide collaborative loading of data to the PPU's shared memory, implement thread reuse, etc., as described herein.

The back end unit 406 may automatically generate PPU-compatible code for the source program 312, e.g., the generated code 326, for example from a CGIR form of IR, as indicated at step 530. For example, the parallel code generator 400 may generate CUDA or OpenCL source code from the source program 312. In some embodiments, the back-end unit 406 also may generate make files and build scripts, as indicated at step 532.

Figure 5D:
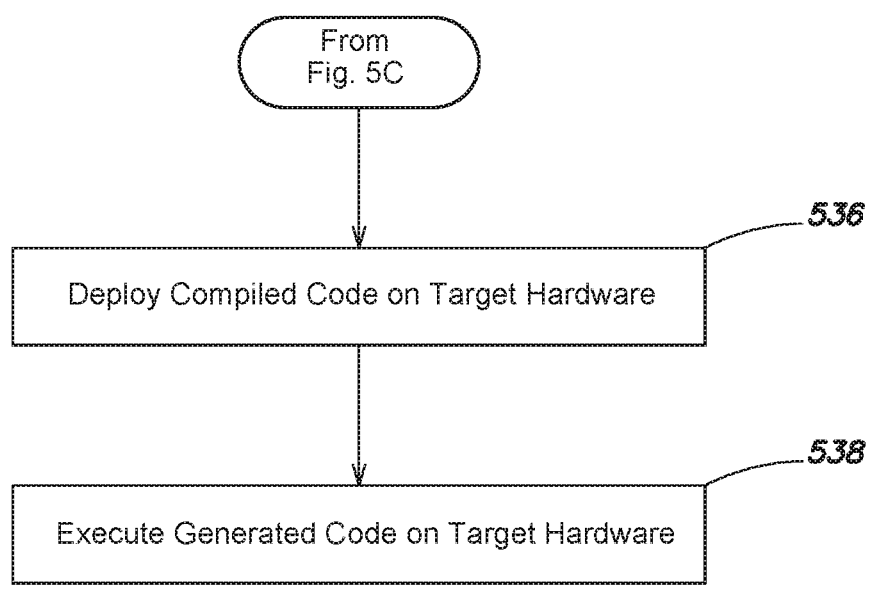

A compiler, such as the compiler 330, may compile the generated code, as indicated at step 534. The compiled code may be deployed on target hardware, as indicated at step 536 (FIG. 5D). The compiled code may be executed on the target hardware, as indicated at step 538. As noted, one or more steps of the flow diagram of FIGS. 5A-5D may be omitted, for example steps 534-538 may be omitted in some embodiments.

The generated code 326 produced by the parallel code generator 400 may be a version of the source program 312 modified to include PPU directives defining and launching kernels and transferring memory between the PPU and CPU. The generated code 326 may further include build scripts and makefiles.

The compiler 330 may compile the generated code 326 to create a standalone executable (e.g., a .exe file), a shared library (e.g., a .lib or .dll file), a MEX file, or a file format for use in Processor in the Loop (PIL) testing, among others. A MEX file may be a C, C++, or Fortran subroutine that is callable from the MATLAB command line in the same manner as a built-in MATLAB function.

Kernel Creation

Kernels may be created for the regions identified as being parallel. While the following describes the creation of kernels for particular types of regions, it should be understood that kernels may be created for other types of parallel regions identified in one of more of the IRs of the source program 312.

Explicit Loops

Programming languages may define a syntax for writing loops, such as for-loops, within programs. For example, the MATLAB program development environment uses 'for' and 'end' statements to define a for-loop. The commands within the for-loop are iterated a specific number of times, and an incrementing index variable keeps track of each iteration. In addition, loops, such as for-loops, may be nested within other for-loops, creating a nested loop. In some embodiments, the loops of a nested loop structure may be tightly nested. A programmer also may include a 'break' statement within a for-loop. During execution, if the break statement is reached, then the loop is exited.

Figure 6:
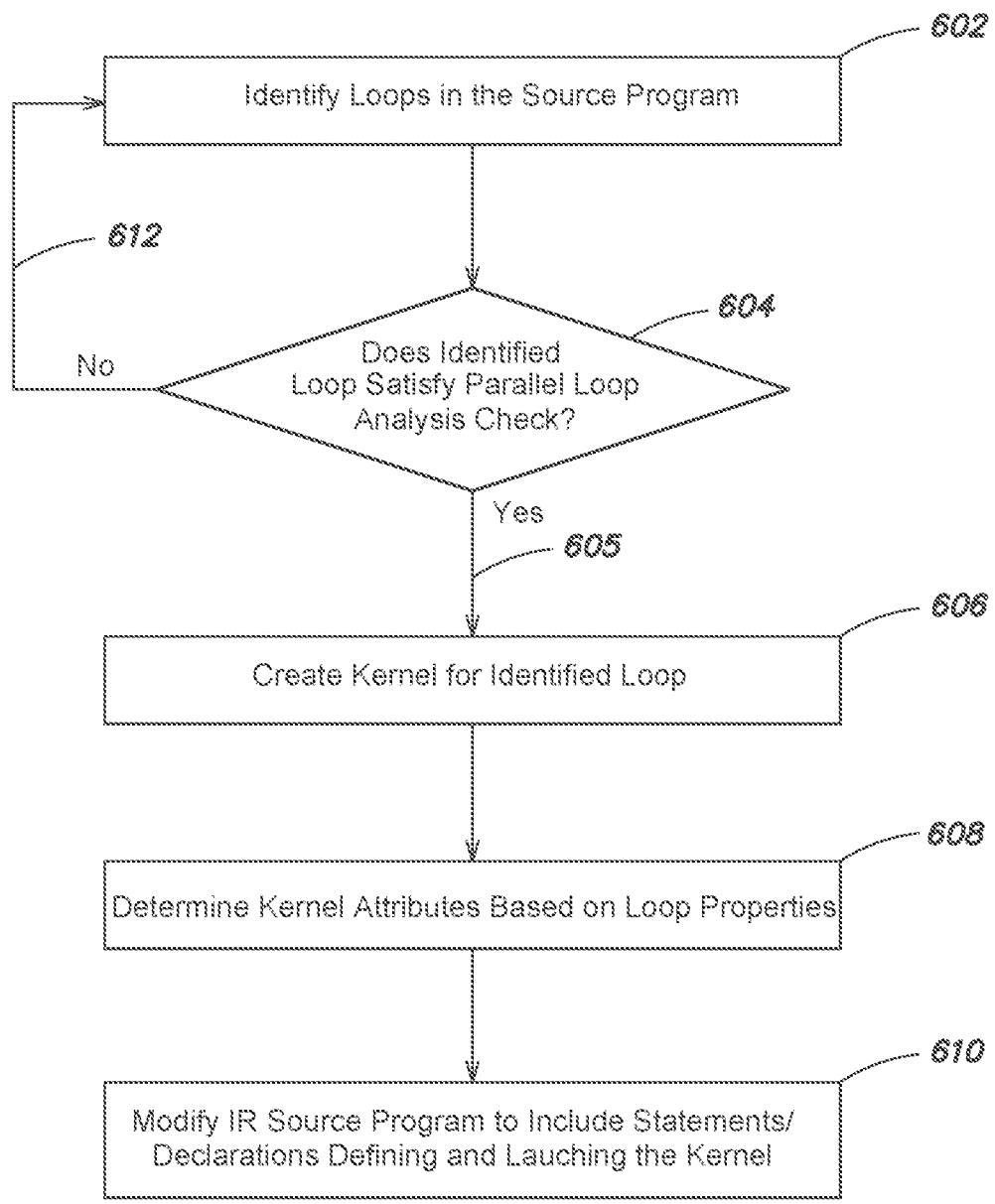
FIG. 6 is a flow diagram of an example method in accordance with an embodiment.

FIG. 6 is a flow diagram of an example method for creating kernels for explicit loops in accordance with an embodiment. The partitioning engine may identify explicit loops in the source program, as indicated at step 602. For MATLAB programs, for example, the partitioning engine may look for 'for' and 'end' statements. For source programs that utilize a different syntax to define for-loops, such as open brackets and close brackets, the partitioning engine will look for the occurrence of that syntax.

Parallel Loop Analysis Check

The partitioning engine 414 may determine whether an identified or subject for-loop satisfies a parallel loop analysis check, as indicated at decision step 604. The parallel loop analysis check may be used to determine whether the identified for-loop can be executed as a kernel. The parallel loop analysis check may determine (1) whether the iteration range of the for-loop is deterministic, and (2) whether every iteration of the for-loop is independent of every other iteration. If the identified for-loop passes the parallel loop analysis check, for example the answer to tests (1) and (2) is yes or true, then a kernel may be created for the for-loop, as indicated by Yes arrow 605 leading to step 606.

For a nested loop structure, the partitioning engine 414 may apply the parallel loop analysis check to each loop within the nested loop structure, and may also extend the parallel loop analysis check to additionally determine whether each loop forming the nested loop structure is independent of every other loop within the nest loop structure. For example, the partitioning engine 414 may additionally determine, for each loop within the nested loop structure, whether each iteration of that loop is independent of the other loops forming the nested loop structure. If all of the loops within the nested loop structure satisfy the parallel loop analysis check, then the nested loop structure may be designated as being parallel by the partitioning engine 414 and the kernel creation unit 416 may create a single kernel in the generated code 326 for the nested loop structure. If one or more of the loops within a nested loop structure do not satisfy the loop analysis check, then the partitioning engine 414 may designate a set of contiguous loops that did satisfy the parallel loop analysis check as being parallel. The kernel creation unit 416 may create a single kernel in the generated code 326 for that set of contiguous loops that satisfied the parallel loop analysis check. If there is more than one set of contiguous loops that satisfied the parallel loop analysis check, the kernel creation unit 416 may create a kernel for the set that results in the larger kernel, where the size of the kernel may be determined by the product of the loop bounds for each loop within the set.

Suppose for example a nested loop structure includes five for-loops labeled 1, 2, 3, 4, and 5 where loop 1 is the outermost loop and loop 5 is the inner most loop of the nested loop structure. Suppose further that loops 1, 2, 4, and 5 satisfy the loop analysis check, but that loop 3 fails the loop analysis check. The kernel creation unit 416 may create a parallel kernel for either loops 1 and 2 or for loops 4 and 5, e.g., the two sets of contiguous loops that satisfy the parallel loop analysis check. Suppose first that the product of loop bounds for loops 1 and 2 is larger than the product of loop bounds for loops 4 and 5. In this first case, the kernel creation unit 416 may create one kernel that executes loops 1 and 2 in parallel on the PPU, and may create another kernel that executes loops 3, 4, and 5 sequentially on the PPU. Suppose now that the product of loop bounds for loops 4 and 5 is larger than the product of loop bounds for loops 1 and 2. In this case, the kernel creation unit 416 may create one kernel that executes loops 4 and 5 in parallel on the PPU. Loops 1, 2, and 3 may run sequentially on the host, e.g., the CPU.

It should be understood that other criteria may be used to select the set of loops for which one or more kernels is created. For example, other criteria include selecting the set having the loop with the largest loop bounds and selecting the set based on computation load of the sets, such as the set having a highest or largest computation load, among others.

In some embodiments, the kernel creation unit 416 may create a first kernel to execute loops 1 and 2 in parallel on the PPU, and may create a second kernel that is launched from the first kernel to execute loops 4 and 5 in parallel on the PPU. Here, the size of the first kernel is the product of loop bounds of loops 1 and 2. The size of the second kernel is the product loops bounds of loops 4 and 5. Loop 3 runs sequentially in the first kernel.

The kernel creation unit 416 may determine kernel attributes for the identified for-loop, as indicated at step 608. The determined kernel attributes may include grid dimension, number of blocks, and number of threads, and may be derived based on an analysis of the identified for-loop. Grid dimension, number of blocks, and number of threads per block may be determined from the number of iterations of the identified for-loop. The number of iterations may be a function of one or more variables of the identified for-loop. For example, the number of iterations may be determined based on the size of one or more of the variables. Based on the size of the variables that determine the number of iterations of the identified for-loop, the kernel creation unit selects the grid dimension, number of blocks, and number of threads per block. For example, for a set p of nested for-loops, the total number of iterations, m, is computed as m=product of the number of iterations of each for-loop within the set. In some embodiments, a constant may have been used, e.g., by a developer, to define the loop bounds. In this case, the loop bounds may be encoded in one or more of the IRs, for example by the IR generator 404, and may be accessed by the kernel creation unit 416 for use in creating a kernel for the for-loop. In other embodiments, the loop bounds may be defined symbolically, e.g., using a variable, in which case the loop bounds, e.g., dimensions, may be dynamic, e.g., not known statically. In this case, the kernel creation unit 416 may utilize a symbolic representation for the variable to create the kernel's thread and block sizes.

In some embodiments, a one dimensional grid of blocks may be established. The number of threads per block may be computed as the minimum of two values: a multiple of the warp size of the target PPU, e.g., 32, that is closest to m; and the maximum possible thread block size of the target PPU, e.g., 512. In the MATLAB programming environment, this can be written as:

blockDim·x=min(ceil(m/32)*32,512)

The number of threads per block may be computed as a multiple of 32 (to match a common warp size) that is nearest to 'm', then taking the smallest value between the multiple and 512 (to match a standard maximum threads per block value). It should be understood that other values besides '32' and '512' may be used. In some embodiments, warp size and maximum thread values may be user specified as a code generation option or property, or may be derived by the parallel code generator 400 based on the target PPU platform. It should also be understood that other values besides 32 and 512 may be utilized, for example with PPU architectures supporting other warp and/or threads per block sizes.

The number of blocks in the 1D grid may be computed by dividing m by the computed number of threads per block and rounding the result to the nearest integer equal to or greater than the result. In the MATLAB programming environment, this can be written as:

gridDim.x=ceil(m/blockDim.x)

If m exceeds the maximum number of allowable threads per dimension of the target PPU, then a 2D or 3D kernel may be generated. For example, for some PPU architectures, the maximum number of allowable threads per dimension is 1024*65535.

If m is less than or equal to $1024*65535^2$ and p is less than or equal to 2, then a 2D grid may be constructed where the number of threads in the x and y dimensions per block may be 32, and the number of blocks in the x and y dimensions may be equal to the square root of m/1024 rounded to the nearest integer that is equal to or greater than the result of the square root operation. The x and y dimensions may refer to the first and second dimensions of a thread block. In the MATLAB programming environment, this can be written as:
  blockDim.x=32, blockDim.y=32, and blockDim.z=1.
  gridDim.x=grid.Dim.y=ceil(sqrt(m/1024), gridDim.z=1.

Otherwise, if m is less than $1024*65535^3$, then a 3D grid may be constructed where the number of threads in the x and y dimension per block may be 32, and the number of blocks in the x, y, and z dimensions may be equal to m/1024 raised to a power of ⅓ rounded to the nearest integer that is equal to or greater than the result of the power operation. In the MATLAB programming environment, this can be written as:
  blockDim.x=32, blockDim.y=32, and blockDim.z=1.
  gridDim.x=gridDim.y=gridDim.z=ceil((m/1024)$^{1/3}$ In some embodiments, if m is greater than $1024*65535^3$, then the maximum number of threads is exceeded and no kernel is created.

If the number of iterations performed by a for-loop is not fixed, the kernel creation unit 416 may determine whether the number of iterations has a known maximum bound. The kernel creation unit 416 may apply range analysis to the source program 312 to determine the maximum bound for the number of iterations. If a maximum bound is found, the kernel creation unit 416 may use this maximum bound as the number of iterations of the for-loop when determining the grid dimension, number of blocks, and number of threads per block to implement the for-loop in a kernel.

If the number of iterations for a for-loop has an unknown bound, then the size of the loop may be considered to be a variable. In this case, the kernel creation unit may use the variable to compute the grid dimension, number of blocks, and number of threads per block of the kernel. During execution of the generated code 326 for the source program 312, the value of this variable may be determined, and the grid dimension, number of blocks, and number of threads per block of the kernel may be determined. In some embodiments, a kernel may be launched with values for the grid dimension, number of blocks, and number of threads per blocks as computed during run-time, e.g., during execution of the generated code 326.

To make the stream assignments, the dependency analyzer 418 may create a kernel dependency graph, which may be a directed graph having nodes and edges. The nodes may correspond to the kernels, and a special node may correspond to the CPU. Edges between two kernel nodes may represent a data dependency between the two kernels, for example one kernel may compute a variable that is used by the other kernel. The kernel creation unit 416 may analyze the kernel dependency graph and may apply a partitioning algorithm, such as a clique partitioning algorithm, to the kernel dependency graph to assign each kernel node to a clique. The clique partitioning algorithm may assign kernel nodes to densely connected components, such as cliques, so that the number of edges between cliques is minimized. Each clique may represent a stream, e.g., a CUDA asynchronous stream. The kernel creation unit 416 also may insert 'cudaDeviceSynchronization' calls at locations in the generated code 324 that correspond to the edges between cliques of the kernel dependency graph.

In some embodiments, the clique partitioning algorithm may use heuristics, such as an extension of the Kerningham-Lin partitioning algorithm that extends the partitions to multiple sets.

The kernel creation unit 416 may modify an IR for the source program 312 to include statements that define a kernel for the identified for-loop, and statements for launching the kernel, as indicated at step 610. The kernel creation unit 416 may include cudaMalloc APIs for one or more kernel variables and may also include cudaMemcpy APIs for one or more input/output (I/O) kernel variables at the loop's entry and exit.

In some embodiments, the statements added by the kernel creation unit 416 during kernel creation may be language independent. That is, the statements may not conform to any particular PPU programming standard. The statements may be converted to a specific PPU programming standard by the back-end unit 406. In other embodiments, statements conforming to a specific PPU programming standard, e.g., CUDA or OpenCL, may be inserted into an IR for the source program 312.

Returning to decision step 604, if an identified loop does not pass the parallel loop analysis check, then in some embodiments, the kernel creation unit 416 may not create a kernel for that loop, and processing may return to step 602, as indicated by No arrow 612.

FIG. 7 is a schematic illustration of an example code snippet 700 of a source program that includes a for-loop in accordance with an embodiment.

FIG. 8 is a schematic illustration of an example of generated code 800 for the code snippet 700 of FIG. 7 in accordance with an embodiment.

Loop Striding

In some embodiments, the kernel creation unit 416 may configure a kernel being generated such that there is one thread per iteration of a for-loop. The kernel being generated may be configured such that each iteration of the for-loop is executed by a different thread of the device. For example, the kernel creation unit 416 may use the loop index to specify the thread that performs the respective iteration of the for-loop.

In other embodiments, the kernel creation unit 416 may apply one or more loop striding techniques so that a given thread performs multiple iterations of a for-loop. As a result, the kernel being generated may be launched with fewer threads than the number of loop iterations. This can be advantageous when the number of iterations of a for-loop is greater than the maximum number of available threads on a target device. It may reduce the overhead that would otherwise result when the number of threads equals the number of loop iterations. It may reduce memory requirements that might otherwise be required, since each thread typically has its own register(s) and local memory.

In some embodiments, loop striding may be enabled or disabled for a given parallel code generation process and/or for a given for-loop included in the sequential source code. For example, an enable/disable property may be defined at the parallel code generator 400, and this property may be set to True or False. The value for the enable/disable property may be user specified, e.g., through an options setting of a graphical affordance, such as a dialog or window. In addition, the number of threads to be used may also be specified for a given parallel code generation process and/or for a given for-loop included in the sequential source code. For example, a maximum (max) threads property may be defined at the parallel code generator 400. A value for the max threads property may be user specified, e.g., through an options setting, and/or it may be programmatically determined by the kernel creation unit 416, for example based on a maximum number of available threads provided by a target device.

Suppose loop striding is enabled for a given for-loop included in the sequential source code. The given for-loop may loop over a total number of iterations, e.g., T. The kernel creation unit 416 may receive or determine the max threads property, e.g., 'maxThreads'. The value of 'maxThreads' may be a user specified setting, e.g., through a graphical affordance, such as a dialog, or through an Application Programming Interface (API), or it may be inferred by the kernel creation unit 416 from the target device's configuration. The kernel creation unit 416 may use loop striding to allocate threads to the iterations. For example, the kernel creation unit 416 may include one or more statements, such as:

for (idx=threadId; idx<=T; idx+=maxThreads which allocates threads, to execute particular iterations of the for-loop. For example, a given thread may execute a first iteration whose iteration number is less than or equal to T, and another iteration whose iteration number is a value, e.g., 'maxThreads', from the first iteration.

Scatter-Gather/Reduction Operations

Many mathematical operations can be implemented as a number of parallel sub-operations, depending on the size of the variables of the operation's input and/or output arguments. For example, in some circumstances operations, such as sum, mean, product of elements, dot product, minimum (min), maximum (max), etc., can be implemented as a set of parallel sub-operations.

Figures 9, 10:
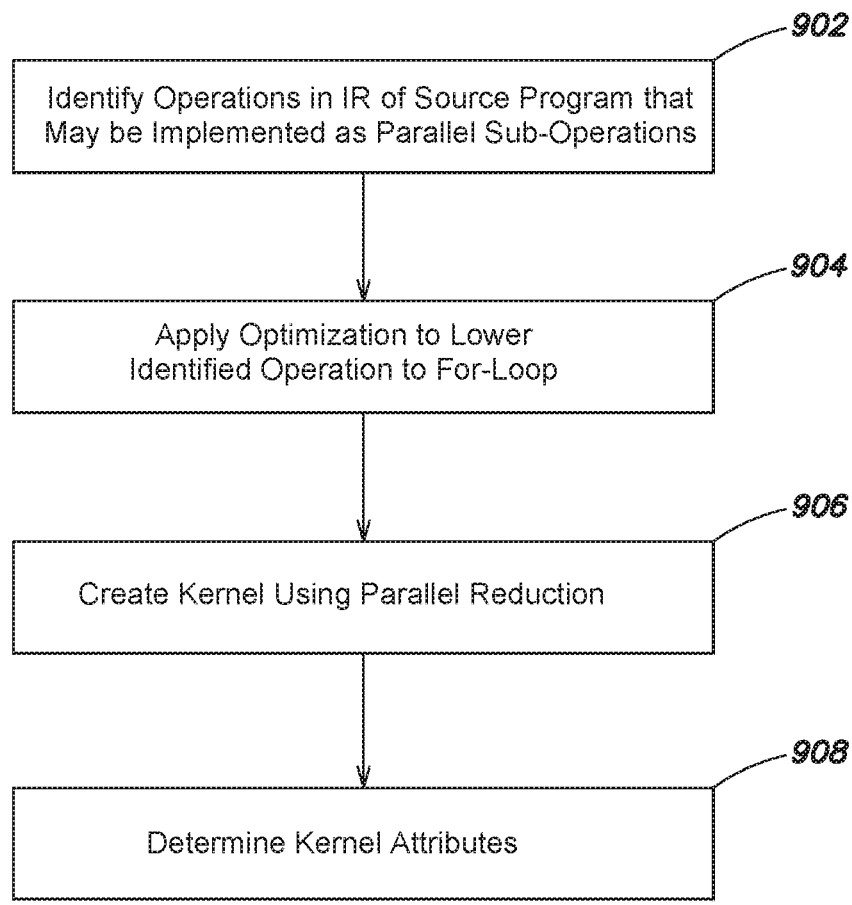
FIG. 9 is a flow diagram of an example method in accordance with an embodiment.
FIG. 10 is a schematic illustration of an example of a code snippet of a source program in accordance with an embodiment.

FIG. 9 is a flow diagram of an example method for creating kernels for operations that may be implemented as parallel sub-operations in accordance with an embodiment. The partitioning engine 414 may analyze an IR for the source program 312 and identify operations included within the source program 312 that can be implemented as parallel sub-operations, as indicated at step 902. For example, the partitioning engine 414 may include or have access to one or more data structures that list such operations, and may identify their occurrence in an IR for the source program 312. The partitioning engine 414 may recognize a mathematical operation as capable of being implemented as parallel sub-operations whether the mathematical operation is written using a predefined function name of the programming language or as a for-loop. A summation operation, for example, may be written in the form of S=sum(A), where 'sum' is a predefined function name of the programming language, in this example it is the MATLAB program development environment. A summation operation also may be written in the form of:

```
s = 0
for i = 1:size(a)
    s = s + A(i)
end
```

The partitioning engine 414 may detect either form of the summation operation appearing in an IR for the source program 312 as capable of being implemented in parallel. More generally, the partitioning engine 414 may apply a loop analysis to an IR for the source program 312 to check for the occurrence within a for-loop of a statement in the form of:

S=f(S, A(i))

where, 'f' is a mathematical operation.

For example, for multiplication, F(S, A(i))=S*A(i). For min/max and other conditional statements, F(S, A(i))=(S>A (i))? S: A(i), where ? is a conditional operator, etc.

If the identified mathematical operation is written using a function name, e.g., 'sum', the IR generator 404 may perform a compiler transform, such as scalarization, that lowers the function to the form of a for-loop, as indicated at step 904. The IR generator 404 may set the number of iterations of the for-loop based on the vector/array size of the function's input variables.

As shown above for the summation operation, the computation of a given iteration of the for-loop utilizes the result computed by a prior iteration of the for-loop. Accordingly, the iterations are not independent of each other. Nonetheless, the partitioning engine 414 may still identify such for-loops as parallelizable, and the kernel creation unit 416 may construct a kernel by using a parallel reduction technique, as indicated at step 906. In an embodiment, the kernel creation unit 416 may utilize functions or APIs provided by the target PPU-development environment. CUDA, for example, defines a 'shuffle' instruction that allows a first thread in a warp to directly read a register from another thread in the same warp. CUDA further defines warp reduce functions and block reduce functions, such as 'warpReduceSum' and 'blockReduceSum'. The kernel creation using 416 may also use CUDA atomic operations to optimize the reductions, such as an 'atomicAdd' operation.

A suitable reduction technique is described by J. Luitjens *Faster Parallel Reductions on Kepler* (Feb. 13, 2014), which is hereby incorporated by reference in its entirety.

The kernel creation unit 416 also may determine kernel attributes for the for-loop, as indicated at step 908. The determined kernel attributes may include grid dimension, number of blocks, and number of threads, and may be derived based on an analysis of the identified for-loop. The kernel creation unit 416 may compute values for these attributes as described herein in connection with explicit for-loops that satisfy the parallel loop analysis check.

FIG. 10 is a schematic illustration of an example code snippet 1000 of a source program that includes an operation amenable to reduce to parallel sub-operations.

FIGS. 11A-D are partial views of a schematic illustration of an example of generated code 1100 for the code snippet 1000 of FIG. 10 in accordance with an embodiment.

Element-Wise Matrix/Array Math Operations

Some programming languages, such as the MATLAB development environment, support both array and matrix operations. Array operations execute element-by-element on corresponding elements of vectors, matrices, and multidimensional arrays, while matrix operations follow the rules of linear algebra and operate on vectors and matrices. In the MATLAB development environment, the period character (.) distinguishes array operations from matrix operations, e.g., '*' for array multiplication vs. '.*' for matrix multiplication.

Figure 12:
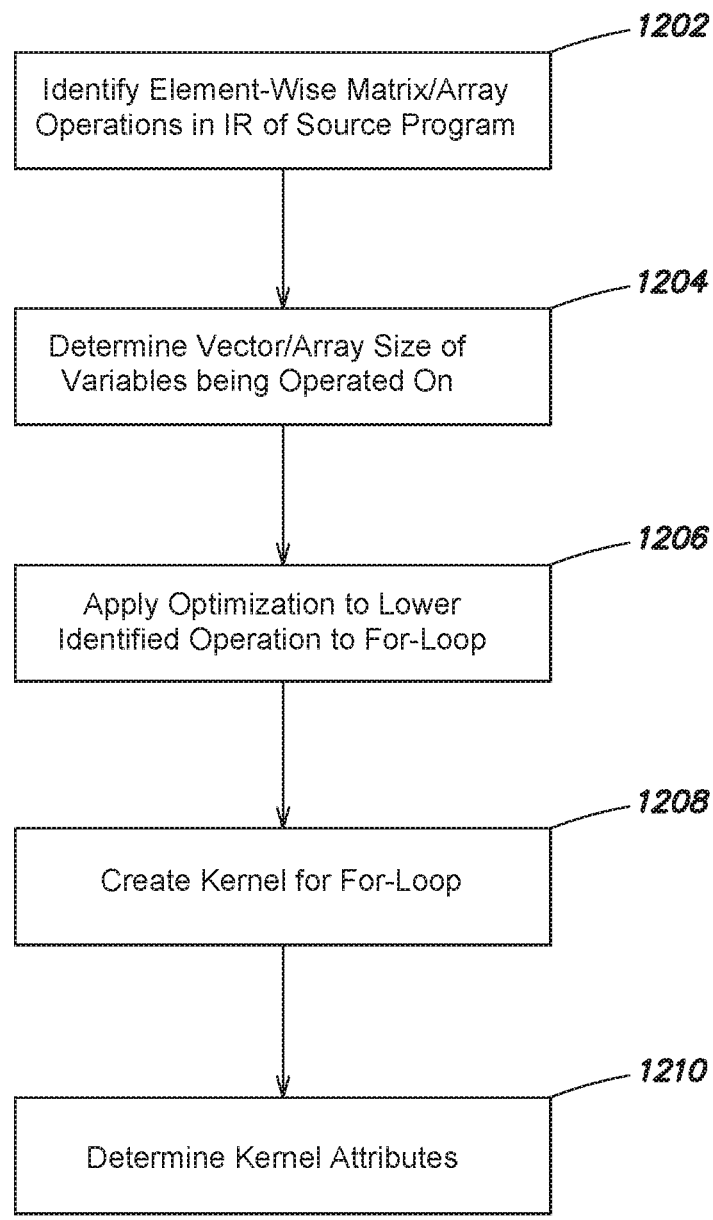
FIG. 12 is a flow diagram of an example method in accordance with an embodiment.

FIG. 12 is a flow diagram of an example method for creating kernels for element-wise matrix and/or array math operations in accordance with an embodiment. The partitioning engine 414 may identify element-wise matrix/array math operations in an IR for the source program 312, as indicated at step 1202. For example, the size of a variable may be determined based on type propagation performed on a parse tree created for input code. The partitioning engine 414 also may determine the vector/array size of the variables being operated on by an identified element-wise matrix/array math operation, as indicated at step 1204. In some embodiments, the partitioning engine 414 may direct the IR generator 404 to perform a compiler transform, such as scalarization, that lowers the element-wise matrix and/or array math operation to a for-loop, using the matrix and/or array size and/or dimension to determine the number of iterations of the for-loop, as indicated at step 1206.

For example, the partitioning engine 414 may identify the following element-wise array operation:

A=B+C, where A, B, and C are arrays of equal size m.

The IR generator 404 may translate this operation to the following equivalent for-loop:

```
For i = 1:m
    A(i) = B(i) + C(i)
End
```

With the identified element-wise matrix/array math operation lowered to a for-loop, the kernel creation unit 416 may create a kernel for the for-loop, as described herein, as indicated at step 1208. For example, the operation may be lowered to a for-loop that satisfies the parallel loop analysis check or to a for-loop whose iterations are dependent and that utilizes a reduction technique. The kernel creation unit 416 also may determine the kernel attributes, as described herein, as indicated at step 1210.

Figure 13:
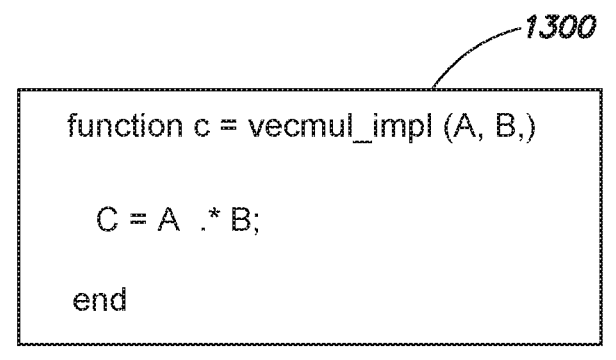

FIG. 13 is a schematic illustration of a code snippet 1300 of a source program that includes an element-wise matrix/array math operation in accordance with an embodiment.

FIG. 14 is a schematic illustration of generated code 1400 for the code snippet 1300 of FIG. 13 in accordance with an embodiment.

Optimizations

As described, the IR generator 404 may facilitate the creation of kernels by applying an optimization to an IR, such as scalarization. In some embodiments, the IR generator 404 may apply other compiler optimizations. For example, the IR generator 404 may apply a loop fusion optimization in which two or more separate loops are fused into a single nested loop. Applying loop fusion may reduce kernel launch overhead in the generated code 326. Another optimization that may be performed by the IR generator 404 is loop interchange in which the order of two 'for' statements in a nested loop are exchanged with each other. For example, the 'for' statement of the inner loop is switched with the 'for' statement of the outer loop, and vice versa. Applying loop interchange may improve memory coalescing at the PPU's memory hierarchy. Attached as Appendix A is an example of loop interchange. Yet another optimization that may be performed by the IR generator 404 is loop perfectization in which a non-perfectly nested loop is transformed into a perfectly nested loop. For example, loop perfectization may result in all loop body statements being moved to the innermost loop. Applying loop perfectization may result in the creation of larger kernels by the kernel creation unit 416. Attached as Appendix B is an example of loop perfectization. In some embodiments, compiler optimizations may be combined.

Another optimization that may be performed by the IR generator 404 is scalar-replacement, which replaces a matrix and/or array temporary, which may be created after loop fusion, to connect variables written by a first loop and used by a second loop. In the fused loop, there may appear a matrix temp for this variable.

Other optimizations that may be performed by the IR generator 404 on the one or more IRs generated for the source program 312 include dynamic loop processing, loop normalization of loop tensor, the opposite of loop-invariant code motion, and auxiliary loop variable lowering.

Dynamic loop processing may be utilized for cases where kernel size cannot be determined at compile time. In these cases, the parallel code generator 400 may compute dynamic bounds for the kernel at the runtime. For example consider the following input code example:

```
K = func( );
for i = 1:100
    for j = 1:K
        c(i,j) = a(i, j) + b(i, j);
    end
end
```

The bound of T loop is unknown at compile time. The parallel code generator 400 may generate code that computes the kernel bounds at run time, and may launch kernels based on K's runtime value.

For example, the parallel code generator 400 may generate the following code:

```
total_iterations = 100 * K;
grids = ceil(total_iterations / 512);
threads = 512;
variable_size_kernel<<<dim3(grids, 1U, 1U), dim3(threads, 1U, 1U)>>>(gpu_a, gpu_b, gpu_c, gpu_K);
```

With loop normalization, the parallel code generator 400 may take a loop with statically known bounds and may re-write it so that the start iteration is 0 and step size is 1. The parallel code generator 400 may do this by changing the loop bounds to start at 0, have a step size of 1, and end at (number of iterations−1). The original loop index variable may then recomputed from the new index variable for example using the formula <orig_var>=<orig_start>+<orig_step>* <new_var>.

For example, consider the following input code example:

```
for i = 1:2:20
    <loop-body>
end
```

The parallel code generator 400 may generate the following code:

```
for tmpIdx = 0:1:9
    i = 1 + 2*tmpIdx; //original index variable computation
    <loop-body>
end
```

With opposite of loop invariant code motion, the parallel code generator 400 may attempt to create perfect loop nests out of imperfect ones by moving statements that are between the two for-loops in a loop nest into the inner loop, when such movement is determined to be valid. This may allow the parallel code generator 400 to create more kernels, although there may be some redundant computation in each iteration. For example, consider the following input code example:

form=1:10 ibmat=m*szc; % this statement causes the loop nest to be imperfect, forces one of the loops to run serially.

```
for itilerow = 1:6000000
    tmp_data[ibmat + itilerow] = iv2[m];
end
end
```

The parallel code generator 400 may generate the following code:

```
for m = 1:10
    for itilerow = 1:6000000
        ibmat = m * szc; % when moved to here, the surrounding loop nest is now perfect and both loops may be parallelized
        tmp_data[ibmat + itilerow] = iv2[m];
    end
end
```

Auxiliary loop variables are variables that can be expressed as an affine function of loop induction variable. The parallel code generator 400 may apply a transform function or operation to rewrite variable assignments within a loop to this affine form where possible. In some embodiments, the function may be identified as NormAuxLoopVar index transform.

For example, a variable defined as follows within a loop
$x = x +/- k$
introduces a cross iteration loop dependency that prevents the loop from getting converted into a parallel for-loop (par-for loop).

But, by expressing x as a function of a loop iteration count p,
$x = x\_init +/- k*p$,
the cross iteration loop dependency is removed. Thus allowing the loop to be parallelized.

The loop iteration count p may be given by one or more loop induction variables (vars). A loop induction variable is a variable that gets increased or decreased by a fixed amount on every iteration of a loop or is a linear function of another loop induction variable. For example, for three nested loops, with loop bounds (I, J, K) and induction vars (i,j,k): $p = i*(J*K) + j*K + k$ For example, consider:

```
x = init;
For p = 0:1:M
    A(x) = B(x) + C(x);
    x = x+3;
End
```

After running the NormAuxLoop index transform, as well as Expression Folding and Dead Code Elimination functions, e.g., by the parallel code generator 400, the above loop may be transformed as follows. The x=x+3 statement is removed.

```
x = init;
For p = 0:M
    x = init+p*3;
    A(init+p*3) = B(init+p*3) + C(init+p*3);
End
```

Multiple optimizations may be performed on the same loop or set of nested loops of the source program 312. For example, the IR generator 404 may apply optimizations in the following order: Scalarization→Loop Fusion→Scalar replacement. For example, consider:
Y=a.*b−c;
where this is a vector statement on arrays of N elements. First, scalarization may run and may turn this into:

```
For I = 1:N
    T(i) = a(i) * b(i);
End
```

```
For I = 1:N
    Y(i) = T(i) − c(i);
End
```

Next, loop fusion may run and may turn this into:

```
For I = 1:N
    T(i) = a(i) * b(i);
    Y(i) = T(i) − c(i);
End
```

Finally, scalar replacement may run and may turn the temp, T, into a scalar:

```
For I = 1:N
    t = a(i) * b(i);
    Y(i) = t − c(i);
End
```

The IR generator 404 may run loop perfectization and loop interchange before running loop fusion.

In addition, the IR generator 404 may perform a compiler transform to remove breaks occurring in a loop. For example, consider:

```
For I = 1:N
    <A: some work>
    If (some_condition)
        <B: some work>
        Break;
    End
    <C: more work>
End
```

The IR generator 404 may write this as:

```
Breakhit = false;
For i=1:N
    If (Breakhit == false)
        <A: some work>
        If (some_condition)
            <B: some work>
            Breakhit = true;
        End
        If (Breakhit == false)
            <C: more work>
        End
    End
End
```

In some embodiments, the program optimization engine 412 and/or the IR generator 404 may convert a while-loop in an IR for the source program 312 to a for-loop that may then be converted into a kernel. The program optimization engine 412 and/or the IR generator 404 may determine whether the number of iterations of the while-loop can be determined, for example by applying range analysis to the loop bound variable. The program optimization engine 412 and/or the IR generator 404 also may determine whether every iteration of the while-loop is independent of every other iteration. If so, the program optimization engine 412 and/or the IR generator 404 may convert the while-loop to a for-loop of the determined number of iterations.

FIG. 29 is an example of source code 2900 that includes a while-loop 2902. Suppose the program optimization engine 412 and/or the IR generator 404 can determine that the while-loop 2902 performs 512 iterations. The program optimization engine 412 and/or the IR generator 404 may convert the while-loop 2902 to a for-loop.

FIG. 30 is an example of generated code 3000 for the source code 2900 of FIG. 29. The generated code 3000 includes a for-loop 3002 in place of the while-loop 2902 of the source code 2900. The generated code 3000 further includes a statement 3004 setting the iteration range of the for-loop from 1 to 512.

PPU-Accelerated Libraries

Some PPU programming platforms include predefined functions stored in libraries. These predefined functions, which are optimized for execution on the PPU, can be called directly from within a source program. The CUDA platform, for example, includes the following libraries:

CUDA Fast Fourier Transform (cuFFT) Library;
CUDA Deep Neural Network (cuDNN) Library;
CUDA Basic Linear Algebra Subprograms (cuBLAS) Library; and
CUDA dense and sparse direct solvers for use with Computer Vision, Computational Fluid Dynamics, Computational Chemistry, and Linear Optimization (cuSOLVER) Library.

Figure 15:
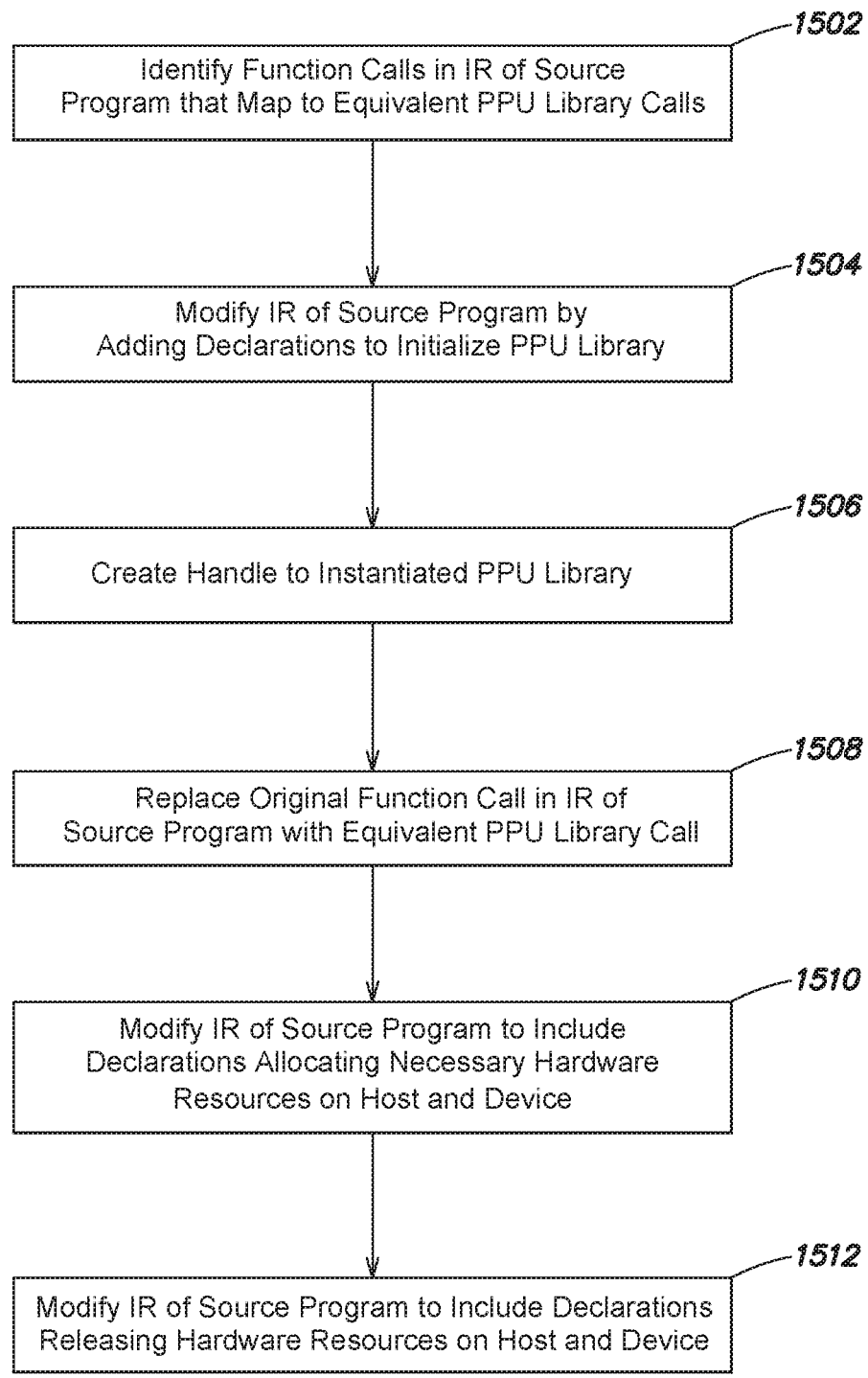
FIG. 15 is a flow diagram of an example method in accordance with an embodiment.

FIG. 15 is a flow diagram of an example method for creating kernels using library functions in accordance with an embodiment. The function mapping engine 424 may identify function calls in an IR for the source program 312 for which equivalent PPU library functions are available, as indicated at step 1502. The function mapping engine 424 may include or have access to a data structure that maps functions defined by the programming language for the source program 312 to PPU library functions.

FIGS. 16A and 16B are partial views of an example table 1600 that maps functions of the MATLAB programming environment to CUDA Library functions. The function mapping table 1600 may include a plurality of columns and rows whose intersections define cells for storing information or data. For example, the function mapping table 1600 may include a column 1602 for function names that may be included in the sequential source program 312. Another column 1604 may describe the functions and a further column 1606 may indicate the data type of the input and/or output arguments of the function and whether the data is complex. Exemplary data types include double-precision floating point (Double), single-precision floating point (Single), integer (Integer), etc. The function mapping table also may include another column 1608 that may identify a particular PPU library that contains a function that maps to the function that may be included in the source program 312, and a column 1610 that identifies the particular function from the respective PPU library.

The function mapping table 1600 further may include a plurality of rows, such as rows 1612a to 1612ab. In some embodiments, each row 1612 may correspond to one or more functions that may be used in the source program 312. The library instantiation engine 426 may map functions of the source program 312 to one or more PPU library functions. For example, a complex function, such as the MATLAB orthogonal-triangular decomposition function (qr), may include an index of maximum magnitude portion that may be replaced with a 'cublasiSamax' function from the CUDA cuBLAS function library, a Rank-1 Update portion that may be replaced with a 'cublasZger' function, a 'cublasZgerc' function, or a 'cublasZgeru' function from the CUDA cuBLAS function library, and a QR factorization portion that may be replaced with a 'cusolverDunormqr' function from the cuSOLVER function library or a 'magma_Sgeq3_gpu' function from the MAGMA function library. When more than one PPU library function is available, the choice may depend on data type, size, shape, e.g., the number of rows and columns of an array, and/or other characteristics of the function's input data. The library instantiation engine 426 may determine the data type, size, shape, and/or other characteristics of the input data before selecting the PPU library function.

The listing of MATLAB functions in column 1602 of FIGS. 16A and B are for illustrative purposes only. In some embodiments, the function mapping table 1600 may include mappings for more functions. In some embodiments, the function mapping table 1600 (or one or more other data structures) may map functions for source programs written in other programming environments to PPU library functions. The mapping of source program functions to PPU library functions may be determined manually by selecting PPU library functions that perform equivalent functions to the source program functions.

It should be understood that the mapping of program language functions to PPU library functions may be stored in other data structures besides a table, such as a linked list, one or more objects, etc.

Returning to FIG. 15, the library instantiation engine 426 may modify an IR for the source program 312 to utilize the equivalent PPU Library function. For example, the library instantiation engine 426 may add one or more declarations to an IR for the source program 312 that initialize the corresponding PPU library, as indicated at step 1504. The library instantiation engine 426 may add one or more declarations that create a handle to the PPU library, as indicated at step 1506. The library instantiation engine 426 may replace the original function call in an IR for the source program 312 with a call to the equivalent function provided by the PPU library, as indicated at step 1508. The library instantiation engine 426 may add one or more declarations to an IR for the source program 312 to allocate hardware resources on the host and device, as indicated at step 1510. The library instantiation engine 426 may add one or more declarations to an IR for the source program 312 to release any hardware resources, as indicated at step 1512.

FIG. 17 is a schematic illustration of an example code snippet 1700 of a source program that includes a function defined by a programming language in accordance with an embodiment.

FIG. 18 is a schematic illustration of an example of generated code 1800 for the code snippet 1700 of FIG. 17 in accordance with an embodiment.

Minimizing Data Transfers Between Host and Device

In some PPU architectures, the host and device have separately accessible memories, e.g., host memory and device memory. To share data between the host and device, memory allocations are made in both the host memory and the device memory, and the data explicitly copied between the two memories. In CUDA, this may be accomplished using 'cudaMalloc' and 'cudaMemcpy' API statements.

With version 6 of CUDA, a pool of managed memory that is shared between the host and device, called Unified Memory, was established. Unified Memory is accessible to both the host and the device using a single pointer. Data allocated in Unified Memory is automatically migrated between the host and device. Space is allocated in Unified Memory using a 'cudaMallocManaged' API statement.

In some embodiments, the data transfer minimization unit 420 applies one or more optimizations to the source program 312 to reduce data transfers between the host and device.

Use-Definition Analysis

Figure 19A:
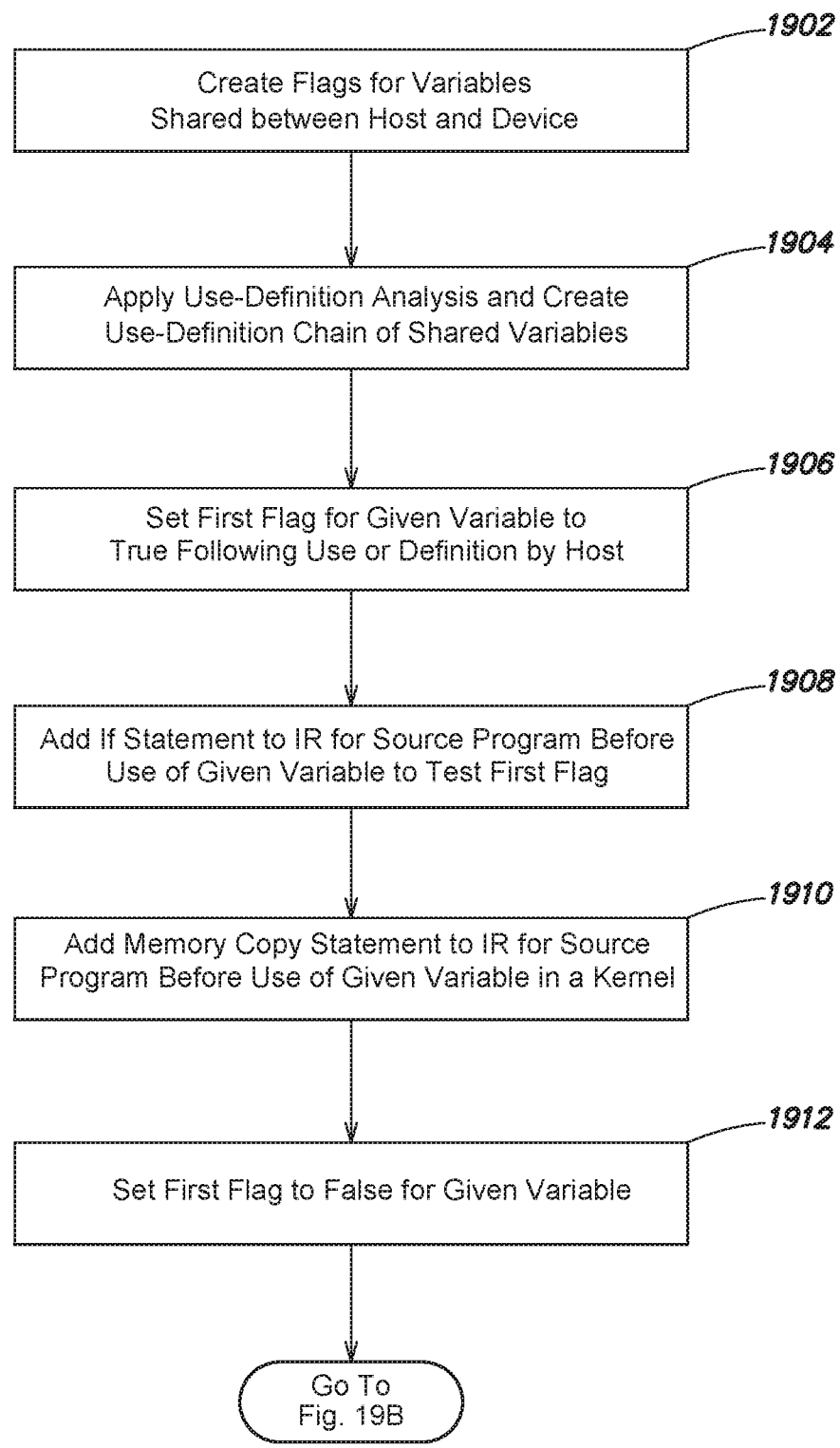
FIGS. 19A and 19B are partial views of a flow diagram of an example method in accordance with an embodiment.
Figure 19B:
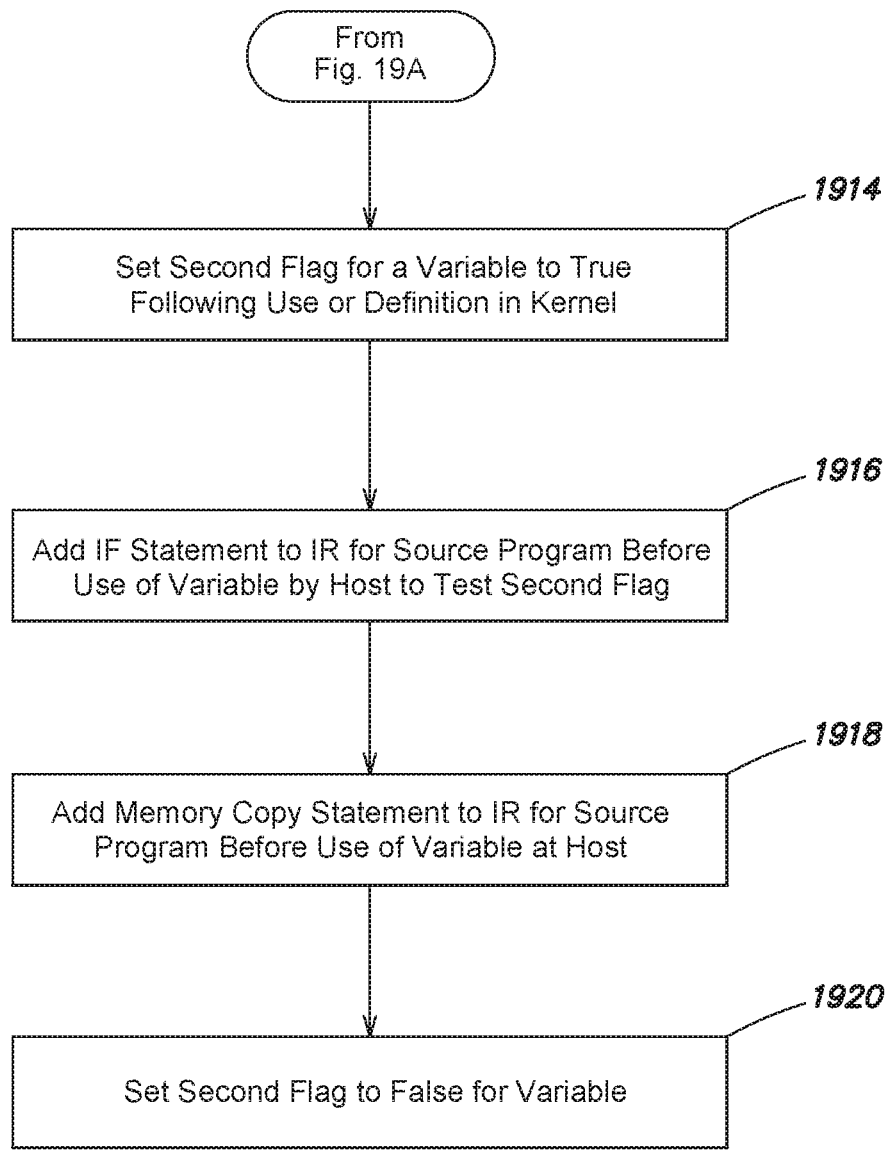

FIGS. 19A and 19B are partial views of a flow diagram of an example method for optimizing the transfer of data between a host and a device in accordance with an embodiment.

For each variable, A, in the source program 312 that is shared between the host and device, the data transfer minimization unit 420 may create two flags for the variable, as indicated at step 1902. The first flag, whose name may be 'A_isDirtyOnCpu', indicates whether A has been modified by the host. The second flag, whose name is 'A_isDirtyonGpu', indicates whether A has been modified by the device. It should be understood that other names may be used for the flags.

The data transfer minimization unit 420 may apply a Use-Definition analysis of the variables of the source program 312 and construct one or more data structures containing a Use-Definition chain, as indicated at step 1904. The Use-Definition analysis may identify all uses, U, of a variable, and all the definitions, D, of that variable that can reach that use without any other intervening definitions. A definition typically refers to the assignment of a value to the variable. The data transfer minimization unit 420 may use static code analysis, such as data flow analysis, of an IR for the source program 312 to create the Use-Definition chain.

Following the creation of kernels as described herein, the data transfer minimization unit 420 may then modify an IR for the source program 312 by adding statements that set the first and second flags to True or False. For example, following a use or a definition of variable A by the host that is subsequently used in a kernel, the data transfer minimization unit 420 may set the first flag for the variable to True, as indicated at step 1906. For example, the data transfer minimization unit 420 may add the statement:

'A_isDirtyOnCpu=true'

Before each use of the variable A in a kernel created in an IR for the source program 312, the data transfer minimization unit 420 may add a statement, such as an If statement, to the kernel that tests whether the first flag, 'A_isDirtyOnCpu', is true, as indicated at step 1908. The data transfer minimization 420 may also add a 'cudaMemcpy' statement to the kernel before the use of the use of A by the kernel that copies A from the host to the device, as indicated at step 1910, and a statement setting the first flag to false, as indicated at step 1912. The 'cudaMemcpy' statement and the setting of the first flag to false are only performed if the first flag was determined to be true.

Following a use or a definition of a variable C within a kernel that is subsequently used by the host, the data transfer minimization unit 420 may set second flag for the variable to True, as indicated at step 1914 (FIG. 19B). For example, the data transfer minimization unit 420 may add the statement:

'C_isDirtyOnGpu=true'

Before each use of the variable C by the host in an IR for the source program 312, the data transfer minimization unit 420 may add a statement, such as an If statement, to the host code that tests whether the second flag, 'C_isDirtyonGpu', is false, as indicated at step 1916. The data transfer minimization unit 420 may also add a 'cudaMemcpy' statement to the host code before the use of the use of C by the host that copies C from the device to the host, as indicated at step 1918, and a statement setting the second flag to false, as indicated at step 1920. The 'cudaMemcpy' statement and the setting of the second flag to false are only performed if the second flag was determined to be true.

Figure 20:
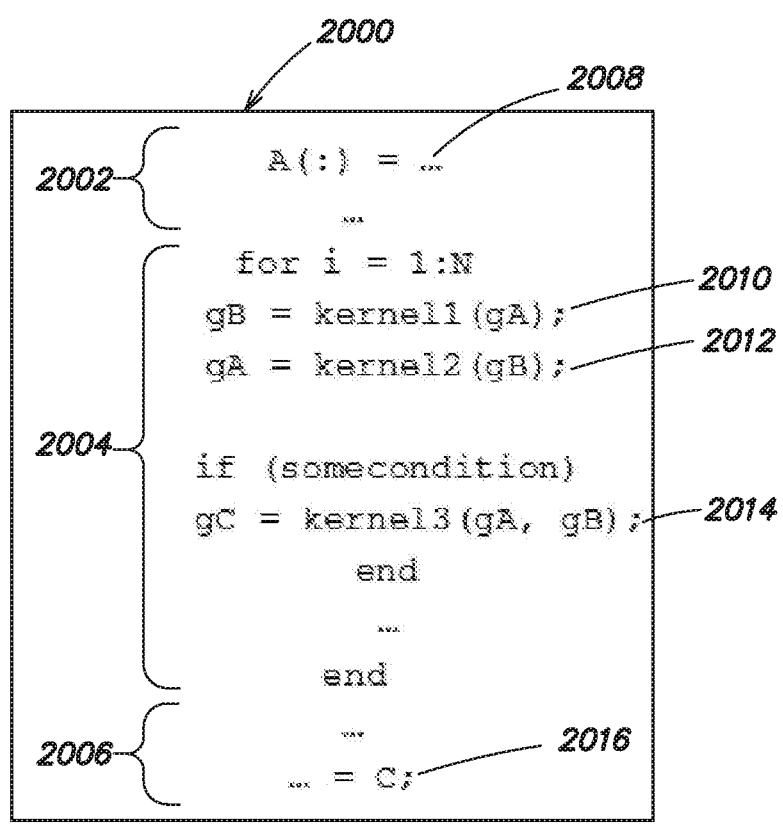
FIG. 20 is a schematic illustration of an example code snippet of a source program in accordance with an embodiment.

FIG. 20 is a schematic illustration of an example code snippet 2000 in accordance with an embodiment. The code snippet 2000 includes one host code region 2002, a device code region 2004 that includes three kernels, and another host code region 2006. Host code region 2002 includes a definition 2008 of variable A. Device code region 2004 includes a kernel 2010 that computes a variable gB as a function of variable gA where the addition of the letter 'g' indicates variable names on the device. Device code region 2004 also includes a further kernel 2012 that computes variable gA as a function of variable gB, and another kernel 2014 that computes a variable gC as a function of variables gA and gB. Host code region 2006 includes a use 2016 of variable C.

Figure 21:
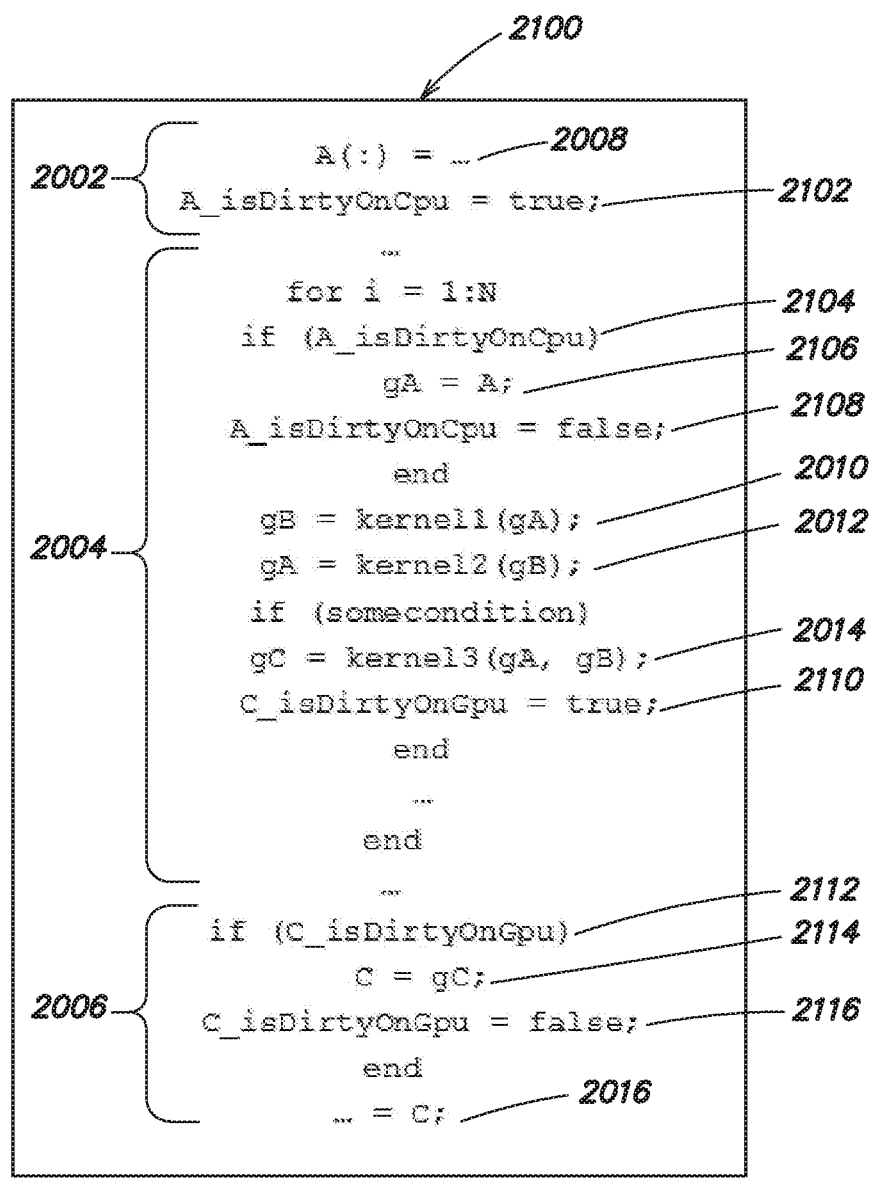
FIG. 21 is a schematic illustration of an example of generated code in accordance with an embodiment.

FIG. 21 is a schematic illustration of an example of generated code 2100 for the code snippet 2000 of FIG. 20 in accordance with an embodiment. As illustrated in FIG. 21, the data transfer minimization unit 420 may modify the portion of an IR for the host code region 2002 that results in the addition of a statement 2102 that sets the first flag for variable A to true after the statement 2008 defining A.

The data transfer minimization unit 420 also may modify the portion of an IR for the device code region 2004. For example, the modification may result in the addition of an if statement 2104 that checks whether the first flag for variable A is true. If so, a statement 2106 obtains the value A from the host for use at the device, and statement 2108 sets the first flag for variable A to False. In CUDA, statement 2106 may be implemented through a 'cudaMemcpy' API.

The data transfer minimization unit 420 also may modify an IR for the source program that results in a statement 2110 in the generated code 2100 setting the second flag for variable C to true following the computation of variable C by kernel 2014. The data transfer minimization unit 420 modifies the IR for host code region 2006 that results in an if statement 2112 in the generated code 2100 that checks whether the second flag for variable C is true. If so, a further modification to the IR results in a statement 2114 in the generated code 2100 that obtains the value C from the device for use at the host, and a statement 2116 that sets the second flag for variable C to False. In CUDA, statement 2114 may be implemented through a 'cudaMemcpy' API.

Single Thread Kernel Creation

Figure 22:
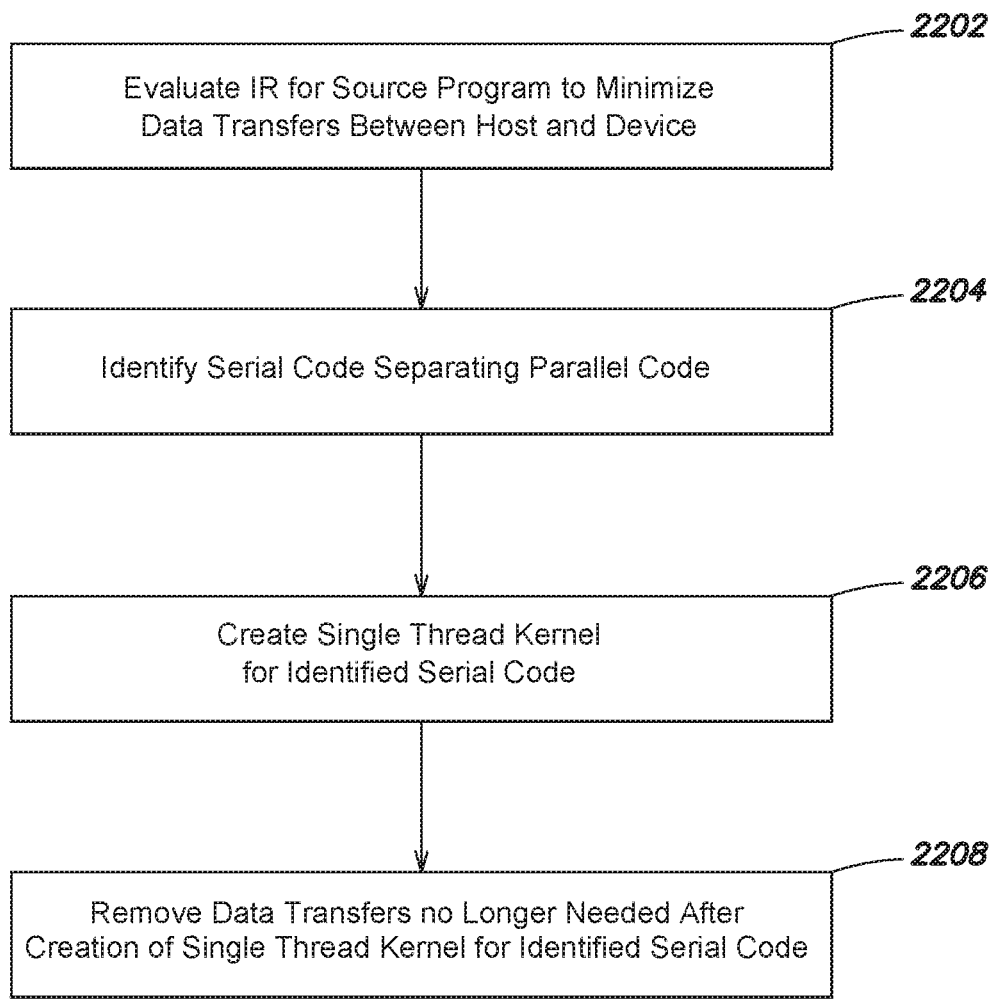
FIG. 22 is a flow diagram of an example method in accordance with an embodiment.

FIG. 22 is a flow diagram of another example method for optimizing the transfer of data between a host and a device in accordance with an embodiment.

Following the creation of kernels for parallel code identified in the source program 312, as described herein, the data transfer minimization unit 420 may evaluate an IR for the source program 312, as indicated at step 2202. The data transfer minimization unit 420 may identify, e.g., detect, occurrences in an IR for the source program 312 where serial code, e.g., host code, separates parallel code, e.g., device code, such as kernels, as indicated at step 2204. For example, a serial code segment may be disposed between two parallel code segments. Examples of such serial code may include code that is not in a loop, code that does not map to a PPU-optimized library function, or code that does not include a reduction. The data transfer minimization unit 420 may direct the kernel creation unit 416 to create a kernel for the identified host code that separates two kernels, as indicated at step 2206. The kernel creation unit 416 may create a kernel having a single block with one thread. The host code may be included in this single threaded kernel. The data transfer minimization unit 420 also may determine whether data transfers between the host and device may be eliminated after placing the host code that separates two kernels into a single-threaded kernel, as indicated at step 2208. For example, if the host code uses a variable whose value is computed by the kernel executing before the host code, then for a CUDA implementation, a 'cudaMemcpy' API might otherwise be included in the code before the host code. With the placement of the host code in a single-threaded kernel by the data transfer minimization unit 420, the need for this 'cudaMemcpy' API would be avoided entirely, thus reducing the number of data transfer operations otherwise needed between the host and the device. If the kernel that executes after the host code uses a variable whose value was computed by the host code, then for a CUDA implementation, a 'cudaMemcpy' API might otherwise be included in the code following the host code. This 'cudaMemcpy' API may also be avoided entirely, reducing the number of data transfer operations between the host and the device.

Optimizing Usage of the PPU's Memory Hierarchy

As described, PPU-architectures often include a memory hierarchy that may include high-latency Global Memory accessible by threads of all blocks, shared memory accessible by blocks included in a Streaming Multiprocessor (SM), and low-latency local memory and registers for the threads running on the cores.

In some embodiments, the memory allocation unit 422 applies one or more optimizations to the source program 312 to optimize usage of the PPU's memory hierarchy. The memory allocation unit 422 may apply one or more optimizations to parallel code determined to have a data locality characteristic.

Stencil Operations

A commonly occurring operation, which may appear in the source program 312 and thus in an IR for the source program 312, is a stencil operation. In a stencil operation, each element of an array is computed as a function of a small region, e.g., a window, of an input array. Stencil operations appear in finite differences, convolution, median filtering, and finite-element methods. For example, a stencil operation may take multiple pixel values from a source image, typically in the form of a 2D, 3D, or multidimensional input window, and return a scalar output, such as a single pixel value for creating an output image.

Figure 23:
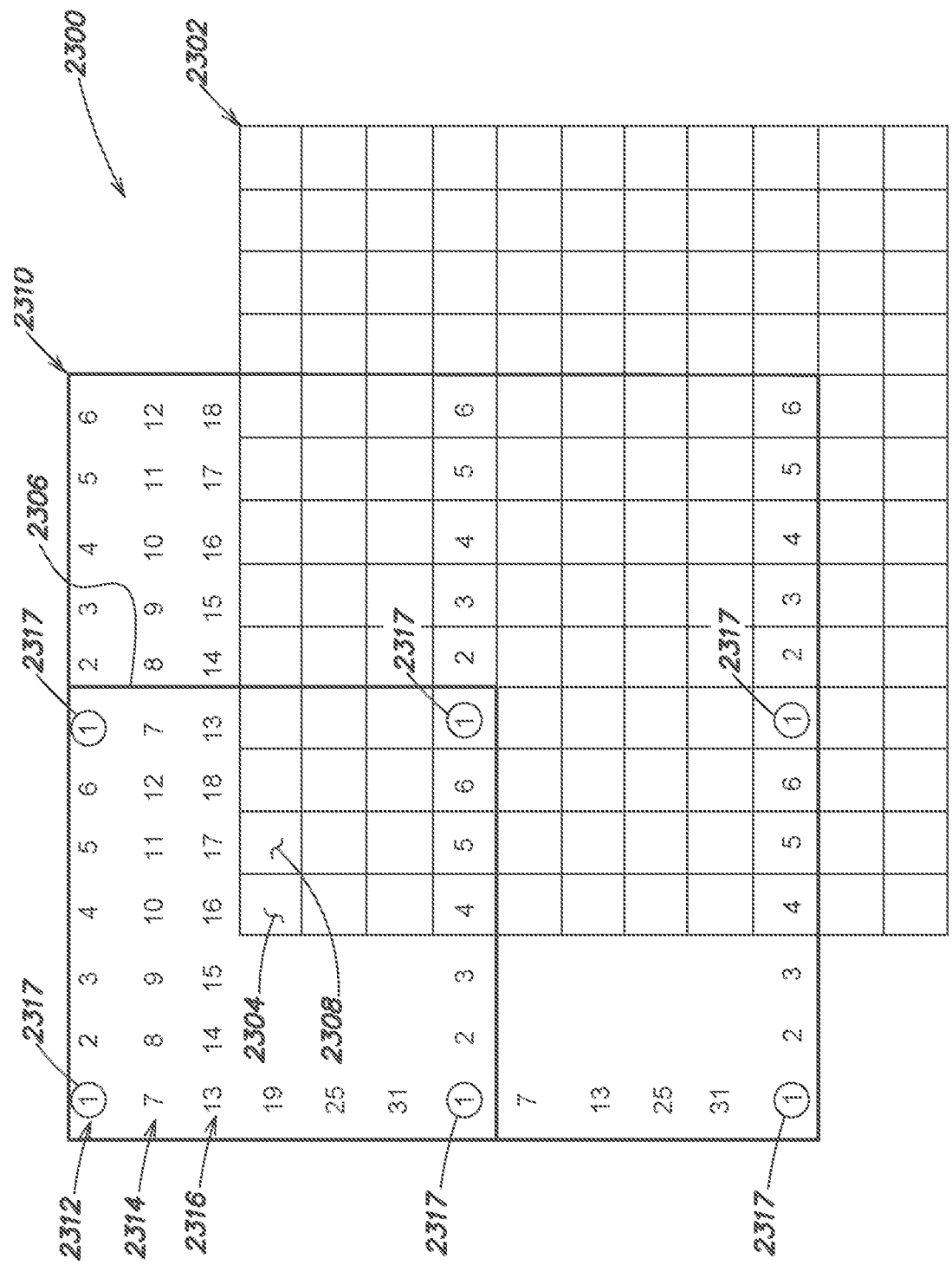
FIG. 23 is a schematic illustration of an example array structure in accordance with an embodiment.

FIG. 23 is a schematic illustration of an example array structure 2300 for a stencil operation that computes scalar values, e.g., pixels, from 7×7 windows moving across an input array. The stencil operation may operate on a 13×11 input array 2302 and may generate an output array, which may be named 'C'. To compute an output scalar value, e.g., a pixel value, corresponding to a top left input scalar value 2304 of the input array 2302, the stencil operation may utilize a 7×7 window 2306. To compute an output scalar value corresponding to an input scalar value 2308 adjacent to the input scalar value 2304, the 7×7 window 2306 is moved one value to the right, and so on for the rest of the scalar values of the output array.

The scalar output values of the output array may be computed by respective threads established in blocks of the PPU. However, having the threads pull the input scalar values corresponding to the windows for computing the respective scalar output values from Global Memory to the thread's local memory, e.g., registers or Local Memory, can result in inefficient operation of the PPU.

The kernel creation unit 416 may create a kernel to perform such a stencil operation on the device. The memory allocation unit 422 may modify the kernel to optimize use of the PPU's memory hierarchy. For example, the memory allocation unit 422 may modify the source program 312 to perform collaborative loading of input data from Global Memory to Shared Memory.

Figure 24:
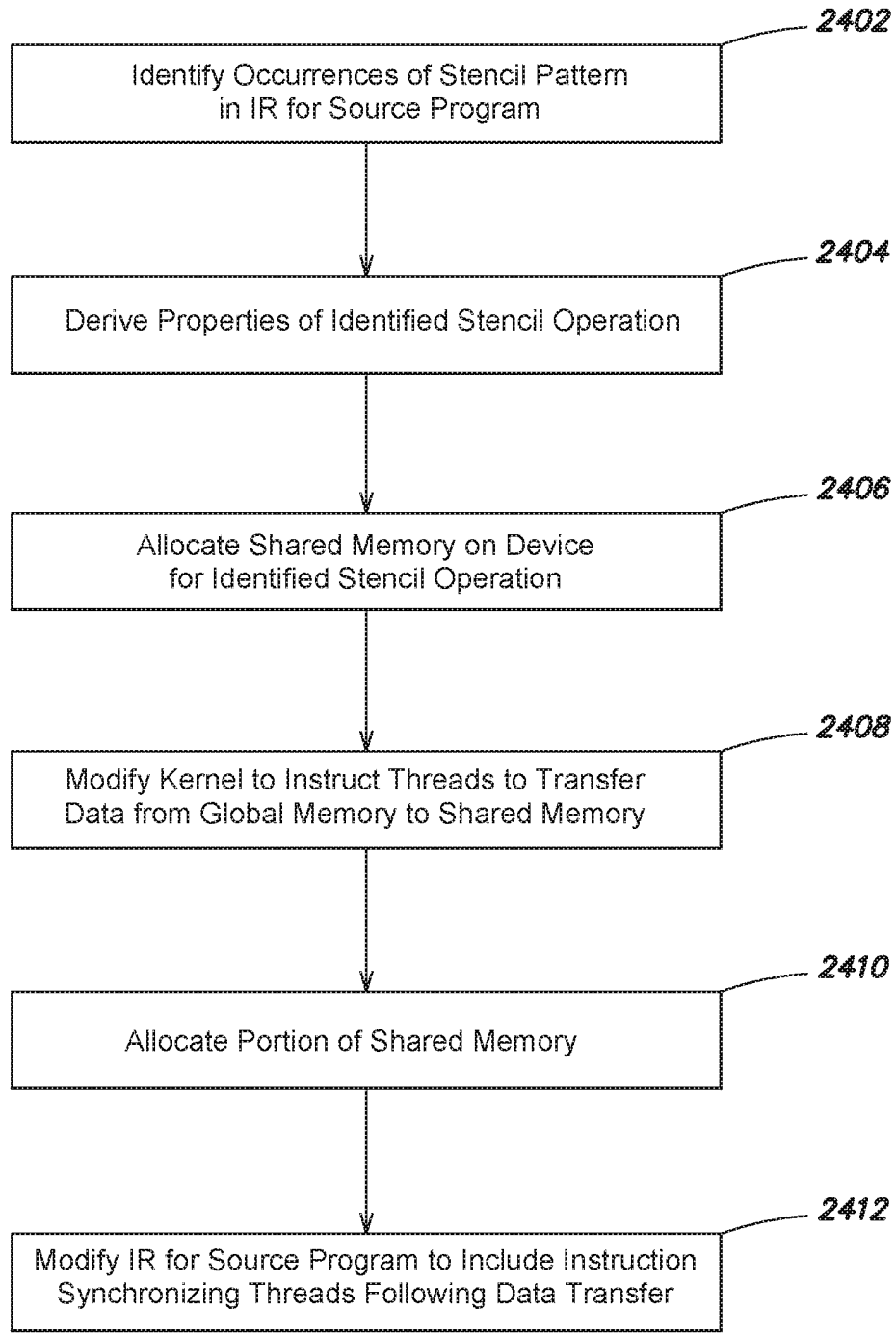
FIG. 24 is a flow diagram of an example method in accordance with an embodiment.

FIG. 24 is a flow diagram of an example method for implementing collaborative loading of data in accordance with an embodiment. The memory allocation unit 422 may analyze an IR for the source program 312 for the occurrence of a pattern that matches a stencil operation, as indicated at step 2402. For example, the memory allocation unit 422 may identify occurrences of the following pattern in the source program 312:

```
for x = 1:orow
    for y = 1:ocol
        C(x,y) = f(In(x:x + window_x, y:y + window_y)
    end
end
``` where 'orow' refers to the number of rows of the output, 'ocol' refers to the number of columns in the output, and the function 'f' takes an input window and returns a scalar output. An example is a convolution operation.

The memory allocation unit 422 may evaluate an identified stencil operation to derive properties of the stencil operation, as indicated at step 2404. For example, the memory allocation unit 422 may determine the number of threads executing the kernel, the size of the input array being processed, and the size of the window used to compute the scalar values of the output array. The memory allocation unit 422 may allocate Shared Memory, as indicated at step 2406, and may modify the kernel by including one or more memory operations that instruct the threads of the kernel to cooperatively transfer a region of the input array into Shared Memory, as indicated at step 2408. In some embodiments, the memory operations may replace memory operations originally included in the kernel by which the kernels transferred the windows of input data processed by the threads of the kernel from Global Memory to registers or Local Memory. The memory operations may instruct successive threads to transfer neighboring memory locations of the region from Global Memory to Shared Memory.

Suppose for example that the kernel creation unit 416 creates a kernel with a 2D block of 6×6 threads for a total of 36 threads to execute the stencil operation of FIG. 23. The memory allocation unit 422 may include memory operations that instruct the threads to transfer an input array 2310 from Global Memory to Shared Memory, where the input array 2310 is larger than the window size. For example, while the window size is 7×7, the memory operations may instruct the threads to load a 12×12 input array. Further, each of the 36 threads is instructed to transfer particular scalar values of the 12×12 input array. The input array is labeled with the thread numbers of the threads that transfer the respective scalar values of the 12×12 input array. For example, the twelve scalar values of a top row 2312 of the input array 2310 loaded from Global Memory to Shared Memory are transferred by thread numbers 1 2 3 4 5 6 1 2 3 4 5 6 of the block. The twelve scalar values of a next row 2314 of the input array 2310 are transferred by thread numbers 7 8 9 10 11 12 7 8 9 10 11 12. The twelve scalar values of a next row 2316 are transferred by thread numbers 13 14 15 16 17 18 13 14 15 16 17 18. This pattern may be followed utilizing all 36 threads, and the pattern may then be repeated. Thread number 1, for example, thus transfers six scalar values of the input array 2310, as shown by circles around the number 1 as indicated at 2317.

The operations to transfer the region of the input data to Shared Memory may be implemented in the kernel in one or more for-loops. The memory allocation unit 422 may allocate at least a portion of Shared Memory to support a stencil operation, as indicated at step 2410. For example, the memory allocation unit 422 may determine the size of at least a region of Shared Memory as follows:

For a 2D stencil of size [KH, KW], the memory allocation unit 422 may allocate a portion of Shared Memory of size:
   SM[blockDim.y+KH−1, blockDim.x+KW−1],
where [blockDim.y, blockDim.x] are the dimensions of the threadBlock.

For a 1D stencil of size KW, the memory allocation unit 422 may allocate a portion of Shared Memory of size:
   SM[blockDim.x+KW−1]

The memory allocation unit 422 may further include an operation in the kernel to synchronize the threads following the transfer of the region of input data to Shared Memory, as indicated at step 2412. With the input data collaboratively loaded into Shared Memory, the memory allocation unit 422 may translate any data accesses that still target Global Memory to access Shared Memory.

FIGS. 25A and 25B are partial views of a schematic illustration of an example of automatically generated code 2500 of a kernel that includes operations for performing a collaborative load in support of a stencil type operation. The generated code 2500 may include a shared memory declaration statement 2502, a collaborative load section 2504, a thread synchronization point 2506, and an algorithmic section 2508 having translated accesses to shared memory.

Thread Reuse in Shared Memory

Another commonly occurring operation, which may appear in the source program 312 and thus in an IR for the source program 312, computes an output matrix as a function of two input matrices. Often, each element of the output matrix will be computed based on a column of values from one of the input matrices and a row of values from the other input matrix. The column and row may have the same number of elements.

Figure 26:
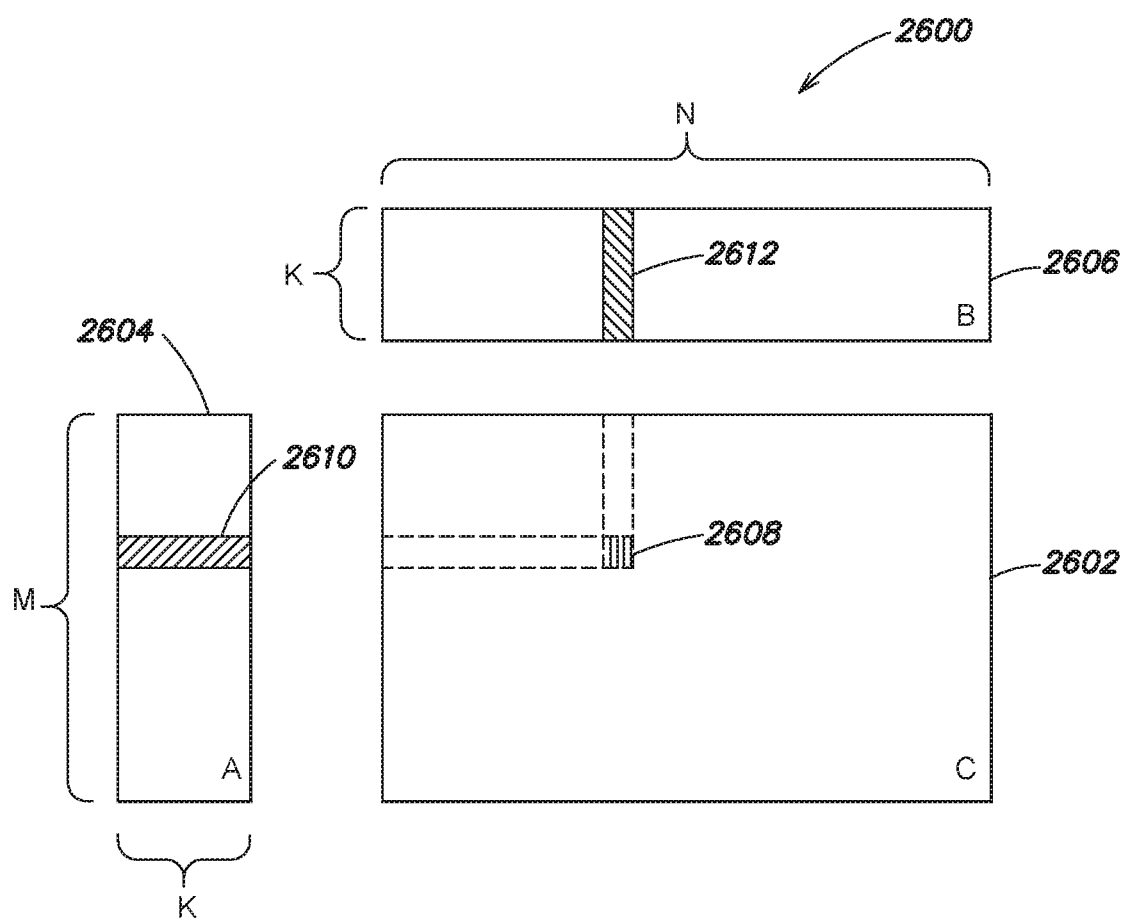
FIG. 26 is a schematic illustration of an example array structure in accordance with an embodiment.

FIG. 26 is a schematic illustration of an example array structure 2600 for a matrix-matrix operation that computes an output matrix 2602, labeled C, as a function of an M×K input matrix 2604, labeled A, and an N×K input matrix 2606, labeled B.

The kernel creation unit 416 may create a kernel within an IR to perform such a matrix-matrix operation on the device. The kernel may utilize a number of threads and each thread may compute an element of the output matrix 2602. For example, a given thread may compute an element 2608 of the output matrix 2602 as a function of a row 2610 of matrix 2604 and a column 2612 of matrix 2606. Such an arrangement, however, may result in inefficient use of the target PPU's memory hierarchy. The memory allocation unit 422 may modify the representation of the kernel within the IR to optimize use of the PPU's memory hierarchy.

Figure 27:
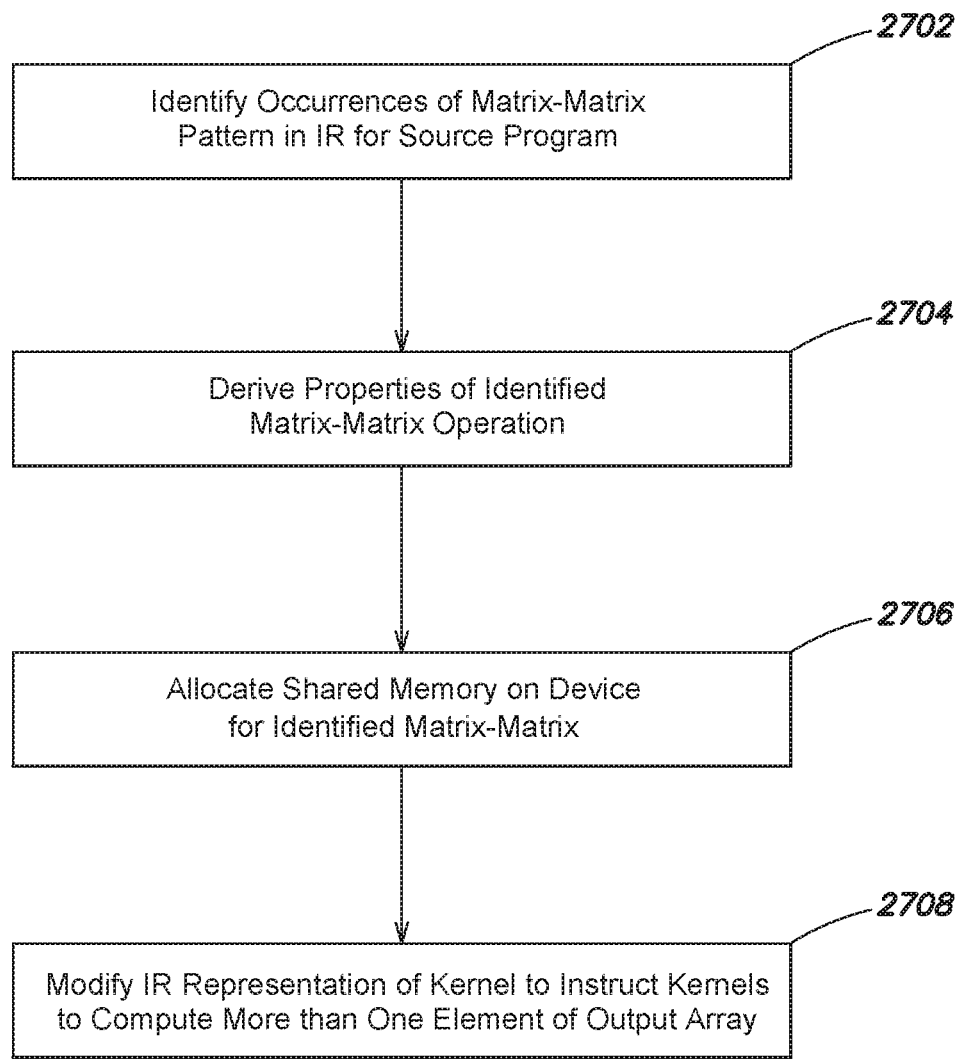
FIG. 27 is a flow diagram of an example method in accordance with an embodiment.

FIG. 27 is a flow diagram of an example method for implementing a thread reuse optimization in accordance with an embodiment. The memory allocation unit 422 may look through the source program 312 for the occurrence of a pattern that matches a matrix-matrix computation, as indicated at step 2702. For example, the memory allocation unit 422 may look for occurrences of the following pattern in the source program 312:

```
for x = 1:M
    for y = 1:N
        for z = 1:K
            C(x,y) = F(A(x,z), B(y,z))
        end
    end
end
``` where the function 'F' depends on two input arguments, e.g., A(x,z) and B(y,z), and may further depend on constant values. In some embodiments, B==A.

The matrix-matrix pattern may appear in a kernel. The memory allocation unit 422 may evaluate an identified matrix-matrix operation to derive properties of the matrix-matrix operation, as indicated at step 2704. For example, the memory allocation unit 422 may determine the number of threads executing in the kernel and the sizes of the input matrices being processed. The memory allocation unit 422 may allocate Shared Memory, as indicated at step 2706. The memory allocation unit 422 also may modify the kernel so that a given thread computes more than one element of the output array for a given row or column of one of the input arrays, as indicated at step 2708. It should be understood that a kernel may be instructed to compute other numbers of elements besides three.

Figure 28:
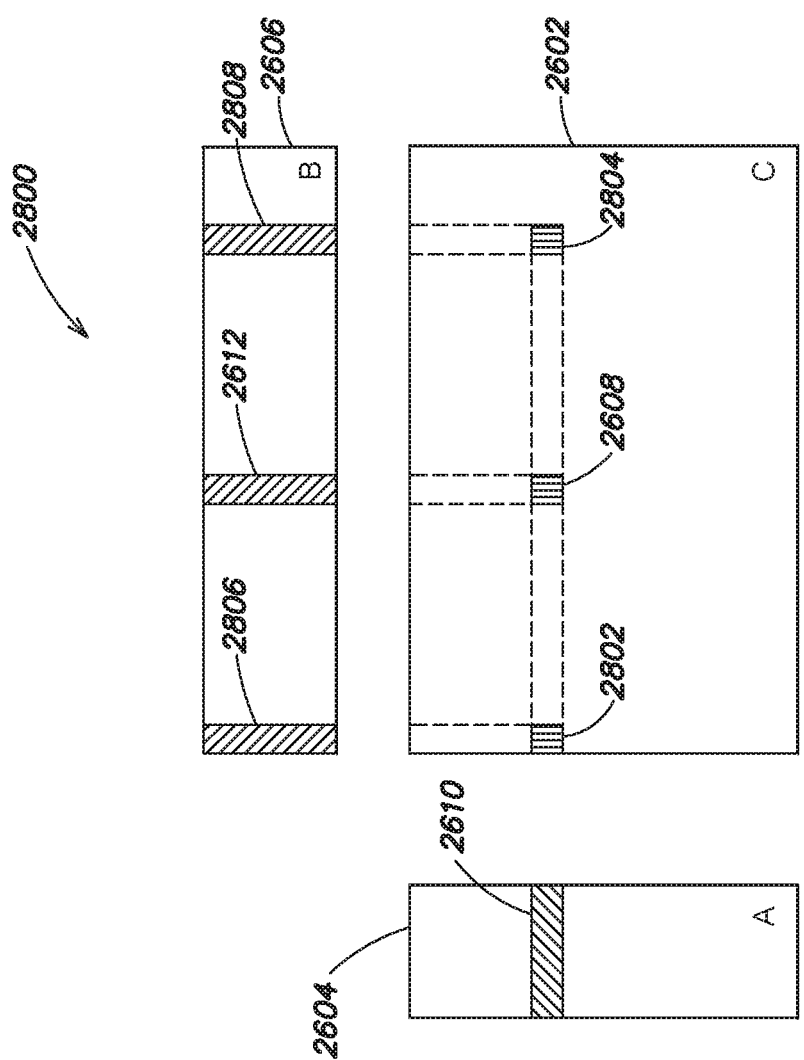
FIG. 28 is a schematic illustration of an example array structure in accordance with an embodiment.

FIG. 28 is a schematic illustration of an example optimized array structure 2800 in accordance with an embodiment. In the optimized array structure 2800, the given thread that computes the element 2608 also computes additional elements 2802 and 2804 using the data row 2610 of the input matrix 2604. To compute element 2802, the given thread utilizes the data of column 2806 from input matrix 2606. To compute element 2804, the given thread utilizes the data of column 2808 from input matrix 2606.

Compiler Pragmas

In some embodiments, the kernel creation unit 416, the data transfer minimization unit 420, and/or the memory allocation unit 422 may create and/or modify kernels based on one or more predefined compiler pragmas included in a source code form of the source program 312, and also included in or more in-memory IRs for the source program 312.

A function-level pragma may be included in a function of an IR for the source program 312. The function pragma may direct the kernel creation unit 416 to map all computation within the function to the device. The kernel creation unit 416 may create kernels for all loops within the function that pass the parallel-loop analysis check described herein. In source code form, the function-level pragma may take the form:
   coder.gpu.kernelfun( )
The function-level pragma may not require any input arguments.

A loop-level pragma may be included in an IR for the source program 312 immediately before a for-loop. The loop-level pragma may override the parallel-loop analysis check, and direct the kernel creation unit 416 to create a kernel for the for-loop.

The loop-level pragma may take multiple different forms. If, in source code form, the loop-level pragma has the form:
   'coder.gpu.kernel'
then the kernel creation unit 416 may create a kernel with grid dimension, number of blocks, and number of threads computed from the parameters, e.g., number of iterations, of the for-loop as described herein.

If, in source code form, the loop-level pragma has the form:

'coder.gpu.kernel(B, T)' where,

B is an array of the form [Bx, By, 1], and

T is an array of the form [Tx, Ty, Tz], then the kernel creation unit 416 may create a kernel for the for-loop having a number of blocks in the grid along the x and y dimensions as specified by Bx and By, respectively, and a number of threads in the block along the x, y, and z dimensions as specified by Tx, Ty, and Tz, respectively.

If, in source code form, the loop-level pragma has the form:

coder.gpu.kernel(B, T, M, name)

where,

M is an integer, and name is a character array, then the kernel creation unit 416 may create a kernel for the for-loop having a number of blocks and number of threads as indicated by B and T, respectively, and a minimum number of blocks per Streaming Multiprocessor as specified by M. In addition, the kernel creation unit 416 may assign the specified name as the name of the kernel.

If the developer or programmer who created the source program 312 knows that a particular for-loop is safe for parallel execution, he or she may designate the for-loop for parallel execution on the device using the coder.gpu.kernel pragma, which overrides the parallel loop analysis check, and forces kernel creation by the parallel code generator 400. The code generation report 328 created by the report generator 408 may indicate which for-loops of the source program 312 will be executed in parallel on the PPU, e.g., through the creation of kernels. If the code generation report 328 indicates that a given for-loop of the source program 312 will not be executed in parallel on the PPU, for example because its loop bounds could not be determined, the developer or programmer may include a loop-pragma in the source program 312 at the subject for-loop. In response to the loop-pragma, the code generator 400 may create a kernel for the subject for-loop, even though the loop bounds cannot be determined, utilizing the kernel attributes specified by the developer or programmer with the loop-pragma.

A constant pragma may be included in an IR for the source program 312 within a parallelizable for-loop. The constant pragma may direct the kernel creation unit 416 to load a variable to the target device's Constant Memory, and to replace accesses to the variable in the kernel with accesses to the Constant Memory. In source code form, the constant pragma may have the form:

coder.gpu.constantMemory(var)

The variable 'Afar' is loaded into Constant Memory.

The pragmas may be code generation functions, and may have no effect in the programming language of the source program 312. The pragmas may be included in the source program 312 by the developer or programmer creating the source program 312.

The terms kernels, grids, thread blocks (or blocks), threads, etc. used herein are intended to broadly cover the respective terminology in other PPU programming models. For example, the term kernel includes the term 'program' in OpenCL. The term thread block (or block) includes the terms 'work-group' in OpenCL and 'thread group' in Direct-Compute. The term thread includes the terms 'work-item' in OpenCL. The term grid includes the terms 'N-D range' in OpenCL and 'dispatch' in DirectCompute.

Exemplary Data Processing Device

Figure 31:
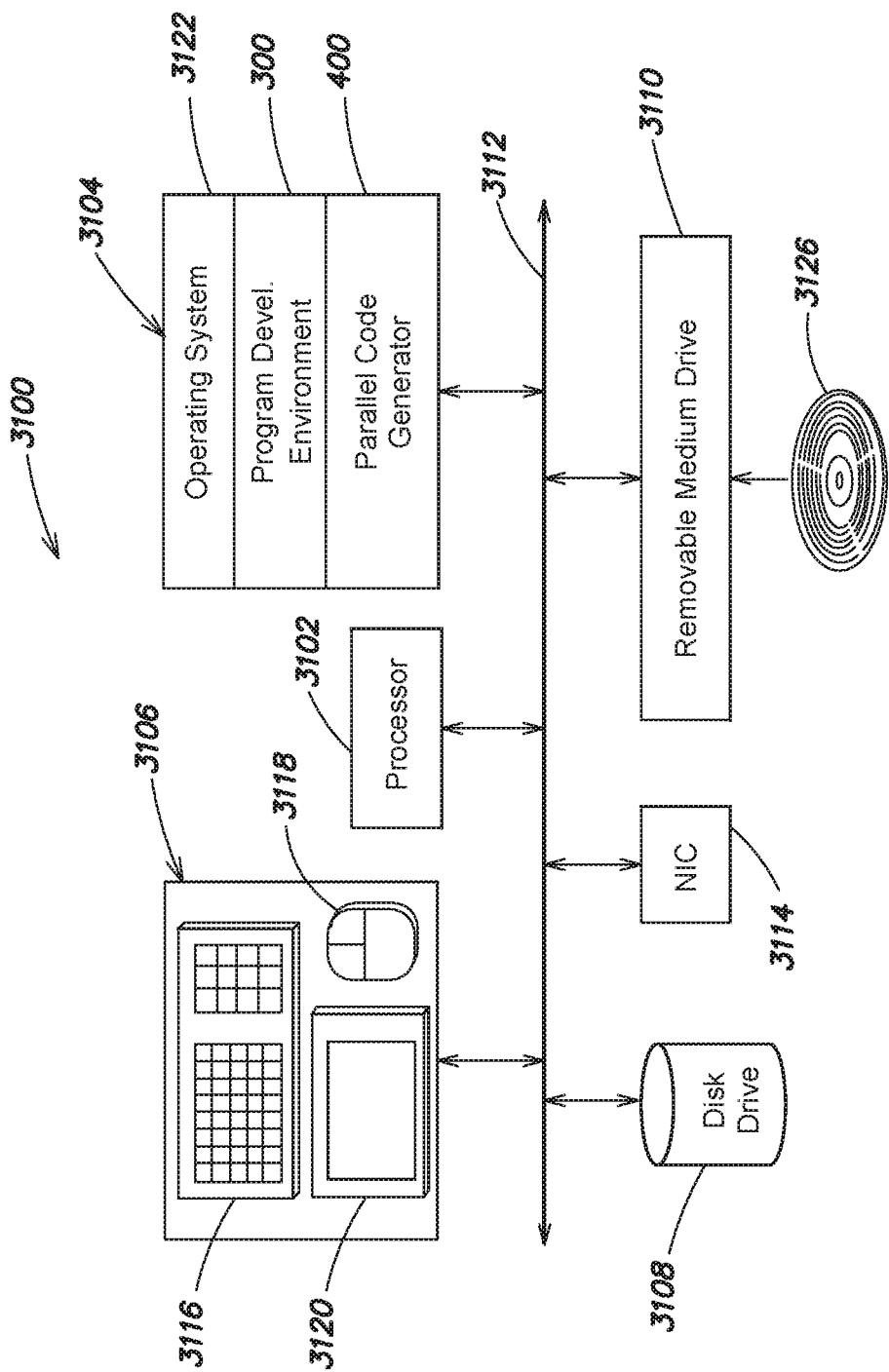
FIG. 31 is a schematic illustration of an example data processing system in accordance with an embodiment.

FIG. 31 is a schematic illustration of a computer or data processing system 3100 for implementing an embodiment of the invention. The computer system 3100 may include one or more processing elements, such as a processor 3102, a main memory 3104, user input/output (I/O) 3106, a persistent data storage unit, such as a disk drive 3108, and a removable medium drive 3110 that are interconnected by a system bus 3112. The computer system 3100 may also include a communication unit, such as a network interface card (NIC) 3114. The user I/O 3106 may include a keyboard 3116, a pointing device, such as a mouse 3118, and a display 3120. Other user I/O 3106 components include voice or speech command systems, touchpads and touchscreens, printers, projectors, etc. Exemplary processors include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 3104, which may be a Random Access Memory (RAM), may store a plurality of program libraries or modules, such as an operating system 3122, and one or more application programs that interface to the operating system 3122, such as the program development environment 300 and/or the parallel code generator 400.

The removable medium drive 3110 may accept and read a computer readable medium 3126, such as a CD, DVD, floppy disk, solid state drive, tape, flash memory or other non-transitory medium. The removable medium drive 3110 may also write to the computer readable medium 3124.

Suitable computer systems include personal computers (PCs), workstations, servers, laptops, tablets, palm computers, smart phones, electronic readers, and other portable computing devices, etc. Nonetheless, those skilled in the art will understand that the computer system 3100 of FIG. 31 is intended for illustrative purposes only, and that the present invention may be used with other computer, data processing, or computational systems or devices. The present invention may also be used in a computer network, e.g., client-server, architecture, or a public and/or private cloud computing arrangement. For example, the modeling environment 3100 may be hosted on one or more cloud servers or devices, and accessed by remote clients through a web portal or an application hosting system, such as the Remote Desktop Connection tool from Microsoft Corp.

Suitable operating systems 3122 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 3122 may provide services or functions for applications or modules, such as allocating memory, organizing data objects or files according to a file system, prioritizing requests, managing I/O, etc. The operating system 3122 may run on a virtual machine, which may be provided by the data processing system 3100.

As indicated above, a user, such as an engineer, scientist, programmer, developer, etc., may utilize one or more input devices, such as the keyboard 3116, the mouse 3118, and the display 3120 to operate the program development environment 300 and/or the parallel code generator 400.

Figure 32:
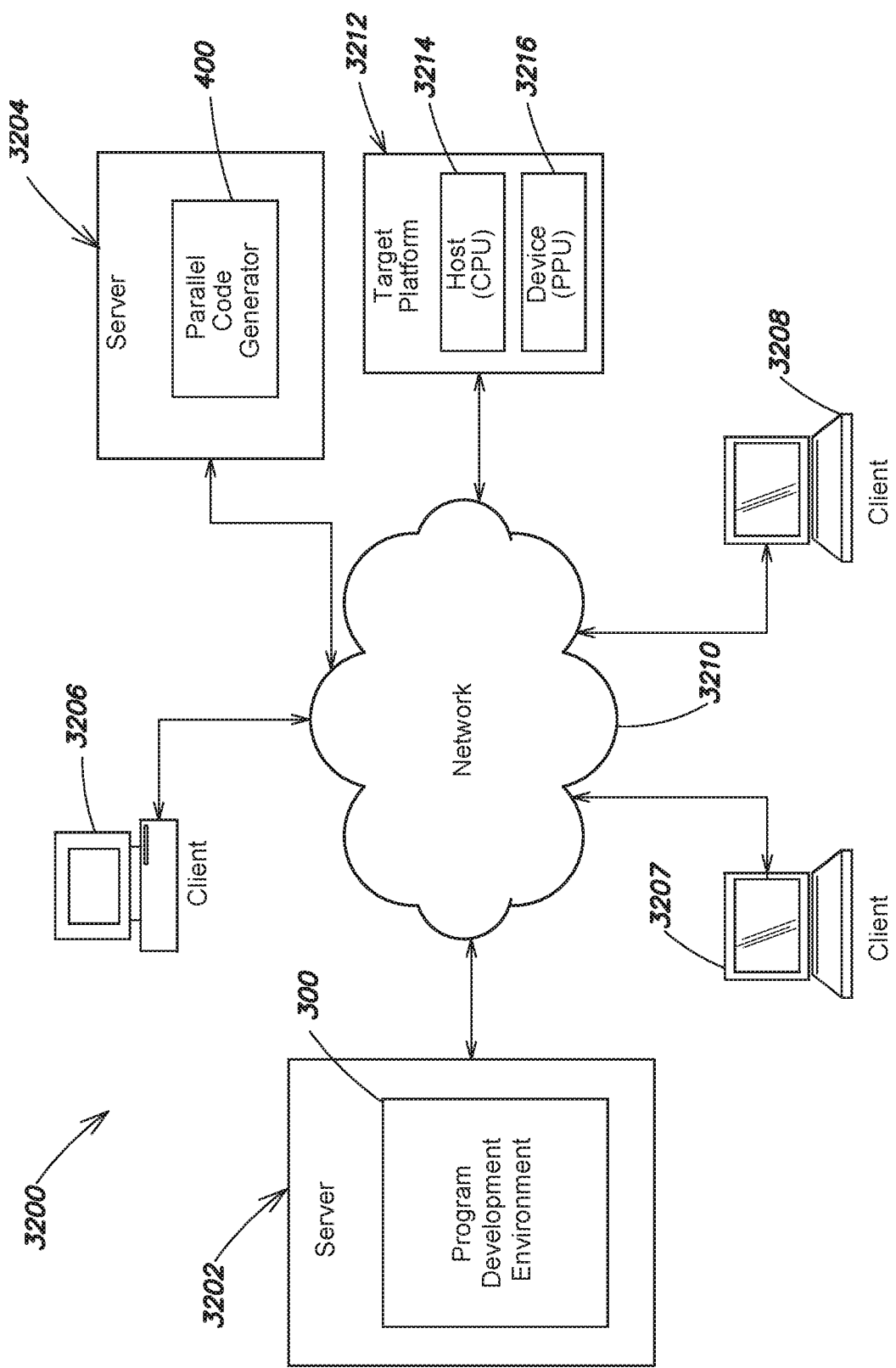
FIG. 32 is a schematic diagram of an example distributed computing environment in accordance with an embodiment.

FIG. 32 is a schematic diagram of a distributed computing environment 3200 in which systems and/or methods described herein may be implemented. The environment 3200 may include client and server devices, such as two servers 3202 and 3204, and three clients 3206-3208, interconnected by one or more networks, such as network 3210. The distributed computing environment 3200 also may include a target platform 3212, which may include a host (CPU) 3214 and a device (PPU) 3216. The servers 3202 and 3204 may include applications or processes accessible by the clients 3206-3208. For example, the server 3202 may run the program development environment 300. The server 3204 may run the parallel code generator 400. The devices of the environment 3200 may interconnect via wired connections, wireless connections, or a combination of wired and wireless connections.

The servers 3202 and 3204 may include one or more devices capable of receiving, generating, storing, processing, executing, and/or providing information. For example, the servers 3202 and 3204 may include a computing device, such as a server, a desktop computer, a laptop computer, a tablet computer, a handheld computer, or a similar device. In some implementations, the servers 3202 and 3204 may host the program development environment 300 and/or the parallel code generator 400.

The clients 3206-3208 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 3206-3208 may download data and/or code from the servers 3202 and 3204 via the network 3210. In some implementations, the clients 3206-3208 may be desktop computers, workstations, laptop computers, tablet computers, handheld computers, mobile phones (e.g., smart phones, radiotelephones, etc.), electronic readers, or similar devices. In some implementations, the clients 3206-3208 may receive information from and/or transmit information to the servers 3202 and 3204.

The network 3210 may include one or more wired and/or wireless networks. For example, the network 3210 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The number of devices and/or networks shown in FIG. 32 is provided as an example. In practice, there may be additional devices and/or networks, fewer devices and/or networks, different devices and/or networks, or differently arranged devices and/or networks than those shown in FIG. 32. Furthermore, two or more devices shown in FIG. 32 may be implemented within a single device, or a single device shown in FIG. 32 may be implemented as multiple, distributed devices. Additionally, one or more of the devices of the distributed computing environment 3200 may perform one or more functions described as being performed by another one or more devices of the environment 3200.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. For example, generated code may be utilized advantageously with other embedded hardware, such as embedded hardware that includes floating point cores. Therefore, it is the object of the appended claims to cover all such variations and modifications as come within the true spirit and scope of the disclosure.

EXAMPLES

The following examples implement one or more aspects of methods and/or systems of the present disclosure. These examples are non-limiting examples. Features of different examples may be combined in other implementations. Features of each example may be modified or removed in other implementations.

Aspect 1. A computer-implemented method for generating target code optimized for a parallel processing device coupled to a sequential processing host, from one or more in-memory intermediate representations (IRs) for a source program having a sequential format, the method comprising:

identifying one or more segments in the one or more in-memory intermediate representations (IRs) for the source program suitable for parallel execution; and partitioning the one or more in-memory IRs for the source program into serial code segments and parallel code segments based on the identified segments;

determining a number of thread blocks and a number of threads per thread block for executing at least one of the parallel code segments, the determining based on an analysis of the at least one of the parallel code segments of the one or more in-memory IRs; and converting the at least one of the parallel code segments of the one or more in-memory IRs for the source program, into a kernel, where the converting includes:

adding a declaration marking the at least one of the parallel code segments of the one or more in-memory IRs of the source program for execution on the parallel processing device, adding a kernel launch directive that includes the number of thread blocks and the number of threads per block, adding a first data transfer instruction for transferring first data from the sequential processing host to the parallel processing device, adding a synchronization instruction for synchronizing the threads of the thread blocks, and adding a second data transfer instruction for transferring second data from the parallel processing device to the sequential processing host, wherein the declaration, the kernel launch directive, the first data transfer instruction, the synchronization instruction, and the second data transfer instruction conform to a predefined heterogeneous programming model.

Aspect 2. The computer-implemented method of the previous aspect further comprising:

generating the one or more in-memory intermediate representations (IRs) from the source program, wherein the step of generating the one or more in-memory intermediate representations (IRs) from the source program is carried out before the step of identifying the one or more segments.

Aspect 3. The computer-implemented method of any of the previous aspects, wherein the identifying further comprises locating syntax in the one or more in-memory IRs for the source program identified as:
a for-loop,
an element-wise matrix math operation,
an element-wise vector math operation,
a scatter-gather operation, or
a reduction operation.

Aspect 4. The computer-implemented method of aspect 3 wherein a given for-loop includes a number of loop iterations, the identifying further comprising:

testing whether the given for-loop is suitable for parallel execution, the testing including confirming that the number of loop iterations is fixed or bounded, and that the loop iterations of the given for-loop are independent of each other.

Aspect 5. The computer-implemented method of any of the preceding aspects, wherein the parallel code segments contain one of more loops, each loop containing two or more iterations, each iteration identified with an index number, and the converting further comprises:

adding an instruction for storing the result of each thread execution of each thread block on a memory location of the second data;

wherein the address on the memory location is a function of the index number;

an id of each thread is a function of the index number; and the instruction for storing conforms to a predefined heterogeneous programming model.

Aspect 6. The computer-implemented method of any of the preceding aspects, in particular of aspect 1 further comprising:

applying one or more compiler transformations to the one or more in-memory IRs for the source program, wherein the partitioning is performed after the applying the one or more compiler transformations.

Aspect 7. The computer-implemented method of the aspect 6 wherein the one or more compiler transformations lowers a function of the one or more in-memory IRs for the source program into a form that includes a for-loop, and at least one of the parallel code segments identified as suitable for parallel execution includes the for-loop.

Aspect 8. The computer-implemented method of any of the preceding aspects, in particular of aspect 1 wherein the determining step further determines a grid dimension for the kernel, and the kernel launch directive further includes organizing the thread blocks according to the grid dimension.

Aspect 9. The computer-implemented method of any of the preceding aspects, in particular of aspect 1 wherein the partitioning step produces a plurality of parallel code segments that are converted into a plurality of kernels, the method further comprising:

creating a kernel dependency graph having nodes that represent the plurality of kernels, and edges that represent data dependencies among the plurality of kernels;

applying a clique partitioning algorithm to the kernel dependency graph to derive a set of cliques where a number of the edges between the set of cliques is minimized; and assigning the plurality of kernels to respective streams of the parallel processing device based on the set of cliques.

Aspect 10. The computer-implemented method of any of the preceding aspects, in particular of aspect 1 further comprising:

applying a use-definition analysis to variables shared between the serial code segments and the parallel code segments; and based on the use-definition analysis, removing a number of data transfer instructions among the serial code segments and the parallel code segments.

Aspect 11. The computer-implemented method of any of the preceding aspects, in particular of aspect 1 further comprising:

detecting a first serial code segment disposed between a first parallel code segment and a second parallel code segment;

converting the first serial code segment into a new kernel where the new kernel includes a single thread; and eliminating at least one data transfer instruction between the first serial code segment and the first or second parallel code segments.

Aspect 12. The computer-implemented method of any of the preceding aspects, in particular of aspect 1 wherein the parallel processing device includes a Global Memory and a Shared Memory, the method further comprising:

searching at least one of the parallel code segments for a data locality characteristic; and performing at least one of:
modifying the kernel for the at least one of the parallel code segments to perform a collaborative load of data from the Global Memory to the Shared Memory, or
modifying the kernel for the at least one of the parallel code segments such that threads of the kernel for the at least one of the parallel code segments compute more than one result from a given input data set.

Aspect 13. The computer-implemented method of any of the preceding aspects, in particular of aspect 1 further comprising:

detecting an occurrence of a predefined compiler pragma in the one or more in-memory IRs for the source program, wherein the predefined pragma marks a given region of the one or more in-memory IRs for the source program that is not proven to be parallel; and converting the given region of the one or more in-memory IRs for the source program into a given kernel for execution by the parallel processing device.

Aspect 14. The computer-implemented method of any of the preceding aspects, in particular of aspect 13, wherein the predefined compiler pragma specifies a particular number of thread blocks and a particular number of threads per block, the converting the given region of the one or more in-memory IRs for the source program into the given kernel includes:

adding a given kernel launch directive that includes the particular number of thread blocks and the particular number of threads per block.

Aspect 15. The computer-implemented method of any of the preceding aspects, in particular of aspect 1 wherein the predefined heterogeneous programming model is Compute Unified Device Architecture (CUDA), Open Computing Language (OpenCL), or DirectCompute.

Aspect 16. The computer-implemented method of any of the preceding aspects, in particular of aspect 1 wherein the sequential processing host includes a Central Processing Unit (CPU) coupled to a host memory, and the parallel processing device includes a Parallel Processing Unit (PPU).

Aspect 17. The computer-implemented method of any of the preceding aspects, in particular of aspect 1 wherein the one or more IRs for the source program include a nested structure of for-loops, the for-loops of the nested structure including loop bounds, the method further comprising:

identifying sets of the for-loops of the nested loop structure that satisfy a parallel loop analysis check and that are contiguous within the nested loop structure;

identifying the set from the sets of the for-loops whose product of the loop bounds is largest; and converting the set of the for-loops whose product of the loop bounds is largest to a given kernel for parallel execution by the parallel processing device.

Aspect 18. The computer-implemented method of any of the preceding aspects, wherein the parallel processing device comprises at least two threads executed in parallel, and a first execution of a parallel code segment of the parallel code segments is executed on a first thread, and a second execution of the parallel code segment is executed on a second thread.

Aspect 19. A computer-readable storage medium comprising instructions which, when executed by a computer, cause the computer to carry out the computer-implemented method of any of the preceding aspects.

Aspect 20. A computer-readable storage medium comprising instructions generated from any of the computer-implemented methods of aspects 1 to 17.

Aspect 21. A method comprising dynamically analyzing, by a processor, code generated for executing the source program in the data processing environment to determine when a variable is used at the parallel processing device following a change to a value of the variable at the sequential processing host; and inserting, by the processor, a memory transfer function into the code to transfer the value of the variable from the sequential processing host to the parallel processing device, wherein the processor inserts the memory transfer function in the code at a location before the variable is used at the parallel processing device.

Aspect 22. A method of the previous aspect wherein the dynamically analyzing includes a Use-Definition analysis of the code generated for executing the source program in the data processing environment.

The invention claimed is:

1. A method comprising:
for a source program including a format for sequential execution, generating code, by one or more processors, for executing the source program in a data processing environment that includes a parallel processing device coupled to a sequential processing host, the generating including:
generating one or more in-memory intermediate representations (IRs) for the source program;
identifying a nested loop structure of for-loops in the one or more in-memory IRs, wherein the for-loops included in the nested loop structure include loop bounds;
applying, by the one or more processors, a parallel loop analysis check to the for-loops included in the nested loop structure to identify one or more sets of the for-loops suitable for parallel execution by the parallel processing device;
determining, by the one or more processors, a number of thread blocks and a number of threads per thread block for parallel execution of the one or more sets of the for-loops by the parallel processing device, wherein the number of thread blocks and the number of threads per thread block are determined based on one or more of the loop bounds; and
converting, by the one or more processors, the one or more sets of the for-loops into a kernel for parallel execution by the parallel processing device, wherein the converting includes:
adding a kernel launch directive that includes the number of thread blocks and the number of threads per thread block,
wherein the kernel launch directive conforms to a predefined heterogeneous programming model.

2. The method of claim 1 wherein, for a given for-loop that includes an iteration range and iterations, the parallel loop analysis check determines whether the iteration range of the given for-loop is deterministic, and whether the iterations of the given for-loop are independent of each other.

3. The method of claim 2 wherein the one or more sets of the for-loops include iterations and the parallel loop analysis check further determines whether the iterations of the one or more sets of the for-loops are independent of each other.

4. The method of claim 1 wherein the for-loops included in the nested loop structure include iterations, and the number of thread blocks and the number of threads per thread block are functions of the number of the iterations.

5. The method of claim 4 wherein
the converting is performed on a given set of the for-loops whose product of the loop bounds is largest,
a total number of iterations, m, for the given set of the for-loops whose product of the loop bounds is largest is computed as m=product of the number of iterations of each for-loop within the given set, and
the number of threads per thread block is computed as a minimum of (1) a multiple of a warp size of the parallel processing device that is closest to m and (2) a maximum possible thread block size of the parallel processing device.

6. The method of claim 5 wherein the number of thread blocks is computed by dividing m by the number of threads per thread block to produce a result, and rounding the result to a nearest integer equal to or greater than the result.

7. The method of claim 4 further comprising:
determining, by the one or more processors, a grid dimension for the number of thread blocks, wherein the grid dimension is a function of the number of iterations of the nested loop structure.

8. The method of claim 7 wherein the parallel processing device includes a Parallel Processing Unit (PPU), and the determining the grid dimension is based upon a maximum number of allowable threads per dimension of the PPU.

9. The method of claim 1 further comprising: applying one or more compiler transformations to the one or more in-memory IRs for the source program, wherein the one or more compiler transformations lowers a function included in the one or more in-memory IRs into the nested loop structure of the for-loops.

10. The method of claim 9 wherein the function includes at least one of:
an element-wise matrix math operation;
an element-wise vector math operation;
a scatter-gather operation; or
a reduction operation.

11. The method of claim 1 wherein the generating the code for executing the source program further includes performing at least one of the following optimizations on the nested loop structure of the for-loops: scalar replacement; loop fusion; loop normalization; loop interchange; loop perfectization; dynamic loop processing; opposite of loop-invariant code motion; or auxiliary loop variable lowering.

12. The method of claim 1 wherein the predefined heterogeneous programming model is Compute Unified Device Architecture (CUDA), Open Computing Language (OpenCL), or DirectCompute.

13. The method of claim 1 further comprising:
identifying a given set of the one or more sets of the for-loops using a criteria, wherein
the converting is performed on the given set of the one or more sets of the for-loops, and
the criteria for identifying the given set includes at least one of:
identifying a first set from the one or more sets whose product of the loop bounds is largest;
identifying a second set from the one or more sets including a given loop whose loop bounds is largest; or
identifying a third set from the one or more sets including a highest computation load.

14. The method of claim 1 wherein the sequential processing host includes a Central Processing Unit (CPU) coupled to a host memory, and the parallel processing device includes a Parallel Processing Unit (PPU).

15. A method comprising:
for a source program including a format for sequential execution,
generating code, by one or more processors, for executing the source program in a data processing environment that includes a parallel processing device coupled to a sequential processing host, the generating including:
generating one or more in-memory intermediate representations (IRs) for the source program;
partitioning, by the one or more processors, the one or more in-memory IRs for the source program into serial code segments and parallel code segments identified as suitable for parallel execution;
determining, by the one or more processors, a number of thread blocks and a number of threads per thread block for executing one or more of the parallel code segments, the determining based on an analysis of the one or more of the parallel code segments; and
converting, by the one or more processors, the one or more of the parallel code segments into one or more kernels, where the converting includes:
applying one or more optimizations to the one or more in-memory IRs, where the one or more optimizations includes:
detecting a first serial code segment of the serial code segments as being disposed between a first parallel code segment of the parallel code segments and a second parallel code segment of the parallel code segments;
converting the first serial code segment of the serial code segments into a new kernel where the new kernel includes a single thread in a single thread block; and
adding a kernel launch directive that includes the number of thread blocks and the number of threads per thread block, wherein the kernel launch directive conforms to a predefined heterogeneous programming model.

16. The method of claim 15 wherein the applying the one or more optimizations further includes:
applying, by the one or more processors, a use-definition analysis to variables shared between the serial code segments and the parallel code segments; and
based on the use-definition analysis, eliminating a plurality of data transfer instructions among the serial code segments and the parallel code segments.

17. The method of claim 16 further comprising:
performing the use-definition analysis at run-time.

18. The method of 16 further comprising:
using results of the use-definition analysis to insert one or more conditional data transfers in the code among the serial code segments and the parallel code segments.

19. The method of claim 15 wherein the predefined heterogeneous programming model is Compute Unified Device Architecture (CUDA), Open Computing Language (OpenCL), or DirectCompute.

20. The method of claim 15 wherein the applying the one or more optimizations to the one or more in-memory IRs further includes:
configuring a first kernel of the one or more kernels to perform a collaborative load of a number of data elements associated with an input array from a Global Memory of the parallel processing device to a Shared Memory of the parallel processing device wherein the number of data elements is a function of a number of threads executing the first kernel.

21. The method of claim 20 wherein the configuring the first kernel of the one or more kernels includes:
configuring threads of the first kernel to compute more than one result from a given input data set.

22. The method of claim 20 wherein the configuring the first kernel of the one or more kernels to perform the collaborative load includes:
identifying, by the one or more processors, a stencil operation included in the one or more of the parallel code segments, the stencil operation utilizing a window to process the input array to compute an output array;
determining, by the one or more processors, a number of threads of the first kernel, a size of the input array, and a size of the window; and
providing, by the one or more processors, one or more memory operations that instruct the number of threads of the first kernel to cooperatively transfer a region of the input array into the Shared Memory.

23. The method of claim 22 wherein the one or more memory operations instruct successive ones of the number of threads of the first kernel to transfer neighboring memory locations of the region from the Global Memory to the Shared Memory.

24. The method of claim 22 wherein the converting further includes:
adding a first data transfer instruction for transferring first data from the sequential processing host to the parallel processing device;
adding a synchronization instruction for synchronizing the threads of the thread blocks; and
adding a second data transfer instruction for transferring second data from the parallel processing device to the sequential processing host,
wherein the first data transfer instruction, the synchronization instruction, and the second data transfer instruction conform to the predefined heterogeneous programming model.

25. The method of claim 20 wherein the configuring the threads of the first kernel of the one or more kernels includes:
identifying a matrix-matrix operation included in the one or more of the parallel code segments, the matrix-matrix operation processing the input array including rows and columns to compute an output array including elements;
for the matrix-matrix operation, determining a number of threads of the first kernel and a size of the input array; and
directing a given thread of the first kernel to compute more than one of the elements of the output array for a given one of the rows or columns of the input array.

26. A method comprising:
for a source program conforming to a programming language and including a format for sequential execution,
providing one or more data structures that map sequential function calls to parallel function calls that are predefined for execution on a parallel processing device and implemented through an extension to the programming language of the source program or through a different language than the programming language of the source program, wherein the sequential function calls perform at least one of array-based operations or matrix-based operations; and
generating code, by one or more processors, for executing the source program in a data processing environment that includes a parallel processing device coupled to a sequential processing host, the generating including:
detecting an occurrence of a given sequential function call of the sequential function calls in the source program;
identifying a predefined parallel function call implementing equivalent functionality as the given sequential function call detected in the source program, where the identifying includes performing a look up on the one or more data structures; and
including the predefined parallel function call identified as implementing equivalent functionality in the code generated for the source program, where the predefined parallel function call replaces the occurrence of the given sequential function call wherein the predefined parallel function call that replaces the occurrence of the given sequential function call is selected from at least one of:
a first library of Fast Fourier Transform (FFT) functions optimized for the parallel processing device;
a second library of Deep Neural Network (DNN) functions optimized for the parallel processing device;
a third library of Basic Linear Algebra Subprograms (BLAS) functions optimized for the parallel processing device; or
a fourth library of dense and sparse direct solvers for use with Computer Vision, Computational Fluid Dynamics, Computational Chemistry, and Linear Optimization (SOLVER) functions optimized for the parallel processing device.

27. The method of claim 26 wherein the sequential function calls are function calls according to at least one of MATLAB, Fortran, Java, Python, Julia, Ada, Octave, or MathScript programming language.

28. The method of claim 26 wherein:
the first library is a CUDA Fast Fourier Transform (cuFFT) Library;
the second library is a CUDA Deep Neural Network (cuDNN) Library;
the third library is a CUDA Basic Linear Algebra Subprograms (cuBLAS) Library; or
the fourth library a CUDA dense and sparse direct solvers for use with Computer Vision, Computational Fluid Dynamics, Computational Chemistry, and Linear Optimization (cuSOLVER) Library.

29. The method of claim 26 wherein
the sequential function calls include a data type of at least one of an input argument or an output argument of the sequential function calls, and
the identifying the predefined parallel function call is based on the data type of the at least one of the input argument or the output argument of the sequential function calls.

30. One or more non-transitory computer-readable media having stored thereon instructions that, when executed by a computing device, cause the computing device to perform operations comprising:
for a source program including a format for sequential execution,
generating code for executing the source program in a data processing environment that includes a parallel processing device coupled to a sequential processing host, the generating including:
generating one or more in-memory intermediate representations (IRs) for the source program;
identifying a nested loop structure of for-loops in the one or more in-memory IRs, wherein the for-loops included in the nested loop structure include loop bounds;
applying a parallel loop analysis check to the for-loops included in the nested loop structure to identify one or more sets of the for-loops suitable for parallel execution by the parallel processing device;
determining a number of thread blocks and a number of threads per thread block for parallel execution of the one or more sets of the for-loops by the parallel processing device, wherein the number of thread blocks and the number of threads per thread block are determined based on one or more of the loop bounds; and
converting the one or more sets of the for-loops into a kernel for parallel execution by the parallel processing device, wherein the converting includes:

adding a kernel launch directive that includes the number of thread blocks and the number of threads per thread block,
wherein the kernel launch directive conform to a predefined heterogeneous programming model.

31. The one or more non-transitory computer-readable media of claim 30 wherein, for a given for-loop that includes an iteration range and iterations, the parallel loop analysis check determines whether the iteration range of the given for-loop is deterministic, and whether the iterations of the given for-loop are independent of each other.

32. The one or more non-transitory computer-readable media of claim 31 wherein the one or more sets of the for-loops include interactions and the parallel loop analysis check further determines whether the iterations of the one or more sets of the for-loops are independent of each other.

33. The one or more non-transitory computer-readable media of claim 30 wherein the for-loops of the nested loop structure include iterations, and the number of thread blocks and the number of threads per thread block are functions of the number of iterations.

34. The one or more non-transitory computer-readable media of claim 33 wherein
the converting is performed on a given set of the for-loops whose product of the loop bounds is largest,
a total number of iterations, m, for the given set of the for-loops whose product of the loop bounds is largest is computed as m=product of the number of iterations of each for-loop within the given set, and
the number of threads per thread block is computed as a minimum of (1) a multiple of a warp size of the parallel processing device that is closest to m and (2) a maximum possible thread block size of the parallel processing device.

35. The one or more non-transitory computer-readable media of claim 34 wherein the number of thread blocks is computed by dividing m by the number of threads per thread block to produce a result, and rounding the result to a nearest integer equal to or greater than the result.

36. The one or more non-transitory computer-readable media of claim 33 wherein the operations further comprise:
determining a grid dimension for the number of thread blocks, wherein the grid dimension is a function of the number of iterations of the nested loop structure.

37. The one or more non-transitory computer-readable media of claim 36 wherein the parallel processing device includes a Parallel Processing Unit (PPU), and the determining the grid dimension is based upon a maximum number of allowable threads per dimension of the PPU.

38. The one or more non-transitory computer-readable media of claim 30 wherein the operations further comprise:
applying one or more compiler transformations to the one or more in-memory IRs for the source program, wherein the one or more compiler transformations lowers a function included in the one or more in-memory IRs into the nested loop structure of for-loops.

39. The one or more non-transitory computer-readable media of claim 38 wherein the function includes at least one of:
an element-wise matrix math operation;
an element-wise vector math operation;
a scatter-gather operation; or
a reduction operation.

40. The one or more non-transitory computer-readable media of claim 30 wherein the generating the code for executing the source program further includes performing at least one of the following optimizations on the nested loop structure of the for-loops: scalar replacement; loop fusion; loop normalization; loop interchange; loop perfectization; dynamic loop processing; opposite of loop-invariant code motion; or auxiliary loop variable lowering.

41. The one or more non-transitory computer-readable media of claim 30 wherein the predefined heterogeneous programming model is Compute Unified Device Architecture (CUDA), Open Computing Language (OpenCL), or DirectCompute.

42. The one or more non-transitory computer-readable media of claim 30 wherein the operations further comprise:
identifying a given set of the one or more sets of the for-loops using a criteria, wherein
the converting is performed on the given set of the one or more sets of the for-loops, and
the criteria for identifying the given set includes at least one of:
identifying a first set from the one or more sets whose product of the loop bounds is largest;
identifying a second set from the one or more sets including a given loop whose loop bounds is largest; or
identifying a third set from the one or more sets including a highest computation load.

43. The one or more non-transitory computer-readable media of claim 30 wherein the sequential processing host includes a Central Processing Unit (CPU) coupled to a host memory, and the parallel processing device includes a Parallel Processing Unit (PPU).

44. An apparatus comprising:
a memory storing a source program including a format for sequential execution; and
one or more processors coupled to the memory, the one or more processors configured to:
generate code for executing the source program in a data processing environment that includes a parallel processing device coupled to a sequential processing host, the generating including:
generate one or more in-memory intermediate representations (IRs) for the source program;
identify a nested loop structure of for-loops in the one or more in-memory IRs, wherein the for-loops included in the nested structure include loop bounds;
apply a parallel loop analysis check to the for-loops included in the nested loop structure to identify one or more sets of the for-loops suitable for parallel execution by the parallel processing device;
determine a number of thread blocks and a number of threads per thread block for parallel execution of the one or more sets of the for-loops by the parallel processing device, wherein the number of thread blocks and the number of threads per thread block are determined based on one or more of the loop bounds; and
convert the one or more sets of the for-loops into a kernel for parallel execution by the parallel processing device, wherein the convert includes:
adding a kernel launch directive that includes the number of thread blocks and the number of threads per thread block,
wherein the kernel launch directive conform to a predefined heterogeneous programming model.

45. The apparatus of claim 44 wherein, for a given for-loop that includes an iteration range and iterations, the parallel loop analysis check determines whether the iteration range of the given for-loop is deterministic, and whether the iterations of the given for-loop are independent of each other.

46. The apparatus of claim 45 wherein the one or more sets of the for-loops include interactions and the parallel loop analysis check further determines whether the iterations of the one or more sets of the for-loops are independent of each other.

47. The apparatus of claim 44 wherein the for-loops of the nested loop structure include iterations, and the number of thread blocks and the number of threads per thread block are functions of the number of iterations.

48. The apparatus of claim 47 wherein
the convert is performed on a given set of the for-loops whose product of the loop bounds is largest,
a total number of iterations, m, for the given set of the for-loops whose product of the loop bounds is largest is computed as m=product of the number of iterations of each for-loop within the given set, and
the number of threads per thread block is computed as a minimum of (1) a multiple of a warp size of the parallel processing device that is closest to m and (2) a maximum possible thread block size of the parallel processing device.

49. The apparatus of claim 48 wherein the number of thread blocks is computed by dividing m by the number of threads per thread block to produce a result, and rounding the result to a nearest integer equal to or greater than the result.

50. The apparatus of claim 47 wherein the one or more processors are further configured to:
determine a grid dimension for the number of thread blocks, wherein the grid dimension is a function of the number of iterations of the nested loop structure.

51. The apparatus of claim 50 wherein the parallel processing device includes a Parallel Processing Unit (PPU), and the determining the grid dimension is based upon a maximum number of allowable threads per dimension of the PPU.

52. The apparatus of claim 44 wherein the one or more processors are further configured to:
apply one or more compiler transformations to the one or more in-memory IRs for the source program, wherein the one or more compiler transformations lowers a function included in the one or more in-memory IRs into the nested loop structure of for-loops.

53. The apparatus of claim 52 wherein the function includes at least one of:
an element-wise matrix math operation;
an element-wise vector math operation;
a scatter-gather operation; or
a reduction operation.

54. The apparatus of claim 44 wherein the generate the code for executing the source program further includes performing at least one of the following optimizations on the nested loop structure of the for-loops: scalar replacement; loop fusion; loop normalization; loop interchange; loop perfectization; dynamic loop processing; opposite of loop-invariant code motion; or auxiliary loop variable lowering.

55. The apparatus of claim 44 wherein the predefined heterogeneous programming model is Compute Unified Device Architecture (CUDA), Open Computing Language (OpenCL), or DirectCompute.

56. The apparatus of claim 44 wherein the one or more processors are further configured to:
identify a given set of the one or more sets of the for-loops using a criteria, wherein
the convert is performed on the given set of the one or more sets of the for-loops, and
the criteria for identifying the given set includes at least one of:
identifying a first set from the one or more sets whose product of the loop bounds is largest;
identifying a second set from the one or more sets including a given loop whose loop bounds is largest; or
identifying a third set from the one or more sets including a highest computation load.

57. The apparatus of claim 44 wherein the sequential processing host includes a Central Processing Unit (CPU) coupled to a host memory, and the parallel processing device includes a Parallel Processing Unit (PPU).

58. One or more non-transitory computer-readable media having stored thereon instructions that, when executed by a computing device, cause the computing device to perform operations comprising:
for a source program including a format for sequential execution,
generating code for executing the source program in a data processing environment that includes a parallel processing device coupled to a sequential processing host, the generating including:
generating one or more in-memory intermediate representations (IRs) for the source program;
partitioning the one or more in-memory IRs for the source program into serial code segments and parallel code segments identified as suitable for parallel execution;
determining a number of thread blocks and a number of threads per thread block for executing one or more of the parallel code segments, the determining based on an analysis of the one or more of the parallel code segments; and
converting the one or more of the parallel code segments into one or more kernels, where the converting includes:
applying one or more optimizations to the one or more in-memory IRs, where the one or more optimizations includes:
detecting a first serial code segment of the serial code segments as being disposed between a first parallel code segment of the parallel code segments and a second parallel code segment of the parallel code segments;
converting the first serial code segment of the serial code segments into a new kernel where the new kernel includes a single thread in a single thread block; and
adding a kernel launch directive that includes the number of thread blocks and the number of threads per thread block,
wherein the kernel launch directive conforms to a predefined heterogeneous programming model.

59. The one or more non-transitory computer-readable media of claim 58 wherein the applying the one or more optimizations further includes:
applying a use-definition analysis to variables shared between the serial code segments and the parallel code segments; and
based on the use-definition analysis, eliminating a plurality of data transfer instructions among the serial code segments and the parallel code segments.

60. The one or more non-transitory computer-readable media of claim 59 wherein the operations further comprise:
performing the use-definition analysis at run-time.

61. The one or more non-transitory computer-readable media of 59 wherein the operations further comprise:
    using results of the use-definition analysis to insert one or more conditional data transfers in the code among the serial code segments and the parallel code segments.

62. The one or more non-transitory computer-readable media of claim 58 wherein the predefined heterogeneous programming model is Compute Unified Device Architecture (CUDA), Open Computing Language (OpenCL), or DirectCompute.

63. The one or more non-transitory computer-readable media of claim 58 wherein the applying the one or more optimizations to the one or more in-memory IRs further includes:
    configuring a first kernel of the one or more kernels to perform a collaborative load of a number of data elements associated with an input array from a Global Memory of the parallel processing device to a Shared Memory of the parallel processing device wherein the number of data elements is a function of a number of threads executing the first kernel.

64. An apparatus comprising:
    a memory storing a source program including a format for sequential execution; and
    one or more processors configured to:
        generate code for executing the source program in a data processing environment that includes a parallel processing device coupled to a sequential processing host, the generating including:
            generate one or more in-memory intermediate representations (IRs) for the source program;
            partition the one or more in-memory IRs for the source program into serial code segments and parallel code segments identified as suitable for parallel execution;
            determine a number of thread blocks and a number of threads per thread block for executing one or more of the parallel code segments, the determining based on an analysis of the one or more of the parallel code segments; and
            convert the one or more of the parallel code segments into one or more kernels, where the converting includes:
                applying one or more optimizations to the one or more in-memory IRs, where the one or more optimizations includes:
                    detecting a first serial code segment of the serial code segments as being disposed between a first parallel code segment of the parallel code segments and a second parallel code segment of the parallel code segments;
                    converting the first serial code segment of the serial code segments into a new kernel where the new kernel includes a single thread in a single thread block; and
                    adding a kernel launch directive that includes the number of thread blocks and the number of threads per thread block,
                wherein the kernel launch directive conforms to a predefined heterogeneous programming model.

65. The apparatus of claim 64 wherein the applying the one or more optimizations further includes:
    applying a use-definition analysis to variables shared between the serial code segments and the parallel code segments; and
    based on the use-definition analysis, eliminating a plurality of data transfer instructions among the serial code segments and the parallel code segments.

66. The apparatus of claim 65 wherein the operations further comprise:
    performing the use-definition analysis at run-time.

67. The apparatus of 65 wherein the one or more processors are further configured to:
    use results of the use-definition analysis to insert one or more conditional data transfers in the code among the serial code segments and the parallel code segments.

68. The apparatus of claim 64 wherein the predefined heterogeneous programming model is Compute Unified Device Architecture (CUDA), Open Computing Language (OpenCL), or DirectCompute.

69. The apparatus of claim 64 wherein the applying the one or more optimizations to the one or more in-memory IRs further includes:
    configuring a first kernel of the one or more kernels to perform a collaborative load of a number of data elements associated with an input array from a Global Memory of the parallel processing device to a Shared Memory of the parallel processing device wherein the number of data elements is a function of a number of threads executing the first kernel.

70. One or more non-transitory computer-readable media having stored thereon instructions that, when executed by a computing device, cause the computing device to perform operations comprising:
    for a source program conforming to a programming language and including a format for sequential execution,
    providing one or more data structures that map sequential function calls to parallel function calls that are predefined for execution on a parallel processing device and implemented through an extension to the programming language of the source program or through a different language than the programming language of the source program, wherein the sequential function calls perform at least one of array-based operations or matrix-based operations; and
    generating code for executing the source program in a data processing environment that includes a parallel processing device coupled to a sequential processing host, the generating including:
        detecting an occurrence of a given sequential function call of the sequential function calls in the source program;
        identifying a predefined parallel function call implementing equivalent functionality as the given sequential function call detected in the source program, where the identifying includes performing a look up on the one or more data structures; and
        including the predefined parallel function call identified as implementing equivalent functionality in the code generated for the source program, where the predefined parallel function call replaces the occurrence of the given sequential function call,
    wherein the predefined parallel function call that replaces the occurrence of the given sequential function call is selected from at least one of:
        a first library of Fast Fourier Transform (FFT) functions optimized for the parallel processing device;
        a second library of Deep Neural Network (DNN) functions optimized for the parallel processing device;
        a third library of Basic Linear Algebra Subprograms (BLAS) functions optimized for the parallel processing device; or a fourth library of dense and sparse direct solvers for use with Computer Vision, Computational Fluid Dynamics, Computational Chemistry, and Linear Optimization (SOLVER) functions optimized for the parallel processing device.

71. The one or more non-transitory computer-readable media of claim 70 wherein the sequential function calls are function calls according to at least one of MATLAB, Fortran, Java, Python, Julia, Ada, Octave, or MathScript programming language.

72. The one or more non-transitory computer-readable media of claim 70 wherein:
the first library is a CUDA Fast Fourier Transform (cuFFT) Library;
the second library is a CUDA Deep Neural Network (cuDNN) Library;
the third library is a CUDA Basic Linear Algebra Subprograms (cuBLAS) Library; or
the fourth library a CUDA dense and sparse direct solvers for use with Computer Vision, Computational Fluid Dynamics, Computational Chemistry, and Linear Optimization (cuSOLVER) Library.

73. The one or more non-transitory computer-readable media of claim 70 wherein
the sequential function calls include a data type of at least one of an input argument or an output argument of the sequential function calls, and
the identifying the predefined parallel function call is based on the data type of the at least one of the input argument or the output argument of the sequential function calls.

74. An apparatus comprising:
a memory storing a source program conforming to a programming language and including a format for sequential execution; and
one or more processors configured to:
provide one or more data structures that map sequential function calls to parallel function calls that are predefined for execution on a parallel processing device and implemented through an extension to the programming language of the source program or through a different language than the programming language of the source program, wherein the sequential function calls perform at least one of array-based operations or matrix-based operations; and
generate code for executing the source program in a data processing environment that includes a parallel processing device coupled to a sequential processing host, the generating including:
detect an occurrence of a given sequential function call of the sequential function calls in the source program;
identify a predefined parallel function call implementing equivalent functionality as the given sequential function call detected in the source program, where the identifying includes performing a look up on the one or more data structures; and
include the predefined parallel function call identified as implementing equivalent functionality in the code generated for the source program, where the predefined parallel function call replaces the occurrence of the given sequential function call,
wherein the predefined parallel function call that replaces the occurrence of the given sequential function call is selected from at least one of:
a first library of Fast Fourier Transform (FFT) functions optimized for the parallel processing device;
a second library of Deep Neural Network (DNN) functions optimized for the parallel processing device;
a third library of Basic Linear Algebra Subprograms (BLAS) functions optimized for the parallel processing device; or
a fourth library of dense and sparse direct solvers for use with Computer Vision, Computational Fluid Dynamics, Computational Chemistry, and Linear Optimization (SOLVER) functions optimized for the parallel processing device.

75. The apparatus of claim 74 wherein the sequential function calls are function calls according to at least one of MATLAB, Fortran, Java, Python, Julia, Ada, Octave, or MathScript programming language.

76. The apparatus of claim 74 wherein:
the first library is a CUDA Fast Fourier Transform (cuFFT) Library;
the second library is a CUDA Deep Neural Network (cuDNN) Library;
the third library is a CUDA Basic Linear Algebra Subprograms (cuBLAS) Library; or
the fourth library a CUDA dense and sparse direct solvers for use with Computer Vision, Computational Fluid Dynamics, Computational Chemistry, and Linear Optimization (cuSOLVER) Library.

77. The apparatus of claim 74 wherein
the sequential function calls include a data type of at least one of an input argument or an output argument of the sequential function calls, and
the identifying the predefined parallel function call is based on the data type of the at least one of the input argument or the output argument of the sequential function calls.

* * * * *

UNITED STATES PATENT AND TRADEMARK OFFICE
CERTIFICATE OF CORRECTION

| | | |
|---|---|---|
| PATENT NO. | : 10,949,182 B2 | Page 1 of 1 |
| APPLICATION NO. | : 15/816377 | |
| DATED | : March 16, 2021 | |
| INVENTOR(S) | : Girish Venkataramani et al. | |

It is certified that error appears in the above-identified patent and that said Letters Patent is hereby corrected as shown below:

In the Specification

Column 7, Line 35 reads:
"the C/C++ is programming languages, the Python program-"
Should read:
-- the C/C++ programming languages, the Python program- --

Column 14, Line 38 reads:
"blockDim·x = min(ceil(m/32)*32, 512)"
Should read:
-- blockDim.x = min(ceil(m/32)*32, 512) --

Column 20, Line 58 reads:
"form = 1:10"
Should read:
-- for m = 1:10 --

In the Claims

Claim 32
Column 43, Line 14 reads:
"for-loops include interactions and the parallel loop analysis"
Should read:
-- for-loops include iterations and the parallel loop analysis --

Claim 46
Column 45, Line 5 reads:
"sets of the for-loops include interactions and the parallel"
Should read:
-- sets of the for-loops include iterations and the parallel --

Signed and Sealed this
Twenty-ninth Day of July, 2025

Coke Morgan Stewart
*Acting Director of the United States Patent and Trademark Office*